US012545730B2

(12) United States Patent
Varshney et al.

(10) Patent No.: US 12,545,730 B2
(45) Date of Patent: Feb. 10, 2026

(54) OPTIMIZED ANTI-CD3 ARM IN THE GENERATION OF T-CELL BISPECIFIC ANTIBODIES FOR IMMUNOTHERAPY

(71) Applicant: SHANDONG BOAN BIOTECHNOLOGY CO., LTD., Shandong (CN)

(72) Inventors: Avanish Varshney, Woburn, MA (US); Li Zhou, Woburn, MA (US); Irene Schneider, Hanau (DE)

(73) Assignee: Shandong Boan Biotechnology Co., Ltd., Yantai (CN)

( * ) Notice: Subject to any disclaimer, the term of this patent is extended or adjusted under 35 U.S.C. 154(b) by 4 days.

(21) Appl. No.: 17/787,226

(22) PCT Filed: Dec. 15, 2020

(86) PCT No.: PCT/CN2020/136452
§ 371 (c)(1),
(2) Date: Jun. 17, 2022

(87) PCT Pub. No.: WO2021/121215
PCT Pub. Date: Jun. 24, 2021

(65) Prior Publication Data
US 2023/0075633 A1 Mar. 9, 2023

Related U.S. Application Data

(60) Provisional application No. 63/017,999, filed on Apr. 30, 2020, provisional application No. 62/974,744, filed on Dec. 20, 2019.

(51) Int. Cl.
C07K 16/00 (2006.01)
A61K 39/395 (2006.01)
A61P 35/00 (2006.01)
C07K 16/28 (2006.01)

(52) U.S. Cl.
CPC .......... C07K 16/2809 (2013.01); A61P 35/00 (2018.01); C07K 2317/31 (2013.01); C07K 2317/33 (2013.01); C07K 2317/41 (2013.01); C07K 2317/56 (2013.01); C07K 2317/622 (2013.01); C07K 2317/92 (2013.01)

(58) Field of Classification Search
None
See application file for complete search history.

(56) References Cited

U.S. PATENT DOCUMENTS

| 5,571,894 | A | 11/1996 | Wels et al. |
| 5,587,458 | A | 12/1996 | King et al. |
| 5,869,046 | A | 2/1999 | Presta et al. |
| 6,248,516 | B1 | 6/2001 | Winter et al. |
| 12,492,252 | B2 | 12/2025 | Varshney et al. |
| 2011/0287533 | A1 | 11/2011 | Chang |
| 2012/0034228 | A1 | 2/2012 | Kufer et al. |
| 2016/0130347 | A1 | 5/2016 | Bruenker et al. |
| 2016/0215261 | A1 | 7/2016 | Li et al. |
| 2016/0264671 | A1 | 9/2016 | Kufer et al. |
| 2018/0134789 | A1 | 5/2018 | Baeuerle et al. |
| 2018/0244805 | A1 | 8/2018 | Nezu et al. |
| 2019/0284279 | A1 | 9/2019 | Kong et al. |
| 2020/0055932 | A1 | 2/2020 | Dahlhoff et al. |

FOREIGN PATENT DOCUMENTS

| CN | 101687915 | 3/2010 |
| CN | 103833852 | 6/2014 |
| CN | 104140974 | 11/2014 |
| CN | 105829347 | 8/2016 |
| CN | 105949324 | 9/2016 |
| CN | 107043425 | 8/2017 |
| CN | 107556387 | 1/2018 |
| CN | 107614522 | 1/2018 |
| CN | 110003332 | 7/2019 |
| CN | 111196856 | 5/2020 |
| EP | 404097 | 12/1990 |
| JP | 2015536908 | 12/2015 |
| JP | 2019513014 | 5/2019 |
| WO | WO 1993001161 | 1/1993 |
| WO | WO 1993016185 | 8/1993 |
| WO | WO 2010037835 | 4/2010 |
| WO | WO 2010088522 | 8/2010 |
| WO | WO 2013070468 | 5/2013 |
| WO | WO 2013167153 | 11/2013 |

(Continued)

OTHER PUBLICATIONS

Almagro & Fransson, Frontiers in Bioscience 2008; 13:1619-33 (Year: 2008).*
Rudikoff et al. (Proc Natl Acad Sci USA 1982 Vol 79 p. 1979) (Year: 1982).*
MacCallum et al. J. Mol. Biol. (1996) 262, 732-745 (Year: 1996).*
Pascalis et al. (The Journal of Immunology (2002) 169, 3076-3084) (Year: 2002).*
Casset et al. (BBRC 2003, 307:198-205) (Year: 2003).*
Vajdos et al. (J. Mol. Biol. (2002) 320, 415-428) (Year: 2002).*
Chen et al. (J. Mol. Bio. (1999) 293, 865-881) (Year: 1999).*
Wu et al. (J. Mol. Biol. (1999) 294, 151-162) (Year: 1999).*
Padlan et al. (PNAS 1989, 86:5938-5942) (Year: 1989).*
Lamminmaki et al. (JBC 2001, 276:36687-36694) (Year: 2001).*
Almagro et al., "Humanization of antibodies," Front Biosci, Jan. 2008, 13:1619-33.

(Continued)

Primary Examiner — Meera Natarajan
(74) Attorney, Agent, or Firm — Fish & Richardson P.C.

(57) ABSTRACT

The present invention provides novel CD3 antigen binding fragments with particularly advantageous properties such as producibility, stability, binding affinity, biological activity, specific targeting of certain T cells, targeting efficiency, remaining tumor cell killing and reduced toxicity. The present invention also provides bispecific antigen binding molecules for activating T cells. In addition, the invention further provides methods of treating cancer in a subject in need thereof, comprising administering to the subject a pharmaceutical composition comprising the above said bispecific antigen binding molecules.

11 Claims, 15 Drawing Sheets
Specification includes a Sequence Listing.

(56) References Cited

FOREIGN PATENT DOCUMENTS

| WO | WO 2014056783 | 4/2014 |
|---|---|---|
| WO | WO 2017118675 | 7/2017 |
| WO | WO 2017156178 | 9/2017 |
| WO | WO 2017159287 | 9/2017 |
| WO | WO 2018114754 | 6/2018 |
| WO | WO 2019086497 | 5/2019 |
| WO | WO 2019241216 | 12/2019 |
| WO | WO 2020025792 | 2/2020 |
| WO | WO 2020135674 | 7/2020 |
| WO | WO 2020139956 | 7/2020 |
| WO | WO 2020147321 | 7/2020 |
| WO | WO 2021121215 | 6/2021 |
| WO | WO 2022166940 | 8/2022 |

OTHER PUBLICATIONS

Bacac et al., "A Novel Carcinoembryonic Antigen T-Cell Bispecific Antibody (CEA TCB) for the Treatment of Solid Tumors," Clin Cancer Res, Jul. 2016, 22(13):3286-97.
Brinkmann et al., "The making of bispecific antibodies," MABS, Jan. 2017, 9(2):182-212.
Chothia et al., "Canonical Structures for the Hypervariable Regions of Immunoglobulins," J Mol Biol, Aug. 1987, 196(4):901-17.
Handbook of Experimental Pharmacology vol. 113: The Pharmacology of Monoclonal Antibodies, Rosenberg et al.(ed)., 1994, Chapter 11, 47 pages.
Hayward et al., "Lysis of CD3 hybridoma targets by cloned human CD4 lymphocytes," Immunology, May 1988, 64(1):87-92.
Heeley et al., "Mutations flanking the polyglutamine repeat in the modulatory domain of rat glucocorticoid receptor lead to an increase in affinity for hormone," Endocr Res, Aug. 2002, 28(3):217-29.
Holliger et al., "'Diabodies': Small bivalent and bispecific antibody fragments," Proc Natl Acad Sci USA, Jul. 1993, 90(14):6444-48.
Hudson et al., "Engineered antibodies," Nature Medicine, Jan. 2003, 9(1):129-134.
Huston et al., "Protein Engineering of Single-Chain Fv Analogs and Fusion Proteins," Methods Enzymol, 1991, 203:46-88.
International Preliminary Report on Patentability in International Appln. No. PCT/CN2020/136452, mailed on Jun. 30, 2022, 7 pages.
International Search Report and Written Opinion in International Appln. No. PCT/CN2020/136452, mailed on Mar. 12, 2021, 13 pages.
International Search Report and Written Opinion in International Appln. No. PCT/CN2021/103447, mailed on Oct. 9, 2021, 14 pages.
International Search Report and Written Opinion in International Appln. No. PCT/CN2022/075326, mailed on May 11, 2022, 16 pages.
Ishiguro et al., "An anti-glypican 3/CD3 bispecific T cell-redirecting antibody for treatment of solid tumors," Science Translational Medicine, Jan. 2017, 9(410):eaal4291, 14 pages.
Johnson et al., "Construction of single-chain Fv derivatives monoclonal antibodies and their production in *Escherichia coli*," Methods Enzymol, 1991, 203:88-98.
Kipriyanov et al., "Two amino acid mutations in an anti-human CD3 single chain Fv antibody fragment that affect the yield on bacterial secretion but not the affinity," Protein Eng, Apr. 1997, 10(4):445-53.
Kuby Immunology, 6th ed., Kindt et al.(ed)., 2007, Chapter 4, p. 91, 1 page.
Labrijn et al., "Bispecific antibodies: a mechanistic review of the pipeline," Nat Rev Drug Discov, Aug. 2019, 18:585-608.
Ledbetter et al., "Valency of CD3 binding and internalization of the CD3 cell-surface complex control T cell responses to second signals: distinction between effects on protein kinase C, cytoplasmic free calcium, and proliferation," J Immunol, Jun. 1986, 136(11):3945-52.
Liljeblad et al., "Analysis of agalacto-IgG in rheumatoid arthritis using surface plasmon resonance," Glycoconj J, May 2000, 17(5):323-9.
Mølgaard et al., "Balanced secretion of anti-CEA × anti-CD3 diabody chains using the 2A self-cleaving peptide maximizes diabody assembly and tumor-specific cytotoxicity," Gene Ther, Apr. 2017, 24(4):208-14.
Office Action in Chinese Appln. No. 202110794916.9, dated Aug. 9, 2022, 5 pages (with English Translation).
Office Action in Chinese Appln. No. 202110794916.9, dated Jun. 10, 2022, 13 pages (with English Translation).
Tabernero et al., "Phase Ia and Ib studies of the novel carcinoembryonic antigen (CEA) T-cell bispecific (CEA CD3 TCB) antibody as a single agent and in combination with atezolizumab: Preliminary efficacy and safety in patients with metastatic colorectal cancer (mCRC)," Abstract, Presented at Proceedings of 2017 ASCO Annual Meeting I, Chicago, IL, Jun. 2-6, 2017; J Clin Oncol, May 2017, 35(15)(Suppl.):3002.
Wu et al., "Construction of GPC3-CAR-T cell targeting hepatocellular carcinoma and identification of its function," Chin J. Cancer Biother., Jul. 2017, 24(7):748-55 (English abstract).
Yang et al., "A common pathway for T lymphocyte activation involving both the CD3-Ti complex and CD2 sheep erythrocyte receptor determinants," J Immunol, Aug. 1986, 137(4):1097-100.
Cao et al., "Improved chemotherapy for hepatocellular carcinoma," Anticancer Research, Apr. 1, 2012, 32(4):1379-1386.
Cartellieri et al., "Chimeric antigen receptor-engineered T cells for immunotherapy of cancer," Journal of Biomedicine and Biotechnology, May 5, 2010, 2010(956304):1-14.
Filmus et al., "Glypican-3: a marker and a therapeutic target in hepatocellular carcinoma," The FEBS Journal, May 2013, 280(10):2471-2476.
Filmus et al., "Glypicans: proteoglycans with a surprise," The Journal of Clinical Investigation, Aug. 15, 2001, 108(4):497-501.
GenBank Accession No. AFM30911.1, "glypican 3 isoform 2 precursor [*Homo sapiens*]," Jun. 18, 2012, 2 pages.
Grupp et al., "Adoptive cellular therapy," Cancer immunology and immunotherapy, Aug. 11, 2010, 149-172.
Huang et al., "Tailoring cytolytic activity, proliferation and cytokine release via CD3 engineering of DART molecules for redirected T-cell killing," Keystone Symposium "Antibodies as drugs: Translating molecules into treatments," Mar. 1, 2018, 1 page.
International Preliminary Report on Patentability in International Appln. No. PCT/CN2021/103447, mailed on Jan. 12, 2023, 6 pages.
Lau et al., "Loss of the imprinted IGF2/cation-independent mannose 6-phosphate receptor results in fetal overgrowth and perinatal lethality," Genes & Development, Dec. 15, 1994, 8(24):2953-2963.
Ludwig et al., "Mouse mutants lacking the type 2 IGF receptor (IGF2R) are rescued from perinatal lethality in Igf2 and Igf1r Null backgrounds," Developmental Biology, Aug. 1, 1996, 177(2):517-535.
Moore et al., "Tuning T cell affinity improves efficacy and safety of anti-CD38 x anti-CD3 bispecific antibodies in monkeys—a potential therapy for multiple myeloma," Blood, Dec. 3, 2015,126(23):1798.
Partial Supplemental European Search Report in European Appln. No. 20902716.8, mailed on Apr. 12, 2023, 18 pages.
Savoldo et al., "CD28 costimulation improves expansion and persistence of chimeric antigen receptor-modified T cells in lymphoma patients," The Journal of Clinical Investigation, May 2, 2011, 121(5):1822-1826.
Suurs et al., "A review of bispecific antibodies and antibody constructs in oncology and clinical challenges," Pharmacology & Therapeutics, Sep. 1, 2019, 201:103-119.
Vafa et al., "Perspective: Designing T-cell engagers with better therapeutic windows," Frontiers in Oncology, Apr. 15, 2020, 10(446):1-7.
Wang et al., "Regulation of embryonic growth and lysosomal targeting by the imprinted Igf2/Mpr gene," Nature, Dec. 1, 1994, 372(6505):464-467 (Abstract Only).
Yaokai, "Anti-GPC3 × CD3 bispecific antigens the construction of the body and its activities against liver cancer," May 2018, Thesis for the master's degree, Xiamen University, May 2018, 84 pages, (with English abstract).

(56) References Cited

OTHER PUBLICATIONS

Extended European Search Report in European Appln No. 20902716.8, mailed on Jul. 17, 2023, 15 pages.

* cited by examiner

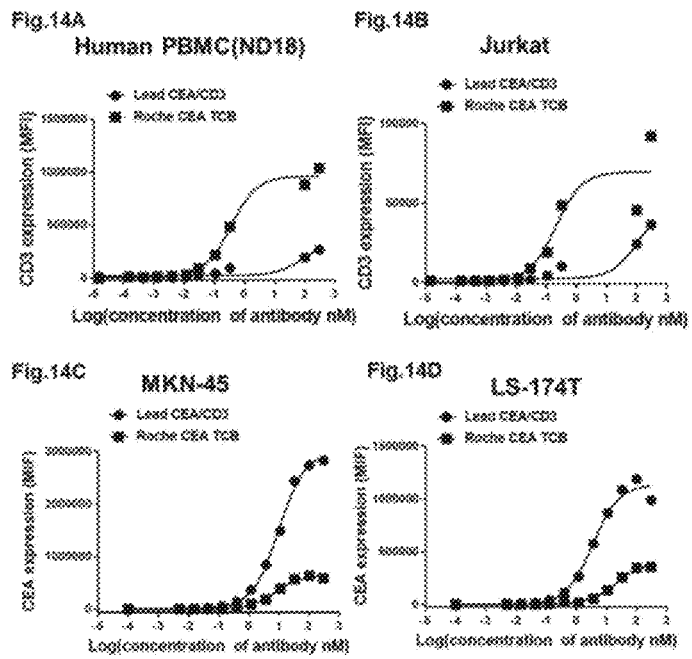
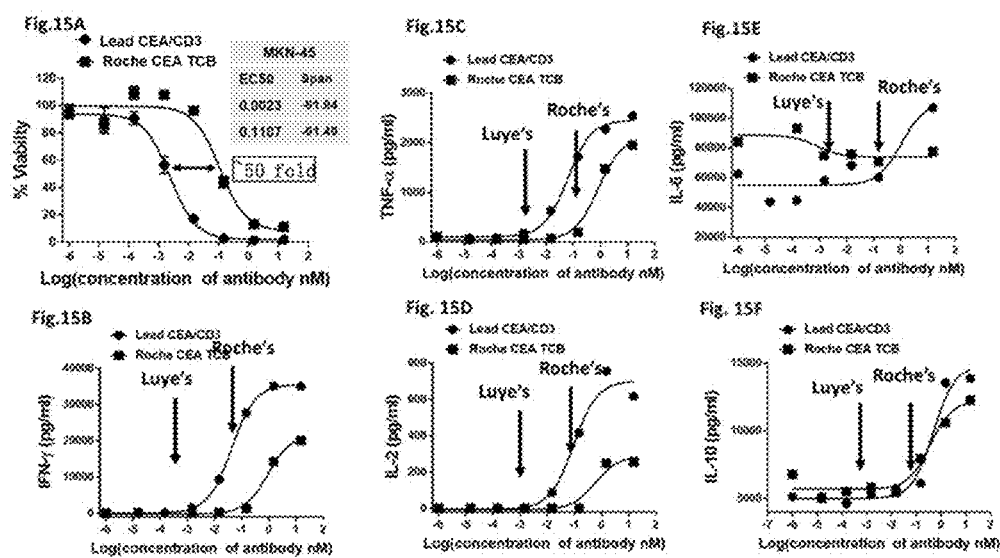

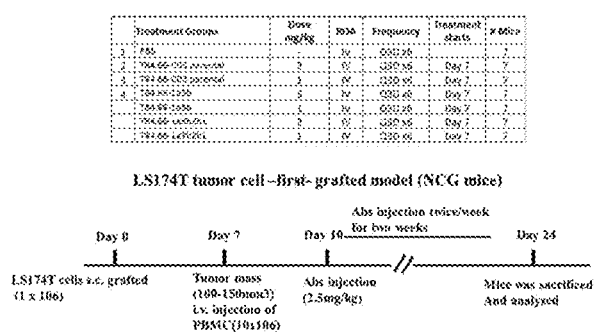

```
                            SEQUENCE LISTING

<160> NUMBER OF SEQ ID NOS: 35

<210> SEQ ID NO 1
<211> LENGTH: 125
<212> TYPE: PRT
<213> ORGANISM: artificial
<220> FEATURE:
<223> OTHER INFORMATION: recombinant Ab

<400> SEQUENCE: 1

Glu Val Gln Leu Val Glu Ser Gly Gly Gly Leu Val Gln Pro Gly Gly
1               5                   10                  15

Ser Leu Lys Leu Ser Cys Ala Ala Ser Gly Phe Thr Phe Asn Lys Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Ala Tyr Leu Gln Met Asn Asn Leu Lys Thr Glu Asp Thr Ala Val Tyr
                85                  90                  95

Tyr Cys Val Arg His Gly Asn Phe Gly Asn Ser Tyr Ile Ser Tyr Trp
            100                 105                 110

Ala Tyr Trp Gly Gln Gly Thr Leu Val Thr Val Ser Ser
        115                 120                 125

<210> SEQ ID NO 2
<211> LENGTH: 109
<212> TYPE: PRT
<213> ORGANISM: artificial
<220> FEATURE:
<223> OTHER INFORMATION: recombinant Ab

<400> SEQUENCE: 2

Gln Thr Val Val Thr Gln Glu Pro Ser Leu Thr Val Ser Pro Gly Gly
1               5                   10                  15

Thr Val Thr Leu Thr Cys Gly Ser Ser Thr Gly Ala Val Thr Ser Gly
            20                  25                  30

Tyr Tyr Pro Asn Trp Val Gln Gln Lys Pro Gly Gln Ala Pro Arg Gly
        35                  40                  45

Leu Ile Gly Gly Thr Lys Phe Leu Ala Pro Gly Thr Pro Ala Arg Phe
    50                  55                  60

Ser Gly Ser Leu Leu Gly Gly Lys Ala Ala Leu Thr Leu Ser Gly Val
65                  70                  75                  80

Gln Pro Glu Asp Glu Ala Glu Tyr Tyr Cys Ala Leu Trp Tyr Ser Asn
                85                  90                  95

Arg Trp Val Phe Gly Gly Gly Thr Lys Leu Thr Val Leu
            100                 105

<210> SEQ ID NO 3
<211> LENGTH: 125
<212> TYPE: PRT
<213> ORGANISM: recombinant Ab
```

<400> SEQUENCE: 3

Glu Val Gln Leu Val Glu Ser Gly Gly Gly Leu Val Lys Pro Gly Gly
1               5                   10                  15

Ser Leu Lys Leu Ser Cys Ala Ala Ser Gly Phe Thr Phe Asn Lys Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Ala Tyr Leu Gln Met Asn Asn Leu Arg Thr Glu Asp Thr Ala Val Tyr
                85                  90                  95

Tyr Cys Val Arg His Gly Asn Phe Gly Asn Ser Tyr Ile Ser Tyr Trp
            100                 105                 110

Ala Tyr Trp Gly Gln Gly Thr Thr Val Thr Val Ser Ser
        115                 120                 125

<210> SEQ ID NO 4
<211> LENGTH: 110
<212> TYPE: PRT
<213> ORGANISM: artificial
<220> FEATURE:
<223> OTHER INFORMATION: recombinant Ab

<400> SEQUENCE: 4

Gln Ser Val Leu Thr Gln Pro Pro Ser Val Ser Ala Ala Pro Gly Gln
1               5                   10                  15

Arg Val Thr Ile Ser Cys Ser Gly Ser Thr Gly Ala Val Thr Ser Gly
            20                  25                  30

Tyr Tyr Pro Asn Trp Tyr Gln Gln Leu Pro Gly Thr Ala Pro Arg Leu
        35                  40                  45

Leu Ile Gly Gly Thr Lys Phe Leu Ala Pro Gly Thr Pro Asp Arg Phe
    50                  55                  60

Ser Gly Ser Ser Lys Ser Thr Ser Ala Ala Leu Ala Ile Ser Gly Val
65                  70                  75                  80

Gln Ser Glu Asp Glu Ala Asp Tyr Tyr Cys Ala Leu Trp Tyr Ser Asn
                85                  90                  95

Arg Trp Val Phe Gly Gly Gly Thr Lys Leu Thr Val Leu Gly
            100                 105                 110

<210> SEQ ID NO 5
<211> LENGTH: 121
<212> TYPE: PRT
<213> ORGANISM: artificial
<220> FEATURE:
<223> OTHER INFORMATION: recombinant Ab

<400> SEQUENCE: 5

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Asn Ile Lys Asp Thr
            20                  25                  30

Tyr Met His Trp Val Arg Gln Ala Pro Gly Lys Gly Leu Glu Trp Val
        35                  40                  45

Ala Arg Ile Asp Pro Ala Gln Gly Asn Thr Lys Tyr Ala Asp Ser Val
    50                  55                  60

```
Lys Gly Arg Phe Thr Ile Ser Ala Asp Thr Ser Lys Asn Thr Ala Tyr
 65                  70                  75                  80

Leu Gln Met Asn Ser Leu Arg Ala Glu Asp Thr Ala Val Tyr Tyr Cys
                 85                  90                  95

Ala Pro Phe Gly Tyr Tyr Val Ser Asp Tyr Ala Met Ala Tyr Trp Gly
            100                 105                 110

Gln Gly Thr Leu Val Thr Val Ser Ser
        115                 120

<210> SEQ ID NO 6
<211> LENGTH: 111
<212> TYPE: PRT
<213> ORGANISM: artificial
<220> FEATURE:
<223> OTHER INFORMATION: recombinant Ab

<400> SEQUENCE: 6

Asp Ile Gln Leu Thr Gln Ser Pro Ser Ser Leu Ser Ala Ser Val Gly
 1               5                  10                  15

Asp Arg Val Thr Ile Thr Cys Arg Ala Gly Glu Ser Val Asp Ile Phe
                 20                  25                  30

Gly Val Gly Phe Leu His Trp Tyr Gln Gln Lys Pro Gly Lys Ala Pro
             35                  40                  45

Lys Leu Leu Ile Tyr Arg Ala Ser Asn Leu Glu Ser Gly Val Pro Ser
 50                  55                  60

Arg Phe Ser Gly Ser Gly Ser Arg Thr Asp Phe Thr Leu Thr Ile Ser
 65                  70                  75                  80

Ser Leu Gln Pro Glu Asp Phe Ala Thr Tyr Tyr Cys Gln Gln Thr Asn
                 85                  90                  95

Glu Asp Pro Tyr Thr Phe Gly Gln Gly Thr Lys Val Glu Ile Lys
            100                 105                 110

<210> SEQ ID NO 7
<211> LENGTH: 121
<212> TYPE: PRT
<213> ORGANISM: artificial
<220> FEATURE:
<223> OTHER INFORMATION: recombinant Ab

<400> SEQUENCE: 7

Glu Val Gln Leu Val Glu Ser Gly Gly Gly Leu Val Lys Pro Gly Gly
 1               5                  10                  15

Ser Leu Arg Leu Ser Cys Ala Ala Ser Gly Phe Asn Ile Lys Asp Thr
                 20                  25                  30

Tyr Met His Trp Val Arg Gln Ala Pro Gly Lys Gly Leu Glu Trp Val
             35                  40                  45

Ala Arg Ile Asp Pro Ala Gln Gly Asn Thr Lys Tyr Ala Asp Ser Val
 50                  55                  60

Lys Gly Arg Phe Thr Ile Ser Ala Asp Thr Ser Lys Asn Thr Ala Tyr
 65                  70                  75                  80

Leu Gln Met Asn Ser Leu Arg Ala Glu Asp Thr Ala Val Tyr Tyr Cys
                 85                  90                  95

Ala Pro Phe Gly Tyr Tyr Val Ser Asp Tyr Ala Met Ala Tyr Trp Gly
            100                 105                 110

Gln Gly Thr Thr Val Thr Val Ser Ser
        115                 120

<210> SEQ ID NO 8
```

```
<211> LENGTH: 112
<212> TYPE: PRT
<213> ORGANISM: artificial
<220> FEATURE:
<223> OTHER INFORMATION: recombinant Ab

<400> SEQUENCE: 8

Asp Ile Val Leu Thr Gln Ser Pro Ser Ser Leu Ser Ala Ser Leu Gly
1               5                   10                  15

Asp Arg Val Thr Ile Thr Cys Arg Ala Gly Glu Ser Val Asp Ile Phe
            20                  25                  30

Gly Val Gly Phe Leu His Trp Tyr Gln Gln Lys Pro Gly Lys Ala Pro
        35                  40                  45

Lys Leu Leu Ile Tyr Arg Ala Ser Asn Leu Glu Ser Gly Val Pro Ser
    50                  55                  60

Arg Phe Ser Gly Ser Gly Ser Gly Thr Asp Phe Thr Leu Thr Ile Ser
65                  70                  75                  80

Ser Leu Gln Pro Glu Asp Phe Ala Thr Tyr Tyr Cys Gln Gln Thr Asn
                85                  90                  95

Glu Asp Pro Tyr Thr Phe Gly Gly Thr Lys Val Glu Ile Lys Arg
            100                 105                 110

<210> SEQ ID NO 9
<211> LENGTH: 125
<212> TYPE: PRT
<213> ORGANISM: artificial
<220> FEATURE:
<223> OTHER INFORMATION: recombinant Ab

<400> SEQUENCE: 9

Glu Val Gln Leu Val Glu Ser Gly Gly Gly Leu Val Lys Pro Gly Gly
1               5                   10                  15

Ser Leu Lys Leu Ser Cys Ala Ala Ser Gly Phe Thr Phe Ser Thr Tyr
            20                  25                  30

Ala Met Asn Trp Val Arg Gln Ala Pro Gly Lys Gly Leu Glu Trp Val
        35                  40                  45

Gly Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Ala Tyr Leu Gln Met Asn Asn Leu Arg Thr Glu Asp Thr Ala Val Tyr
                85                  90                  95

Tyr Cys Val Arg His Gly Asn Phe Gly Asn Ser Tyr Ile Ser His Phe
            100                 105                 110

Ala Tyr Trp Gly Gln Gly Thr Thr Val Thr Val Ser Ser
        115                 120                 125

<210> SEQ ID NO 10
<211> LENGTH: 125
<212> TYPE: PRT
<213> ORGANISM: artificial
<220> FEATURE:
<223> OTHER INFORMATION: recombinant Ab

<400> SEQUENCE: 10

Glu Val Gln Leu Val Glu Ser Gly Gly Gly Leu Val Lys Pro Gly Gly
1               5                   10                  15

Ser Leu Lys Leu Ser Cys Ala Ala Ser Gly Phe Thr Phe Asn Lys Tyr
            20                  25                  30
```

Ala Met Asn Trp Val Arg Gln Ala Pro Gly Lys Gly Leu Glu Trp Val
            35                  40                  45

Ala Arg Ile Arg Ser Asn Tyr Asn Tyr Ala Thr Thr Phe Ala Asp
50                  55                  60

Ser Val Lys Asp Arg Phe Thr Ile Ser Arg Asp Asp Ser Lys Asn Thr
65                  70                  75                  80

Ala Tyr Leu Gln Met Asn Asn Leu Arg Thr Glu Asp Thr Ala Val Tyr
                85                  90                  95

Tyr Cys Val Arg His Gly Asn Phe Gly Asn Ser Tyr Ile Ser Tyr Trp
            100                 105                 110

Ala Tyr Trp Gly Gln Gly Thr Thr Val Thr Val Ser Ser
            115                 120                 125

<210> SEQ ID NO 11
<211> LENGTH: 125
<212> TYPE: PRT
<213> ORGANISM: artificial
<220> FEATURE:
<223> OTHER INFORMATION: recombinant Ab

<400> SEQUENCE: 11

Glu Val Gln Leu Val Glu Ser Gly Gly Gly Leu Val Lys Pro Gly Gly
1               5                   10                  15

Ser Leu Lys Leu Ser Cys Ala Ala Ser Gly Phe Thr Phe Asn Lys Tyr
            20                  25                  30

Ala Met Asn Trp Val Arg Gln Ala Pro Gly Lys Gly Leu Glu Trp Val
            35                  40                  45

Ala Arg Ile Arg Ser Lys Tyr Asn Asn Tyr Ala Thr Tyr Tyr Ala Asp
50                  55                  60

Ser Val Lys Asp Arg Phe Thr Ile Ser Arg Asp Asp Ser Lys Asn Thr
65                  70                  75                  80

Ala Tyr Leu Gln Met Asn Asn Leu Arg Thr Glu Asp Thr Ala Val Tyr
                85                  90                  95

Tyr Cys Val Arg His Gly Gln Trp Gly Asn Ser Tyr Ile Ser Tyr Trp
            100                 105                 110

Ala Tyr Trp Gly Gln Gly Thr Thr Val Thr Val Ser Ser
            115                 120                 125

<210> SEQ ID NO 12
<211> LENGTH: 125
<212> TYPE: PRT
<213> ORGANISM: artificial
<220> FEATURE:
<223> OTHER INFORMATION: recombinant Ab

<400> SEQUENCE: 12

Glu Val Gln Leu Val Glu Ser Gly Gly Gly Leu Val Lys Pro Gly Gly
1               5                   10                  15

Ser Leu Lys Leu Ser Cys Ala Ala Ser Gly Phe Thr Phe Ser Thr Tyr
            20                  25                  30

Ala Met Asn Trp Val Arg Gln Ala Pro Gly Lys Gly Leu Glu Trp Val
            35                  40                  45

Ala Arg Ile Arg Ser Asn Tyr Asn Asn Tyr Ala Thr Phe Ala Asp
50                  55                  60

Ser Val Lys Asp Arg Phe Thr Ile Ser Arg Asp Asp Ser Lys Asn Thr
65                  70                  75                  80

Ala Tyr Leu Gln Met Asn Asn Leu Arg Thr Glu Asp Thr Ala Val Tyr
                85                  90                  95

```
Tyr Cys Val Arg His Gly Asn Phe Gly Asn Ser Tyr Ile Ser His Phe
            100                 105                 110

Ala Tyr Trp Gly Gln Gly Thr Thr Val Thr Val Ser Ser
        115                 120                 125

<210> SEQ ID NO 13
<211> LENGTH: 125
<212> TYPE: PRT
<213> ORGANISM: artificial
<220> FEATURE:
<223> OTHER INFORMATION: recombinant Ab

<400> SEQUENCE: 13

Glu Val Gln Leu Val Glu Ser Gly Gly Gly Leu Val Lys Pro Gly Gly
1               5                   10                  15

Ser Leu Lys Leu Ser Cys Ala Ala Ser Gly Tyr Thr Phe Asn Lys Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Ala Tyr Leu Gln Met Asn Asn Leu Arg Thr Glu Asp Thr Ala Val Tyr
                85                  90                  95

Tyr Cys Val Arg His Gly Asn Phe Gly Asn Ser Tyr Ile Ser Tyr Trp
            100                 105                 110

Ala Tyr Trp Gly Gln Gly Thr Thr Val Thr Val Ser Ser
        115                 120                 125

<210> SEQ ID NO 14
<211> LENGTH: 125
<212> TYPE: PRT
<213> ORGANISM: artificial
<220> FEATURE:
<223> OTHER INFORMATION: recombinant Ab

<400> SEQUENCE: 14

Glu Val Gln Leu Val Glu Ser Gly Gly Gly Leu Val Lys Pro Gly Gly
1               5                   10                  15

Ser Leu Lys Leu Ser Cys Ala Ala Ser Gly Phe Thr Phe Asn Lys Tyr
            20                  25                  30

Ala Met Asn Trp Val Arg Gln Ala Pro Gly Lys Gly Leu Glu Trp Val
        35                  40                  45

Gly Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Ala Tyr Leu Gln Met Asn Asn Leu Arg Thr Glu Asp Thr Ala Val Tyr
                85                  90                  95

Tyr Cys Ala Arg His Gly Asn Phe Gly Asn Ser Tyr Ile Ser Tyr Trp
            100                 105                 110

Ala Tyr Trp Gly Gln Gly Thr Thr Val Thr Val Ser Ser
        115                 120                 125

<210> SEQ ID NO 15
<211> LENGTH: 125
<212> TYPE: PRT
```

<213> ORGANISM: artificial
<220> FEATURE:
<223> OTHER INFORMATION: recombinant Ab

<400> SEQUENCE: 15

```
Glu Val Gln Leu Val Glu Ser Gly Gly Gly Leu Val Lys Pro Gly Gly
1               5                   10                  15

Ser Leu Lys Leu Ser Cys Ala Ala Ser Gly Phe Thr Phe Ser Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Ala Tyr Leu Gln Met Asn Asn Leu Arg Thr Glu Asp Thr Ala Val Tyr
                85                  90                  95

Tyr Cys Val Arg His Gly Asn Phe Gly Asn Ser Tyr Ile Ser Tyr Trp
            100                 105                 110

Ala Tyr Trp Gly Gln Gly Thr Thr Val Thr Val Ser Ser
        115                 120                 125
```

<210> SEQ ID NO 16
<211> LENGTH: 125
<212> TYPE: PRT
<213> ORGANISM: artificial
<220> FEATURE:
<223> OTHER INFORMATION: recombinant Ab

<400> SEQUENCE: 16

```
Glu Val Gln Leu Val Glu Ser Gly Gly Gly Leu Val Lys Pro Gly Gly
1               5                   10                  15

Ser Leu Lys Leu Ser Cys Ala Ala Ser Gly Phe Thr Phe Asn Lys Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Ala Tyr Leu Gln Met Asn Asn Leu Arg Thr Glu Asp Thr Ala Val Tyr
                85                  90                  95

Tyr Cys Val Arg His Gly Asn Phe Gly Asn Ser Tyr Ile Ser His Trp
            100                 105                 110

Ala Tyr Trp Gly Gln Gly Thr Thr Val Thr Val Ser Ser
        115                 120                 125
```

<210> SEQ ID NO 17
<211> LENGTH: 125
<212> TYPE: PRT
<213> ORGANISM: artificial
<220> FEATURE:
<223> OTHER INFORMATION: recombinant Ab

<400> SEQUENCE: 17

```
Glu Val Gln Leu Val Glu Ser Gly Gly Gly Leu Val Lys Pro Gly Gly
1               5                   10                  15

Ser Leu Lys Leu Ser Cys Ala Ala Ser Gly Phe Thr Phe Asn Lys Tyr
            20                  25                  30
```

```
Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
 50                  55                  60

Ser Val Lys Asp Arg Phe Thr Ile Ser Arg Asp Asp Ser Lys Asn Thr
 65                  70                  75                  80

Ala Tyr Leu Gln Met Asn Asn Leu Arg Thr Glu Asp Thr Ala Val Tyr
                85                  90                  95

Tyr Cys Val Arg His Gly Asn Phe Gly Asn Ser Tyr Ile Ser Tyr Phe
                100                 105                 110

Ala Tyr Trp Gly Gln Gly Thr Thr Val Thr Val Ser Ser
                115                 120                 125
```

<210> SEQ ID NO 18
<211> LENGTH: 125
<212> TYPE: PRT
<213> ORGANISM: artificial
<220> FEATURE:
<223> OTHER INFORMATION: recombinant Ab

<400> SEQUENCE: 18

```
Glu Val Gln Leu Val Glu Ser Gly Gly Gly Leu Val Lys Pro Gly Gly
 1               5                   10                  15

Ser Leu Lys Leu Ser Cys Ala Ala Ser Gly Phe Thr Phe Asn Lys Tyr
                20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
 50                  55                  60

Ser Val Lys Asp Arg Phe Thr Ile Ser Arg Asp Asp Ser Lys Asn Thr
 65                  70                  75                  80

Ala Tyr Leu Gln Met Asn Asn Leu Arg Thr Glu Asp Thr Ala Val Tyr
                85                  90                  95

Tyr Cys Val Arg His Gly Asn Phe Gly Asn Ser Tyr Ile Ser His Phe
                100                 105                 110

Ala Tyr Trp Gly Gln Gly Thr Thr Val Thr Val Ser Ser
                115                 120                 125
```

<210> SEQ ID NO 19
<211> LENGTH: 125
<212> TYPE: PRT
<213> ORGANISM: artificial
<220> FEATURE:
<223> OTHER INFORMATION: recombinant Ab

<400> SEQUENCE: 19

```
Glu Val Gln Leu Val Glu Ser Gly Gly Gly Leu Val Lys Pro Gly Gly
 1               5                   10                  15

Ser Leu Lys Leu Ser Cys Ala Ala Ser Gly Phe Thr Phe Asn Lys Tyr
                20                  25                  30

Ala Met Asn Trp Val Arg Gln Ala Pro Gly Lys Gly Leu Glu Trp Val
        35                  40                  45

Ala Arg Ile Arg Ser Asn Tyr Asn Asn Tyr Ala Thr Tyr Tyr Ala Asp
 50                  55                  60

Ser Val Lys Asp Arg Phe Thr Ile Ser Arg Asp Asp Ser Lys Asn Thr
 65                  70                  75                  80

Ala Tyr Leu Gln Met Asn Asn Leu Arg Thr Glu Asp Thr Ala Val Tyr
```

```
                    85                   90                   95
Tyr Cys Val Arg His Gly Asn Phe Gly Asn Ser Tyr Ile Ser Tyr Trp
                100                 105                 110

Ala Tyr Trp Gly Gln Gly Thr Thr Val Thr Val Ser Ser
        115                 120                 125

<210> SEQ ID NO 20
<211> LENGTH: 125
<212> TYPE: PRT
<213> ORGANISM: artificial
<220> FEATURE:
<223> OTHER INFORMATION: recombinant Ab

<400> SEQUENCE: 20

Glu Val Gln Leu Val Glu Ser Gly Gly Gly Leu Val Lys Pro Gly Gly
1               5                   10                  15

Ser Leu Lys Leu Ser Cys Ala Ala Ser Gly Phe Thr Phe Asn Lys Tyr
                20                  25                  30

Ala Met Asn Trp Val Arg Gln Ala Pro Gly Lys Gly Leu Glu Trp Val
            35                  40                  45

Ala Arg Ile Arg Ser Lys Tyr Asn Asn Tyr Ala Thr Thr Phe Ala Asp
        50                  55                  60

Ser Val Lys Asp Arg Phe Thr Ile Ser Arg Asp Asp Ser Lys Asn Thr
65                  70                  75                  80

Ala Tyr Leu Gln Met Asn Asn Leu Arg Thr Glu Asp Thr Ala Val Tyr
                85                  90                  95

Tyr Cys Val Arg His Gly Asn Phe Gly Asn Ser Tyr Ile Ser Tyr Trp
                100                 105                 110

Ala Tyr Trp Gly Gln Gly Thr Thr Val Thr Val Ser Ser
        115                 120                 125

<210> SEQ ID NO 21
<211> LENGTH: 125
<212> TYPE: PRT
<213> ORGANISM: artificial
<220> FEATURE:
<223> OTHER INFORMATION: recombinant Ab

<400> SEQUENCE: 21

Glu Val Gln Leu Val Glu Ser Gly Gly Gly Leu Val Lys Pro Gly Gly
1               5                   10                  15

Ser Leu Lys Leu Ser Cys Ala Ala Ser Gly Phe Thr Phe Asn Lys Tyr
                20                  25                  30

Ala Met Asn Trp Val Arg Gln Ala Pro Gly Lys Gly Leu Glu Trp Val
            35                  40                  45

Ala Arg Ile Arg Ser Lys Tyr Asn Asn Tyr Ala Thr Tyr Tyr Ala Asp
        50                  55                  60

Ser Val Lys Asp Arg Phe Thr Ile Ser Arg Asp Asp Ser Lys Asn Thr
65                  70                  75                  80

Ala Tyr Leu Gln Met Asn Asn Leu Arg Thr Glu Asp Thr Ala Val Tyr
                85                  90                  95

Tyr Cys Val Arg His Gly Gln Phe Gly Asn Ser Tyr Ile Ser Tyr Trp
                100                 105                 110

Ala Tyr Trp Gly Gln Gly Thr Thr Val Thr Val Ser Ser
        115                 120                 125

<210> SEQ ID NO 22
<211> LENGTH: 125
```

```
<212> TYPE: PRT
<213> ORGANISM: artificial
<220> FEATURE:
<223> OTHER INFORMATION: recombinant Ab

<400> SEQUENCE: 22

Glu Val Gln Leu Val Glu Ser Gly Gly Gly Leu Val Lys Pro Gly Gly
1               5                   10                  15

Ser Leu Lys Leu Ser Cys Ala Ala Ser Gly Phe Thr Phe Asn Lys Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Ala Tyr Leu Gln Met Asn Asn Leu Arg Thr Glu Asp Thr Ala Val Tyr
                85                  90                  95

Tyr Cys Val Arg His Gly Asn Trp Gly Asn Ser Tyr Ile Ser Tyr Trp
            100                 105                 110

Ala Tyr Trp Gly Gln Gly Thr Thr Val Thr Val Ser Ser
            115                 120                 125

<210> SEQ ID NO 23
<211> LENGTH: 125
<212> TYPE: PRT
<213> ORGANISM: artificial
<220> FEATURE:
<223> OTHER INFORMATION: recombinant Ab

<400> SEQUENCE: 23

Glu Val Gln Leu Val Glu Ser Gly Gly Gly Leu Val Lys Pro Gly Gly
1               5                   10                  15

Ser Leu Lys Leu Ser Cys Ala Ala Ser Gly Phe Thr Phe Ser Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Ala Tyr Leu Gln Met Asn Asn Leu Arg Thr Glu Asp Thr Ala Val Tyr
                85                  90                  95

Tyr Cys Val Arg His Gly Asn Trp Gly Asn Ser Tyr Ile Ser Tyr Trp
            100                 105                 110

Ala Tyr Trp Gly Gln Gly Thr Thr Val Thr Val Ser Ser
            115                 120                 125

<210> SEQ ID NO 24
<211> LENGTH: 125
<212> TYPE: PRT
<213> ORGANISM: artificial
<220> FEATURE:
<223> OTHER INFORMATION: recombinant Ab

<400> SEQUENCE: 24

Glu Val Gln Leu Val Glu Ser Gly Gly Gly Leu Val Lys Pro Gly Gly
1               5                   10                  15

Ser Leu Lys Leu Ser Cys Ala Ala Ser Gly Phe Thr Phe Ser Thr Tyr
            20                  25                  30
```

```
            20                  25                  30
Ala Met Asn Trp Val Arg Gln Ala Pro Gly Lys Gly Leu Glu Trp Val
        35                  40                  45

Ala Arg Ile Arg Ser Asn Tyr Asn Asn Tyr Ala Thr Tyr Tyr Ala Asp
 50                  55                  60

Ser Val Lys Asp Arg Phe Thr Ile Ser Arg Asp Asp Ser Lys Asn Thr
 65                  70                  75                  80

Ala Tyr Leu Gln Met Asn Asn Leu Arg Thr Glu Asp Thr Ala Val Tyr
                 85                  90                  95

Tyr Cys Val Arg His Gly Asn Trp Gly Asn Ser Tyr Ile Ser Tyr Trp
                100                 105                 110

Ala Tyr Trp Gly Gln Gly Thr Thr Val Thr Val Ser Ser
        115                 120                 125
```

<210> SEQ ID NO 25
<211> LENGTH: 125
<212> TYPE: PRT
<213> ORGANISM: artificial
<220> FEATURE:
<223> OTHER INFORMATION: recombinant Ab

<400> SEQUENCE: 25

```
Glu Val Gln Leu Val Glu Ser Gly Gly Gly Leu Val Lys Pro Gly Gly
 1               5                  10                  15

Ser Leu Lys Leu Ser Cys Ala Ala Ser Gly Phe Thr Phe Ser Thr Tyr
                20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
 50                  55                  60

Ser Val Lys Asp Arg Phe Thr Ile Ser Arg Asp Asp Ser Lys Asn Thr
 65                  70                  75                  80

Ala Tyr Leu Gln Met Asn Asn Leu Arg Thr Glu Asp Thr Ala Val Tyr
                 85                  90                  95

Tyr Cys Val Arg His Gly Asn Trp Gly Asn Ser Tyr Ile Ser Tyr Trp
                100                 105                 110

Ala Tyr Trp Gly Gln Gly Thr Thr Val Thr Val Ser Ser
        115                 120                 125
```

<210> SEQ ID NO 26
<211> LENGTH: 125
<212> TYPE: PRT
<213> ORGANISM: artificial
<220> FEATURE:
<223> OTHER INFORMATION: recombinant Ab

<400> SEQUENCE: 26

```
Glu Val Gln Leu Val Glu Ser Gly Gly Gly Leu Val Lys Pro Gly Gly
 1               5                  10                  15

Ser Leu Lys Leu Ser Cys Ala Ala Ser Gly Phe Thr Phe Ser Thr Tyr
                20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Phe Ala Asp
 50                  55                  60

Ser Val Lys Asp Arg Phe Thr Ile Ser Arg Asp Asp Ser Lys Asn Thr
 65                  70                  75                  80
```

Ala Tyr Leu Gln Met Asn Asn Leu Arg Thr Glu Asp Thr Ala Val Tyr
                85                  90                  95

Tyr Cys Val Arg His Gly Asn Trp Gly Asn Ser Tyr Ile Ser Tyr Trp
            100                 105                 110

Ala Tyr Trp Gly Gln Gly Thr Thr Val Thr Val Ser Ser
        115                 120                 125

<210> SEQ ID NO 27
<211> LENGTH: 125
<212> TYPE: PRT
<213> ORGANISM: artificial
<220> FEATURE:
<223> OTHER INFORMATION: recombinant Ab

<400> SEQUENCE: 27

Glu Val Gln Leu Val Glu Ser Gly Gly Gly Leu Val Lys Pro Gly Gly
1               5                   10                  15

Ser Leu Lys Leu Ser Cys Ala Ala Ser Gly Phe Thr Phe Ser Thr Tyr
            20                  25                  30

Ala Met Asn Trp Val Arg Gln Ala Pro Gly Lys Gly Leu Glu Trp Val
        35                  40                  45

Gly Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Ala Tyr Leu Gln Met Asn Asn Leu Arg Thr Glu Asp Thr Ala Val Tyr
                85                  90                  95

Tyr Cys Val Arg His Gly Asn Trp Gly Asn Ser Tyr Ile Ser Tyr Trp
            100                 105                 110

Ala Tyr Trp Gly Gln Gly Thr Thr Val Thr Val Ser Ser
        115                 120                 125

<210> SEQ ID NO 28
<211> LENGTH: 125
<212> TYPE: PRT
<213> ORGANISM: artificial
<220> FEATURE:
<223> OTHER INFORMATION: recombinant Ab

<400> SEQUENCE: 28

Glu Val Gln Leu Val Glu Ser Gly Gly Gly Leu Val Lys Pro Gly Gly
1               5                   10                  15

Ser Leu Lys Leu Ser Cys Ala Ala Ser Gly Phe Thr Phe Ser Thr Tyr
            20                  25                  30

Ala Met Asn Trp Val Arg Gln Ala Pro Gly Lys Gly Leu Glu Trp Val
        35                  40                  45

Gly Arg Ile Arg Ser Asn Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Ala Tyr Leu Gln Met Asn Asn Leu Arg Thr Glu Asp Thr Ala Val Tyr
                85                  90                  95

Tyr Cys Val Arg His Gly Asn Trp Gly Asn Ser Tyr Ile Ser Tyr Trp
            100                 105                 110

Ala Tyr Trp Gly Gln Gly Thr Thr Val Thr Val Ser Ser
        115                 120                 125

<210> SEQ ID NO 29

<211> LENGTH: 125
<212> TYPE: PRT
<213> ORGANISM: artificial
<220> FEATURE:
<223> OTHER INFORMATION: recombinant Ab

<400> SEQUENCE: 29

Glu Val Gln Leu Val Glu Ser Gly Gly Gly Leu Val Lys Pro Gly Gly
1               5                   10                  15
Ser Leu Lys Leu Ser Cys Ala Ala Ser Gly Phe Thr Phe Ser Thr Tyr
            20                  25                  30
Ala Met Asn Trp Val Arg Gln Ala Pro Gly Lys Gly Leu Glu Trp Val
        35                  40                  45
Gly Arg Ile Arg Ser Lys Tyr Asn Asn Tyr Ala Thr Thr Tyr Ala Asp
    50                  55                  60
Ser Val Lys Asp Arg Phe Thr Ile Ser Arg Asp Asp Ser Lys Asn Thr
65                  70                  75                  80
Ala Tyr Leu Gln Met Asn Asn Leu Arg Thr Glu Asp Thr Ala Val Tyr
                85                  90                  95
Tyr Cys Val Arg His Gly Asn Trp Gly Asn Ser Tyr Ile Ser Tyr Trp
            100                 105                 110
Ala Tyr Trp Gly Gln Gly Thr Thr Val Thr Val Ser Ser
        115                 120                 125

<210> SEQ ID NO 30
<211> LENGTH: 125
<212> TYPE: PRT
<213> ORGANISM: artificial
<220> FEATURE:
<223> OTHER INFORMATION: recombinant Ab

<400> SEQUENCE: 30

Glu Val Gln Leu Val Glu Ser Gly Gly Gly Leu Val Lys Pro Gly Gly
1               5                   10                  15
Ser Leu Lys Leu Ser Cys Ala Ala Ser Gly Phe Thr Phe Ser Thr Tyr
            20                  25                  30
Ala Met Asn Trp Val Arg Gln Ala Pro Gly Lys Gly Leu Glu Trp Val
        35                  40                  45
Gly Arg Ile Arg Ser Lys Tyr Asn Asn Tyr Ala Thr Tyr Phe Ala Asp
    50                  55                  60
Ser Val Lys Asp Arg Phe Thr Ile Ser Arg Asp Asp Ser Lys Asn Thr
65                  70                  75                  80
Ala Tyr Leu Gln Met Asn Asn Leu Arg Thr Glu Asp Thr Ala Val Tyr
                85                  90                  95
Tyr Cys Val Arg His Gly Asn Trp Gly Asn Ser Tyr Ile Ser Tyr Trp
            100                 105                 110
Ala Tyr Trp Gly Gln Gly Thr Thr Val Thr Val Ser Ser
        115                 120                 125

<210> SEQ ID NO 31
<211> LENGTH: 15
<212> TYPE: PRT
<213> ORGANISM: artificial
<220> FEATURE:
<223> OTHER INFORMATION: GS linker

<400> SEQUENCE: 31

Gly Gly Gly Gly Ser Gly Gly Gly Ser Gly Gly Gly Ser
1               5                   10                  15

<210> SEQ ID NO 32
<211> LENGTH: 694
<212> TYPE: PRT
<213> ORGANISM: artificial
<220> FEATURE:
<223> OTHER INFORMATION: 10636H\cibisatamab\Humanized

<400> SEQUENCE: 32

```
Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Glu Phe
            20                  25                  30

Gly Met Asn Trp Val Arg Gln Ala Pro Gly Gln Gly Leu Glu Trp Met
        35                  40                  45

Gly Trp Ile Asn Thr Lys Thr Gly Glu Ala Thr Tyr Val Glu Glu Phe
    50                  55                  60

Lys Gly Arg Val Thr Phe Thr Thr Asp Thr Ser Thr Ser Thr Ala Tyr
65                  70                  75                  80

Met Glu Leu Arg Ser Leu Arg Ser Asp Asp Thr Ala Val Tyr Tyr Cys
                85                  90                  95

Ala Arg Trp Asp Phe Ala Tyr Tyr Val Glu Ala Met Asp Tyr Trp Gly
            100                 105                 110

Gln Gly Thr Thr Val Thr Val Ser Ser Ala Ser Thr Lys Gly Pro Ser
        115                 120                 125

Val Phe Pro Leu Ala Pro Ser Ser Lys Ser Thr Ser Gly Gly Thr Ala
    130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
        195                 200                 205

Lys Pro Ser Asn Thr Lys Val Asp Lys Lys Val Glu Pro Lys Ser Cys
    210                 215                 220

Asp Gly Gly Gly Ser Gly Gly Gly Ser Glu Val Gln Leu Leu
225                 230                 235                 240

Glu Ser Gly Gly Gly Leu Val Gln Pro Gly Gly Ser Leu Arg Leu Ser
                245                 250                 255

Cys Ala Ala Ser Gly Phe Thr Phe Ser Thr Tyr Ala Met Asn Trp Val
            260                 265                 270

Arg Gln Ala Pro Gly Lys Gly Leu Glu Trp Val Ser Arg Ile Arg Ser
        275                 280                 285

Lys Tyr Asn Asn Tyr Ala Thr Tyr Tyr Ala Asp Ser Val Lys Gly Arg
    290                 295                 300

Phe Thr Ile Ser Arg Asp Asp Ser Lys Asn Thr Leu Tyr Leu Gln Met
305                 310                 315                 320

Asn Ser Leu Arg Ala Glu Asp Thr Ala Val Tyr Tyr Cys Val Arg His
                325                 330                 335

Gly Asn Phe Gly Asn Ser Tyr Val Ser Trp Phe Ala Tyr Trp Gly Gln
            340                 345                 350

Gly Thr Leu Val Thr Val Ser Ser Ala Ser Val Ala Ala Pro Ser Val
        355                 360                 365
```

```
Phe Ile Phe Pro Pro Ser Asp Glu Gln Leu Lys Ser Gly Thr Ala Ser
        370                 375                 380

Val Val Cys Leu Leu Asn Asn Phe Tyr Pro Arg Glu Ala Lys Val Gln
385                 390                 395                 400

Trp Lys Val Asp Asn Ala Leu Gln Ser Gly Asn Ser Gln Glu Ser Val
                405                 410                 415

Thr Glu Gln Asp Ser Lys Asp Ser Thr Tyr Ser Leu Ser Ser Thr Leu
            420                 425                 430

Thr Leu Ser Lys Ala Asp Tyr Glu Lys His Lys Val Tyr Ala Cys Glu
        435                 440                 445

Val Thr His Gln Gly Leu Ser Ser Pro Val Thr Lys Ser Phe Asn Arg
450                 455                 460

Gly Glu Cys Asp Lys Thr His Thr Cys Pro Pro Cys Pro Ala Pro Glu
465                 470                 475                 480

Ala Ala Gly Gly Pro Ser Val Phe Leu Phe Pro Pro Lys Pro Lys Asp
                485                 490                 495

Thr Leu Met Ile Ser Arg Thr Pro Glu Val Thr Cys Val Val Val Asp
            500                 505                 510

Val Ser His Glu Asp Pro Glu Val Lys Phe Asn Trp Tyr Val Asp Gly
        515                 520                 525

Val Glu Val His Asn Ala Lys Thr Lys Pro Arg Glu Glu Gln Tyr Asn
530                 535                 540

Ser Thr Tyr Arg Val Val Ser Val Leu Thr Val Leu His Gln Asp Trp
545                 550                 555                 560

Leu Asn Gly Lys Glu Tyr Lys Cys Lys Val Ser Asn Lys Ala Leu Gly
                565                 570                 575

Ala Pro Ile Glu Lys Thr Ile Ser Lys Ala Lys Gly Gln Pro Arg Glu
            580                 585                 590

Pro Gln Val Tyr Thr Leu Pro Pro Cys Arg Asp Glu Leu Thr Lys Asn
        595                 600                 605

Gln Val Ser Leu Trp Cys Leu Val Lys Gly Phe Tyr Pro Ser Asp Ile
610                 615                 620

Ala Val Glu Trp Glu Ser Asn Gly Gln Pro Glu Asn Asn Tyr Lys Thr
625                 630                 635                 640

Thr Pro Pro Val Leu Asp Ser Asp Gly Ser Phe Phe Leu Tyr Ser Lys
                645                 650                 655

Leu Thr Val Asp Lys Ser Arg Trp Gln Gln Gly Asn Val Phe Ser Cys
            660                 665                 670

Ser Val Met His Glu Ala Leu His Asn His Tyr Thr Gln Lys Ser Leu
        675                 680                 685

Ser Leu Ser Pro Gly Lys
    690

<210> SEQ ID NO 33
<211> LENGTH: 214
<212> TYPE: PRT
<213> ORGANISM: artificial
<220> FEATURE:
<223> OTHER INFORMATION: 10636L\cibisatamab\Humanized

<400> SEQUENCE: 33

Gln Ala Val Val Thr Gln Glu Pro Ser Leu Thr Val Ser Pro Gly Gly
1               5                   10                  15

Thr Val Thr Leu Thr Cys Gly Ser Ser Thr Gly Ala Val Thr Thr Ser
            20                  25                  30
```

Asn Tyr Ala Asn Trp Val Gln Glu Lys Pro Gly Gln Ala Phe Arg Gly
                35                  40                  45

Leu Ile Gly Gly Thr Asn Lys Arg Ala Pro Gly Thr Pro Ala Arg Phe
 50                  55                  60

Ser Gly Ser Leu Leu Gly Gly Lys Ala Ala Leu Thr Leu Ser Gly Ala
 65                  70                  75                  80

Gln Pro Glu Asp Glu Ala Glu Tyr Tyr Cys Ala Leu Trp Tyr Ser Asn
                 85                  90                  95

Leu Trp Val Phe Gly Gly Gly Thr Lys Leu Thr Val Leu Ser Ser Ala
                100                 105                 110

Ser Thr Lys Gly Pro Ser Val Phe Pro Leu Ala Pro Ser Ser Lys Ser
                115                 120                 125

Thr Ser Gly Gly Thr Ala Ala Leu Gly Cys Leu Val Lys Asp Tyr Phe
130                 135                 140

Pro Glu Pro Val Thr Val Ser Trp Asn Ser Gly Ala Leu Thr Ser Gly
145                 150                 155                 160

Val His Thr Phe Pro Ala Val Leu Gln Ser Ser Gly Leu Tyr Ser Leu
                165                 170                 175

Ser Ser Val Val Thr Val Pro Ser Ser Ser Leu Gly Thr Gln Thr Tyr
                180                 185                 190

Ile Cys Asn Val Asn His Lys Pro Ser Asn Thr Lys Val Asp Lys Lys
        195                 200                 205

Val Glu Pro Lys Ser Cys
        210

<210> SEQ ID NO 34
<211> LENGTH: 451
<212> TYPE: PRT
<213> ORGANISM: artificial
<220> FEATURE:
<223> OTHER INFORMATION: 10636M\cibisatamab\Humanized

<400> SEQUENCE: 34

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Glu Phe
                20                  25                  30

Gly Met Asn Trp Val Arg Gln Ala Pro Gly Gln Gly Leu Glu Trp Met
            35                  40                  45

Gly Trp Ile Asn Thr Lys Thr Gly Glu Ala Thr Tyr Val Glu Glu Phe
    50                  55                  60

Lys Gly Arg Val Thr Phe Thr Thr Asp Thr Ser Thr Ser Thr Ala Tyr
65                  70                  75                  80

Met Glu Leu Arg Ser Leu Arg Ser Asp Asp Thr Ala Val Tyr Tyr Cys
                85                  90                  95

Ala Arg Trp Asp Phe Ala Tyr Tyr Val Glu Ala Met Asp Tyr Trp Gly
            100                 105                 110

Gln Gly Thr Thr Val Thr Val Ser Ser Ala Ser Thr Lys Gly Pro Ser
        115                 120                 125

Val Phe Pro Leu Ala Pro Ser Ser Lys Ser Thr Ser Gly Gly Thr Ala
    130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

-continued

Val Leu Gln Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
        195                 200                 205

Lys Pro Ser Asn Thr Lys Val Asp Lys Lys Val Glu Pro Lys Ser Cys
    210                 215                 220

Asp Lys Thr His Thr Cys Pro Pro Cys Pro Ala Pro Glu Ala Ala Gly
225                 230                 235                 240

Gly Pro Ser Val Phe Leu Phe Pro Pro Lys Pro Lys Asp Thr Leu Met
            245                 250                 255

Ile Ser Arg Thr Pro Glu Val Thr Cys Val Val Val Asp Val Ser His
        260                 265                 270

Glu Asp Pro Glu Val Lys Phe Asn Trp Tyr Val Asp Gly Val Glu Val
    275                 280                 285

His Asn Ala Lys Thr Lys Pro Arg Glu Glu Gln Tyr Asn Ser Thr Tyr
290                 295                 300

Arg Val Val Ser Val Leu Thr Val Leu His Gln Asp Trp Leu Asn Gly
305                 310                 315                 320

Lys Glu Tyr Lys Cys Lys Val Ser Asn Lys Ala Leu Gly Ala Pro Ile
            325                 330                 335

Glu Lys Thr Ile Ser Lys Ala Lys Gly Gln Pro Arg Glu Pro Gln Val
        340                 345                 350

Cys Thr Leu Pro Pro Ser Arg Asp Glu Leu Thr Lys Asn Gln Val Ser
    355                 360                 365

Leu Ser Cys Ala Val Lys Gly Phe Tyr Pro Ser Asp Ile Ala Val Glu
370                 375                 380

Trp Glu Ser Asn Gly Gln Pro Glu Asn Asn Tyr Lys Thr Thr Pro Pro
385                 390                 395                 400

Val Leu Asp Ser Asp Gly Ser Phe Phe Leu Val Ser Lys Leu Thr Val
            405                 410                 415

Asp Lys Ser Arg Trp Gln Gln Gly Asn Val Phe Ser Cys Ser Val Met
        420                 425                 430

His Glu Ala Leu His Asn His Tyr Thr Gln Lys Ser Leu Ser Leu Ser
    435                 440                 445

Pro Gly Lys
    450

<210> SEQ ID NO 35
<211> LENGTH: 215
<212> TYPE: PRT
<213> ORGANISM: artificial
<220> FEATURE:
<223> OTHER INFORMATION: 10636N\cibisatamab\Humanized

<400> SEQUENCE: 35

Asp Ile Gln Met Thr Gln Ser Pro Ser Ser Leu Ser Ala Ser Val Gly
1               5                   10                  15

Asp Arg Val Thr Ile Thr Cys Lys Ala Ser Ala Ala Val Gly Thr Tyr
            20                  25                  30

Val Ala Trp Tyr Gln Gln Lys Pro Gly Lys Ala Pro Lys Leu Leu Ile
        35                  40                  45

Tyr Ser Ala Ser Tyr Arg Lys Arg Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

-continued

```
Glu Asp Phe Ala Thr Tyr Tyr Cys His Gln Tyr Tyr Thr Tyr Pro Leu
                85                  90                  95

Phe Thr Phe Gly Gln Gly Thr Lys Leu Glu Ile Lys Arg Thr Val Ala
            100                 105                 110

Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215
```

OPTIMIZED ANTI-CD3 ARM IN THE GENERATION OF T-CELL BISPECIFIC ANTIBODIES FOR IMMUNOTHERAPY

CROSS-REFERENCE TO RELATED APPLICATIONS

This application is a National Stage Application under 35 U.S.C. § 371 and claims the benefit of International Application No. PCT/CN2020/136452, filed on Dec. 15, 2020, which claims the benefit of U.S. Provisional Patent Application No. 62/974,744, entitled "Optimized anti-CD3 arm in the generation of T-cell bispecific antibodies for immunotherapy", filed Dec. 20, 2019, and U.S. Provisional Patent Application No. 63/017,999, entitled "Optimized anti-CD3 arm in the generation of T-cell bispecific antibodies for immunotherapy" filed Apr. 30, 2020; the contents of each of which are herein incorporated by reference in their entirety.

SEQUENCE LISTING

This application contains a sequence listing which has been submitted electronically as ASCII format and is hereby incorporated by reference in its entirety. Said ASCII copy, created on Apr. 22, 2025, is named 48644-0009US1_ST25.txt, and is 48,858 bytes in size.

TECHNICAL FIELD

The present invention generally relates to bispecific antigen binding molecules for activating T cells. In addition, the present invention relates to polynucleotides encoding such CD3 binding fragment and bispecific antigen binding molecules, and vectors and host cells comprising such polynucleotides. The invention also relates to methods for producing the bispecific antigen binding molecules of the invention The invention further relates to methods of treating cancer in a subject in need thereof.

BACKGROUND

In recent years, immunotherapies utilizing T cell-specific antibodies have revolutionized cancer treatment. These bispecific antibodies recruit and redirect T-cells to attack tumor cells and have tremendous potential for the treatment of liquid and solid cancers (Labrijn A F, Janmaat M L, Reichert J M, Parren P W H I. Bispecific antibodies: a mechanistic review of the pipeline. Nature Reviews Drug Discovery 2019:18). There are several challenges in the development of bispecifics for solid tumors, including binding affinity, potency, tissue distribution, and toxicity. A high-affinity CD3 antibody could promote increased cytolytic synapse formation, thereby enhancing clearance of tumor cells. Earlier literature has shown toxicity concerns and fatal cytokine release syndrome (CRS) via polyclonal T cell activation driven by T-cell engager bispecific antibodies. CRS is thought to be caused by the overactivation of immune cells beyond the point where they can no longer be self-contained. Since cytokine release is intimately linked to T cell activation, high-affinity CD3 binding in the context of T cell-dependent bispecific antibodies leads to higher cytokine release. On the other hand, some evidence demonstrates that high CD3 binding affinity impairs tumor antigen-dependent tissue distribution of bispecific antibodies and increases the accumulation of bispecific antibodies in the T cell compartment. Therefore, the challenge is to find an optimal balance between potency and toxicity by manipulating the affinity of the anti-CD3 arm.

CEA is a cell surface glycoprotein with a molecular weight of ~180 kD, that has been extensively used as a clinical biomarker for gastrointestinal cancers. Overexpression of CEA has been observed in 90% of gastrointestinal malignancies, including colon, gastric, rectal, and pancreatic tumors: 70% of lung cancers: ~30-50% of breast cancers; and head-neck squamous cell carcinoma (HNSCC). Ectopic expression of CEA is proposed to promote tumor formation in epithelial, endothelial and immune cells, such as leukocytes and dendritic cells. High expression on several tumor types (but relatively low expression on non-malignant primary tissues) makes CEA an ideal target for therapeutic antibodies. In the Phase 1 clinical trial for Roche's RG7802 (CEA-TCB) bispecific antibody: 45% of patients showed either a partial response or a stabilization of disease when treated as monotherapy above 60 mg (Tabernero J, Melero I, Ros W, Argiles G, Marabelle A, Rodriguez-Ruiz M E, Albanell J, Calvo E, Moreno V, Cleary J M, et al. Phase Ia and Ib studies of the novel carcinoembryonic antigen (CEA) T-cell bispecific (CEA CD3 TCB) antibody as a single agent and in combination with atezolizumab: Preliminary efficacy and safety in patients with metastatic colorectal cancer (mCRC). Journal of Clinical Oncology 2017:35). However, Roche's RG7802 (CEA-TCB) still has many disadvantages, such as low response in patients while inducing high cytokine release syndrome.

In order to meet extensive clinical demands, this invention provides optimized anti-CD3 antibodies with reduced binding to CD3 on T cells and a novel bispecific format with an optimized anti-CD3 arm that displayed bivalent binding to tumor antigen and functionally monovalent binding towards CD3.

SUMMARY OF THE INVENTION

The present invention provides novel CD3 antigen binding fragments with particularly advantageous properties such as producibility, stability, binding affinity, biological activity, specific targeting of certain T cells, targeting efficiency, remaining tumor cell killing and reduced toxicity. The present invention also provides bispecific antigen binding molecules for activating T cells. In addition, the invention further provides methods of treating cancer in a subject in need thereof, comprising administering to the subject a pharmaceutical composition comprising the above said bispecific antigen binding molecules.

DESCRIPTION OF DRAWINGS

The novel features of the present invention are set forth with particularity in the appended claims. A better understanding of the features and advantages of the present invention are explained in the following detailed description in the embodiments and the sample presentation.

FIG. 14A-FIG. 14D showed comparison of binding affinity of Roche CEA-TCB and CEA/CD3OPT1a3b2b1 BsAb.

FIG. 14A. showed binding of Roche CEA-TCB and CEA/CD3 OPT1a3b2b1 BsAb (also referred to as Lead CEA/CD3) to human PBMC. FIG. 14B showed binding of Roche CEA-TCB and CEA/CD3 OPT1a3b2b1 BsAb to Jurkat cells. Cells were stained with serially diluted Roche CEA-TCB and CEA/CD3OPT1a3b2b1 BsAb or IgG control, followed by a PE-conjugated anti-human IgG ab. Mean fluorescence intensity (MFI) was determined by Flow cytometry. FIG. 14C showed binding of Roche CEA-TCB and CEA/CD3OPT1a3b2b1 BsAb to CEA expressing MKN-45 cells. FIG. 14D showed binding of Roche CEA-TCB and CEA/CD3OPT1a3b2b1 BsAb to CEA expressing LS-174T cells. Cells were stained with serially diluted Roche CEA-TCB and CEA/CD3OPT1a3b2b1BsAb or IgG control, followed by a PE-conjugated anti-human IgG Ab. Mean fluorescence intensity (MFI) was determined by Flow cytometry.

FIG. 15A showed the antitumor effect of Roche CEA-TCB and CEA/CD3 OPT1a3b2b1 BsAb (also referred to as Lead CEA/CD3) activated T cell against MKN-45 tumor cells. MKN-45 target cells were harvested, counted and seeded in 96-well plates. Effector PBMCs were added to each well in a proportion of 20:1 in RPMI1640. Serial dilutions of the indicated antibodies were performed in PRMI1640 medium and added to the target/effector-containing well. The plates were incubated for 48 hours, and Luciferase intensity was determined. FIG. 15B. to FIG. 15F: the supernatants from coculture of MKN-45 and PBMCs were collected and INF-γ (FIG. 15B), TNF-α (FIG. 15C), IL-2 (FIG. 15D), IL-6 (FIG. 15E), and IL-10 (FIG. 15F) were determined by ELISA assay.

FIG. 18A-FIG. 18B showed CEA/CD3 induced potent T-cell mediated killing of tumor cells in vivo. FIG. 18A showed a humanized NSG model for in vivo efficacy testing of CEA/CD3 bispecific antibodies. Female NSG mice were inoculated with mixture of human PBMCs and LS-174T tumor cells. The mice were treated with 1 mg/kg or 3 mg/kg (per mouse) doses of indicated CEA/CD3 bispecific antibodies or vehicle at day 7 and then twice a week. The tumor growth was monitored. The study was terminated at day 24 after the tumor cells were grafted. FIG. 18B showed data for the tumor volume from each mice group.

FIG. 19A-FIG. 19B showed comparison of in vivo efficacy of Roche CEA-TCB and Luye CEA/CD3 BsAbs in the same xenograft humanized animal model. FIG. 19A showed the response of an individual mouse to the indicated antibodies and PBS control. FIG. 19B: This figure is quoted from Bacac et al., *A Novel Carcinoembryonic Antigen T-Cell Bispecific Antibody (CEA TCB) for the Treatment of Solid*

Figure 1:
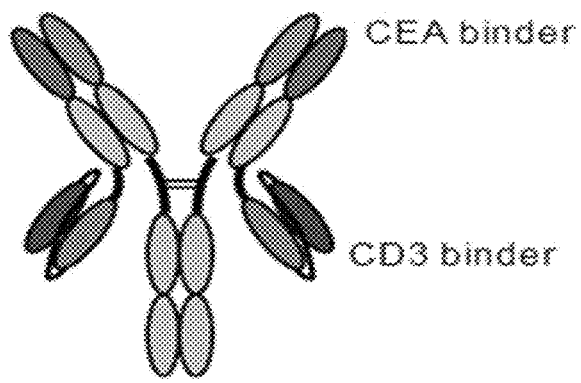
FIG. 1 shows the illustration of CEA/CD3 bispecific antibody structure. Anti-CD3 sequence is linked to the C-terminus of anti-CEA light chain. That Anti-CD3 sequence contains key point mutations that abrogate binding of Fc receptors (FcγR, FcR) abolishing antibody-dependent cellular cytotoxicity (ADCC) and complement-dependent cytotoxicity (CDC) effector function.

*Tumors*, Clin Cancer Res: 22(13) Jul. 1, 2016 at 3292 (FIG. 4), which showed the response of an individual mouse to Roche CEA-TCB.

GENERAL DEFINITIONS

Unless defined otherwise, technical and scientific terms used herein have the same meaning as generally used in the art to which this invention belongs. For purposes of interpreting this specification, the following definitions will apply and whenever appropriate, terms used in the singular will also include the plural and vice versa. As used herein and in the appended claims, the singular forms "a", "an", and "the" also refer to the plural forms unless the context clearly dictates otherwise, e.g., reference to "a host cell" includes a plurality of such host cells.

As used herein, the term "antigen binding fragment" or "antigen binding molecule" refers in its broadest sense to a molecule that specifically binds an antigenic determinant. Examples of antigen binding molecules are antibodies, antibody fragments and scaffold antigen binding proteins. The term "antibody" herein is used in the broadest sense and encompasses various antibody structures, including but not limited to monoclonal antibodies, polyclonal antibodies, monospecific and multispecific antibodies (e.g., bispecific antibodies), and antibody fragments so long as they exhibit the desired antigen-binding activity.

The term "antibody" as used herein refers to an antibody obtained from a population of substantially homogeneous antibodies, i.e., the individual antibodies comprising the population are identical and/or bind the same epitope, except for possible variant antibodies, e.g. containing naturally occurring mutations or arising during production of a monoclonal antibody preparation, such variants generally being present in minor amounts. In contrast to polyclonal antibody preparations, which typically include different antibodies directed against different determinants (epitopes), each monoclonal antibody of a monoclonal antibody preparation is directed against a single determinant on an antigen.

The term "bispecific" means that the antibody is able to specifically bind to at least two distinct antigenic determinants, for example two binding sites each formed by a pair of an antibody heavy chain variable domain (VH) and an antibody light chain variable domain (VL) binding to different antigens or to different epitopes on the same antigen. Such a bispecific antibody is a 1+1 format. Other bispecific antibody formats are 2+1 formats (comprising two binding sites for a first antigen or epitope and one binding site for a second antigen or epitope) or 2+2 formats (comprising two binding sites for a first antigen or epitope and two binding sites for a second antigen or epitope). Typically, a bispecific antibody comprises two antigen binding sites, each of which is specific for a different antigenic determinant. The term "valent" as used within the current application denotes the presence of a specified number of binding domains in an antigen binding molecule. As such, the terms "bivalent", "tetravalent", and "hexavalent" denote the presence of two binding domain, four binding domains, and six binding domains, respectively, in an antigen binding molecule. The bispecific antibodies according to the invention are at least "bivalent" and may be "trivalent" or "multivalent" (e.g. "tetravalent" or "hexavalent"). In a particular aspect, the antibodies of the present invention have two or more binding sites and are bispecific. That is, the antibodies may be bispecific even in cases where there are more than two binding sites (i.e. that the antibody is trivalent or multivalent). The terms "full length antibody", "intact antibody", and "whole antibody" are used herein interchangeably to refer to an antibody having a structure substantially similar to a native antibody structure. "Native antibodies" refer to naturally occurring immunoglobulin molecules with varying structures. For example, native IgG-class antibodies are hetero-tetrameric glycoproteins of about 150,000 daltons, composed of two light chains and two heavy chains that are disulfide-bonded. From N- to C-terminus, each heavy chain has a variable region (VH), also called a variable heavy domain or a heavy chain variable domain, followed by three constant domains (CH1, CH2, and CH3), also called a heavy chain constant region. Similarly, from N- to C-terminus, each light chain has a variable region (VL), also called a variable light domain or a light chain variable domain, followed by a light chain constant domain (CL), also called a light chain constant region. The heavy chain of an antibody may be assigned to one of five types, called α (IgA), δ (IgD), ε (IgE), γ (IgG), or μ (IgM), some of which may be further divided into subtypes, e.g., γ1 (IgG1), γ2 (IgG2), γ3 (IgG3), γ4 (IgG4), α1 (IgA1) and α2 (IgA2). The light chain of an antibody may be assigned to one of two types, called kappa (κ) and lambda (λ), based on the amino acid sequence of its constant domain. An "antibody fragment" refers to a molecule other than an intact antibody that comprises a portion of an intact antibody that binds the antigen to which the intact antibody binds. Examples of antibody fragments include but are not limited to Fv, Fab, Fab', Fab'-SH, F(ab')2; diabodies, triabodies, tetrabodies, cross-Fab fragments; linear antibodies; single-chain antibody molecules (e.g. scFv); multispecific antibodies formed from antibody fragments and single domain antibodies. For a review of certain antibody fragments, see Hudson et al., Nat Med 9, 129-134 (2003). For a review of scFv fragments, see e.g. Pliickthun, in The Pharmacology of Monoclonal Antibodies, vol. 113. Rosenburg and Moore eds., Springer-Verlag, New York. pp. 269-315 (1994); see also WO 93/16185; and U.S. Pat. Nos. 5,571,894 and 5,587,458. For discussion of Fab and F(ab')2 fragments comprising salvage receptor binding epitope residues and having increased in vivo half-life, see U.S. Pat. No. 5,869,046. Diabodies are antibody fragments with two antigen binding domains that may be bivalent or bispecific, see, for example, EP 404,097; WO 1993/01161; Hudson et al., Nat Med 9, 129-134 (2003); and Hollinger et al., Proc Natl Acad Sci USA 90, 6444-6448 (1993). Triabodies and tetrabodies are also described in Hudson et al., Nat Med 9, 129-134 (2003). Single-domain antibodies are antibody fragments comprising all or a portion of the heavy chain variable domain or all or a portion of the light chain variable domain of an antibody. In certain embodiments, a single-domain antibody is a human single-domain antibody (Domantis, Inc., Waltham, M A; see e.g. U.S. Pat. No. 6,248,516 B1). In addition, antibody fragments comprise single chain polypeptides having the characteristics of a VH domain, namely being able to assemble together with a VL domain, or of a VL domain, namely being able to assemble together with a VH domain to a functional antigen binding site and thereby providing the antigen binding property of full length antibodies. Antibody fragments can be made by various techniques, including but not limited to proteolytic digestion of an intact antibody as well as production by recombinant host cells (e.g. *E. coli* or phage), as described herein. Papain digestion of intact antibodies produces two identical antigen-binding fragments, called "Fab" fragments containing each the heavy- and light-chain variable domains and also the constant domain of the light chain and the first constant domain (CHI) of the heavy chain. As used herein. Thus, the term "Fab fragment" refers to an antibody fragment comprising a light chain fragment comprising a VL domain and a constant domain of a light chain (CL), and a VH domain and a first constant domain (CHI) of a heavy chain. Fab' fragments differ from Fab fragments by the addition of a few residues at the carboxy terminus of the heavy chain CHI domain including one or more cysteines from the antibody hinge region. Fab'-SH are Fab' fragments wherein the cysteine residue(s) of the constant domains bear a free thiol group. Pepsin treatment yields an F(ab')2fragment that has two antigen-combining sites (two Fab fragments) and a part of the Fc region.

A "single-chain variable fragment (scFv)" is a fusion protein of the variable regions of the heavy (VH) and light chains (VL) of an antibody, connected with a short linker peptide of ten to about 25 amino acids. The linker is usually rich in glycine for flexibility, as well as serine or threonine for solubility, and can either connect the N-terminus of the VH with the C-terminus of the VL, or vice versa. This protein retains the specificity of the original antibody, despite removal of the constant regions and the introduction of the linker, scFv antibodies are, e.g. described in Houston, J. S., Methods in Enzymol. 203 (1991) 46-96). In addition, antibody fragments comprise single chain polypeptides having the characteristics of a VH domain, namely being able to assemble together with a VL domain, or of a VL domain, namely being able to assemble together with a VH domain to a functional antigen binding site and thereby providing the antigen binding property of full length antibodies.

By "specific binding" it is meant that the binding is selective for the antigen and can be discriminated from unwanted or non-specific interactions. The ability of an antigen binding molecule to bind to a specific antigen can be measured either through an enzyme-linked immunosorbent assay (ELISA) or other techniques familiar to one of skill in the art. e.g. Surface Plasmon Resonance (SPR) technique (analyzed on a BIAcore instrument) (Liljeblad et al., Glyco J 17, 323-329 (2000)), and traditional binding assays (Heeley. Endocr Res 28, 217-229 (2002)). In one embodiment, the extent of binding of an antigen binding molecule to an unrelated protein is less than about 10% of the binding of the antigen binding molecule to the antigen as measured. e.g. by SPR. In certain embodiments, an molecule that binds to the antigen has a dissociation constant (Kd) of <1 µM, <100 nM, <10 nM, <1 nM, <0.1 nM, <0.01 nM, or <0.001 nM (e.g. $10^{-7}$ M or less. e.g. from $10^{-7}$M to $10^{-13}$ M, e.g. from $10^{-9}$ M to $10^{-13}$ M).

"Affinity" or "binding affinity" refers to the strength of the sum total of non-covalent interactions between a single binding site of a molecule (e.g. an antibody) and its binding partner (e.g. an antigen). Unless indicated otherwise, as used herein. "binding affinity" refers to intrinsic binding affinity which reflects a 1:1 interaction between members of a binding pair (e.g. antibody and antigen). The affinity of a molecule X for its partner Y can generally be represented by the dissociation constant (Kd), which is the ratio of dissociation and association rate constants ($k_{off}$ and $k_{on}$, respectively). Thus, equivalent affinities may comprise different rate constants, as long as the ratio of the rate constants remains the same. Affinity can be measured by common methods known in the art, including those described herein. A particular method for measuring affinity is Surface Plasmon Resonance (SPR). As used herein, the term "high affinity" of an antibody refers to an antibody having a Kd of $10^{-9}$ M or less and even more particularly $10^{-10}$ M or less for a target antigen. The term "low affinity" of an antibody refers to an antibody having a Kd of $10^{-8}$ or higher.

The term "variable region" or "variable domain" refers to the domain of an antibody heavy or light chain that is involved in binding the antigen binding molecule to antigen. The variable domains of the heavy chain and light chain (VH and VL, respectively) of a native antibody generally have similar structures, with each domain comprising four conserved framework regions (FRs) and three hypervariable regions (HVRs). See, e.g., Kindt et al., Kuby Immunology, 6th ed., W.H. Freeman and Co., page 91 (2007). A single VH or VL domain may be sufficient to confer antigen-binding specificity:

Hypervariable regions (HVRs) are also referred to as complementarity determining regions (CDRs), and these terms are used herein interchangeably in reference to portions of the variable region that form the antigen binding regions. This particular region has been described by Kabat et al., U.S. Dept. of Health and Human Services. "Sequences of Proteins of Immunological Interest" (1983) and by Chothia et al., J. Mol. Biol. 196:901-917 (1987), where the definitions include overlapping or subsets of amino acid residues when compared against each other. Nevertheless, application of either definition to refer to a CDR of an antibody or variants thereof is intended to be within the scope of the term as defined and used herein. The appropriate amino acid residues which encompass the CDRs as defined by each of the above cited references are set forth below in Table A as a comparison. The exact residue numbers which encompass a particular CDR will vary depending on the sequence and size of the CDR. Those skilled in the art can routinely determine which residues comprise a particular CDR given the variable region amino acid sequence of the antibody.

Kabat et al. also defined a numbering system for variable region sequences that is applicable to any antibody. One of ordinary skill in the art can unambiguously assign this system of "Kabat numbering" to any variable region sequence, without reliance on any experimental data beyond the sequence itself. As used herein. "Kabat numbering" refers to the numbering system set forth by Kabat et al., U.S. Dept. of Health and Human Services, "Sequence of Proteins of Immunological Interest" (1983). Unless otherwise specified, references to the numbering of specific amino acid residue positions in an antibody variable region are according to the Kabat numbering system. With the exception of CDR 1 in VH. CDRs generally comprise the amino acid residues that form the hypervariable loops. CDRs also comprise "specificity determining residues." or "SDRs," which are residues that contact antigen. SDRs are contained within regions of the CDRs called abbreviated-CDRs, or a-CDRs. Exemplary a-CDRs (a-CDR-L1, a-CDR-L2, a-CDR-L3, a-CDR-H1, a-CDR-H2, and a-CDR-H3) occur at amino acid residues 31-34 of LI, 50-55 of L2, 89-96 of L3, 31-35B of HI, 50-58 of H2, and 95-102 of H3. (See Almagro and Fransson, Front. Biosci. 13:1619-1633 (2008).) Unless otherwise indicated, HVR residues and other residues in the variable domain (e.g., FR residues) are numbered herein according to Kabat et al.

"Framework" or "FR" refers to variable domain residues other than hypervariable region (HVR) residues. The FR of a variable domain generally consists of four FR domains: FR1, FR2, FR3, and FR4. Accordingly: the HVR and FR sequences generally appear in the following sequence in VH (or VL): FR1-H1(L1)-FR2-H2(L2)-FR3-H3(L3)-FR4.

An acceptor human framework "derived from" a human immunoglobulin framework or a human consensus framework may comprise the same amino acid sequence thereof, or it may contain amino acid sequence changes. In some embodiments, the number of amino acid changes are 10 or less, 9 or less, 8 or less, 7 or less, 6 or less, 5 or less, 4 or less, 3 or less, or 2 or less. In some embodiments, the VL acceptor human framework is identical in sequence to the VL human immunoglobulin framework sequence or human consensus framework sequence.

By "fused to" or "connected to" is meant that the components (e.g. an antigen binding domain and a FC domain) are linked by peptide bonds, either directly or via one or more peptide linkers.

The terms "host cell", "host cell line," and "host cell culture" are used interchangeably and refer to cells into which exogenous nucleic acid has been introduced, including the progeny of such cells. Host cells include "transformants" and "transformed cells," which include the primary transformed cell and progeny derived therefrom without regard to the number of passages.

A "therapeutically effective amount" of an agent, e.g. a pharmaceutical composition, refers to an amount effective, at dosages and for periods of time necessary, to achieve the desired therapeutic or prophylactic result. A therapeutically effective amount of an agent for example eliminates, decreases, delays, minimizes or prevents adverse effects of a disease.

An "individual" or "subject" is a mammal. Mammals include, but are not limited to, domesticated animals (e.g. cows, sheep, cats, dogs, and horses), primates (e.g. humans and non-human primates such as monkeys), rabbits, and rodents (e.g. mice and rats). Particularly, the individual or subject is a human. The term "pharmaceutical composition" refers to a preparation which is in such form as to permit the biological activity of an active ingredient contained therein to be effective, and which contains no additional components which are unacceptably toxic to a subject to which the formulation would be administered. A "pharmaceutically acceptable excipient" refers to an ingredient in a pharmaceutical composition, other than an active ingredient, which is nontoxic to a subject. A pharmaceutically acceptable excipient includes, but is not limited to, a buffer, a stabilizer, or a preservative.

As used herein, "treatment" (and grammatical variations thereof such as "treat" or "treating") refers to clinical intervention in an attempt to alter the natural course of the individual being treated, and can be performed either for prophylaxis or during the course of clinical pathology. Desirable effects of treatment include, but are not limited to, preventing occurrence or recurrence of disease, alleviation of symptoms, diminishment of any direct or indirect pathological consequences of the disease, preventing metastasis, decreasing the rate of disease progression, amelioration or palliation of the disease state, and remission or improved prognosis. In some embodiments, the molecules of the invention are used to delay development of a disease or to slow the progression of a disease.

The term "cancer" as used herein refers to proliferative diseases, such as lymphomas, lymphocytic leukemias, lung cancer, non-small cell lung (NSCL) cancer, bronchioloalviolar cell lung cancer, bone cancer, pancreatic cancer, skin cancer, cancer of the head or neck, cutaneous or intraocular melanoma, uterine cancer, ovarian cancer, rectal cancer, cancer of the anal region, stomach cancer, gastric cancer, colon cancer, breast cancer, uterine cancer, carcinoma of the fallopian tubes, carcinoma of the endometrium, carcinoma of the cervix, carcinoma of the vagina, carcinoma of the vulva, Hodgkin's Disease, cancer of the esophagus, cancer of the small intestine, cancer of the endocrine system, cancer of the thyroid gland, cancer of the parathyroid gland, cancer of the adrenal gland, sarcoma of soft tissue, cancer of the urethra, cancer of the penis, prostate cancer, cancer of the bladder, cancer of the kidney or ureter, renal cell carcinoma, carcinoma of the renal pelvis, mesothelioma, hepatocellular cancer, biliary cancer, neoplasms of the central nervous system (CNS), spinal axis tumors, brain stem glioma, glioblastoma multiforme, astrocytomas, schwanomas, ependymonas, medulloblastomas, meningiomas, squamous cell carcinomas, pituitary adenoma and Ewings sarcoma, including refractory versions of any of the above cancers, or a combination of one or more of the above cancers.

DETAILED DESCRIPTION

The present invention provides novel CD3 antigen binding fragments with particularly advantageous properties such as producibility, stability, binding affinity, biological activity, specific targeting of certain T cells, targeting efficiency, remaining tumor cell killing and reduced toxicity.

In one embodiment, the CD3 antigen binding fragment comprises a heavy chain variable region (VH domain), wherein the VH domain comprises a modified version of SEQ ID NO: 1 having one or more mutations selected from Q13K, K83R, L108T, N30S, K31T, F98W, K52bN and Y58T, wherein said numbering is in Kabat number.

In one embodiment, the invention provides a CD3 antigen binding fragment, comprising a heavy chain variable region, wherein the VH domain comprises a modified version of SEQ ID NO: 1 having one or more mutations selected from N30S, K31T, F98W, K52bN, or Y58T, wherein said numbering is in Kabat number.

In one embodiment, the CD3 antigen binding fragment comprises a heavy chain variable region (VH domain), wherein the VH domain comprises a modified version of SEQ ID NO: 1 having mutations of N30S, K31T and F98W, wherein said numbering is in Kabat number.

In one embodiment, the CD3 antigen binding fragment comprises a heavy chain variable region (VH domain), wherein the VH domain comprises a modified version of SEQ ID NO: 1 having mutations of N30S, K31T, F98W and K52bN, wherein said numbering is in Kabat number.

In one embodiment, the CD3 antigen binding fragment comprises a heavy chain variable region (VH domain), wherein the VH domain comprises a modified version of SEQ ID NO: 1 having mutations of N30S, K31T, F98W and Y58T, wherein said numbering is in Kabat number.

In one embodiment, the invention provides a CD3 antigen binding fragment, comprising a heavy chain variable region (VH domain), wherein the VH domain comprises a modified version of SEQ ID NO: 1 having one or more mutations selected from Q13K, K83R, and L108T, wherein said numbering is in Kabat number.

In one embodiment, the CD3 antigen binding fragment comprises a heavy chain variable region (VH domain), wherein the VH domain comprises a modified version of SEQ ID NO: 1 having mutations of Q13K, K83R, and L108T, wherein said numbering is in Kabat number.

In one embodiment, the CD3 antigen binding fragment comprises a heavy chain variable region (VH domain), wherein the VH domain comprises a modified version of SEQ ID NO: 1 having mutations of Q13K, K83R, L108T, N30S, K31T, F98W and K52bN, wherein said numbering is in Kabat number.

In one embodiment, the CD3 antigen binding fragment comprises a heavy chain variable region (VH domain), wherein the VH domain comprises a modified version of SEQ ID NO: 1 having mutations of Q13K, K83R, L108T, N30S, K31T, F98W and Y58T, wherein said numbering is in Kabat number.

In a special embodiment, the CD3 antigen binding fragment further comprises a light chain variable region (VL domain), wherein the VL domain comprises SEQ ID NO: 2.

In a special embodiment, the CD3 antigen binding fragment further comprises a light chain variable region (VL domain), wherein the VL domain comprises SEQ ID NO: 4.

In one embodiment, the CD3 antigen binding fragment comprises a heavy chain variable region (VH domain) and a light chain variable region (VL domain), wherein the VH domain comprises a modified version of SEQ ID NO: 1 having mutations of Q13K, K83R, L108T, N30S, K31T, F98W and K52bN, wherein said numbering is in Kabat number, wherein the VL domain comprises SEQ ID NO: 2 or SEQ ID NO: 4.

In one embodiment, the CD3 antigen binding fragment comprises a heavy chain variable region (VH domain) and a light chain variable region (VL domain), wherein the VH domain comprises a modified version of SEQ ID NO: 1 having mutations of Q13K, K83R, L108T, N30S, K31T, F98W and Y58T, wherein said numbering is in Kabat number, wherein the VL domain comprises SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 3, and a light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 9, and a light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 10, and a light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 11, and a light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 12, and a light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a first heavy chain comprising an amino acid sequence with at least 95%, 96%, 97%, 98%, 99% or 100% sequence identity to the sequence of SEQ ID NO: 13, and a light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 14, and a first light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 15, and a first light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 16, and a light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 17, and a light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 18, and a light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 19, and a light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 20, and a light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 21, and a light chain comprising an amino acid sequence with at least 95%, 96%, 97%, 98%, 99% or 100% sequence identity to the sequence of SEQ ID NO: 2 or SEQ ID NO: 4.

In a special embodiment the CD3 antigen binding fragment comprises a heavy chain comprising an amino acid sequence with at least 95%, 96%, 97%, 98%, 99% or 100% sequence identity to the sequence of SEQ ID NO: 22, and a light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 23, and a light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 24, and a light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 25, and a light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 26, and a light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 27, and a light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 28, and a light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 29, and a light chain comprising an amino acid sequence with at least 95%, 96%, 97%, 98%, 99% or 100% sequence identity to the sequence of SEQ ID NO: 2 or SEQ ID NO: 4.

In a special embodiment, the CD3 antigen binding fragment comprises a heavy chain comprising an amino acid sequence with at least 95%, 96%, 97%, 98%, 99% or 100% sequence identity to the sequence of SEQ ID NO: 30, and a light chain comprising an amino acid sequence with at least 95%, 96%, 97%, 98%, 99% or 100% sequence identity to the sequence of SEQ ID NO: 2 or SEQ ID NO: 4.

In one aspect, any one of the above-mentioned CD3 antigen binding fragments are engineered CD3 antigen binding fragments.

The invention also provides novel bispecific antigen binding molecules comprising a first antigen binding domain and a second antigen binding domain that specifically binds to CD3, wherein the novel bispecific antigen binding molecules of the present invention have advantageous properties such as producibility, stability, binding affinity, biological activity, specific targeting of certain T cells, targeting efficiency, remaining tumor cell killing and reduced toxicity:

In one embodiment, the bispecific antigen binding molecules may be bispecific antibodies.

In one aspect, the second antigen binding domain comprises the above mentioned CD3 antigen binding fragments.

In one embodiment, the first antigen binding domain comprises two identical heavy chains and two identical light chains, and the second antigen binding domain comprises two identical CD3 antigen binding fragments, wherein each CD3 antigen binding fragment is selected from the above mentioned CD3 antigen binding fragments, and wherein each said light chain of the first antigen binding domain is fused to each said CD3 antigen binding fragment of the second antigen binding domain.

In one embodiment, the C-terminal of the constant region of each said light chain of the first antigen binding domain is fused to the N-terminal of the heavy chain variable region of each said CD3 antigen binding fragment of the second antigen binding domain directly or via a peptide linker such as GS linker, more specifically, the sequence GGGGSGGGGSGGGGS (SEQ ID NO: 31).

In one embodiment, the first antigen binding domain is an aglycosylated monoclonal antibody, and/or the CD3 antigen binding fragment is a scFv.

In one embodiment, said first antigen binding fragment is a CEA antigen binding fragment.

In one special embodiment, the CEA antigen binding fragment comprises a heavy chain variable region comprising SEQ ID NO: 5 and a light chain variable region comprising SEQ ID NO: 6.

In one special embodiment, the CEA antigen binding fragment comprises a heavy chain variable region comprising SEQ ID NO: 7 and a light chain variable region comprising SEQ ID NO: 8.

The invention also provides novel bispecific antigen binding molecules comprising a first antigen binding domain that specifically binds to CEA and a second antigen binding domain that specifically binds to CD3, wherein the novel bispecific antibodies of the present invention have advantageous properties such as producibility, stability, binding affinity, biological activity, specific targeting of certain T cells, targeting efficiency, remaining tumor cell killing and reduced toxicity.

In a particular embodiment, provided herein is a bispecific antigen binding molecule comprising a first antigen binding domain that specifically binds to CEA and a second antigen binding domain that specifically binds to CD3, wherein the first antigen binding domain specifically binding to CEA comprises a VH domain comprising the amino acid sequence of SEQ ID NO: 5 and a VL domain comprising the amino acid sequence of SEQ ID NO: 6, or a VH domain comprising the amino acid sequence of SEQ ID NO: 7 and a VL domain comprising the amino acid sequence of SEQ ID NO: 8, and wherein the second antigen binding domain specifically binding to CD3 comprises two identical CD3 antigen binding fragments, wherein each of the CD3 antigen binding fragments comprises a VH domain and a VL domain, wherein:

the VH domain comprises the amino acid sequence of SEQ ID NO: 1 and the VL domain comprises the amino acid sequence of SEQ ID NO: 2, or the VH domain comprises the amino acid sequence of SEQ ID NO: 3 and the VL domain comprises the amino acid sequence of SEQ ID NO: 2, or the VH domain comprises the amino acid sequence of SEQ ID NO: 3 and the VL domain comprises the amino acid sequence of SEQ ID NO: 4, or the VH domain comprises the amino acid sequence of SEQ ID NO: 9 and the VL domain comprises the amino acid sequence of SEQ ID NO: 2, or the VH domain comprises the amino acid sequence of SEQ ID NO: 9 and the VL domain comprises the amino acid sequence of SEQ ID NO: 4, or
the VH domain comprises the amino acid sequence of SEQ ID NO: 10 and the VL domain comprises the amino acid sequence of SEQ ID NO: 2, or
the VH domain comprises the amino acid sequence of SEQ ID NO: 10 and the VL domain comprises the amino acid sequence of SEQ ID NO: 4, or
the VH domain comprises the amino acid sequence of SEQ ID NO: 11 and the VL domain comprises the amino acid sequence of SEQ ID NO: 2, or
the VH domain comprises the amino acid sequence of SEQ ID NO: 11 and the VL domain comprises the amino acid sequence of SEQ ID NO: 4, or
the VH domain comprises the amino acid sequence of SEQ ID NO: 12 and the VL domain comprises the amino acid sequence of SEQ ID NO: 2, or
the VH domain comprises the amino acid sequence of SEQ ID NO: 12 and the VL domain comprises the amino acid sequence of SEQ ID NO: 4, or
the VH domain comprises the amino acid sequence of SEQ ID NO: 13 and the VL domain comprises the amino acid sequence of SEQ ID NO: 2, or
the VH domain comprises the amino acid sequence of SEQ ID NO: 13 and the VL domain comprises the amino acid sequence of SEQ ID NO: 4, or
the VH domain comprises the amino acid sequence of SEQ ID NO: 14 and the VL domain comprises the amino acid sequence of SEQ ID NO: 2, or
the VH domain comprises the amino acid sequence of SEQ ID NO: 14 and the VL domain comprises the amino acid sequence of SEQ ID NO: 4, or
the VH domain comprises the amino acid sequence of SEQ ID NO: 15 and the VL domain comprises the amino acid sequence of SEQ ID NO: 2, or
the VH domain comprises the amino acid sequence of SEQ ID NO: 15 and the VL domain comprises the amino acid sequence of SEQ ID NO: 4, or
the VH domain comprises the amino acid sequence of SEQ ID NO: 16 and the VL domain comprises the amino acid sequence of SEQ ID NO: 2, or
the VH domain comprises the amino acid sequence of SEQ ID NO: 16 and the VL domain comprises the amino acid sequence of SEQ ID NO: 4, or
the VH domain comprises the amino acid sequence of SEQ ID NO: 17 and the VL domain comprises the amino acid sequence of SEQ ID NO: 2, or
the VH domain comprises the amino acid sequence of SEQ ID NO: 17 and the VL domain comprises the amino acid sequence of SEQ ID NO: 4, or
the VH domain comprises the amino acid sequence of SEQ ID NO: 18 and the VL domain comprises the amino acid sequence of SEQ ID NO: 2, or
the VH domain comprises the amino acid sequence of SEQ ID NO: 18 and the VL domain comprises the amino acid sequence of SEQ ID NO: 4, or
the VH domain comprises the amino acid sequence of SEQ ID NO: 19 and the VL domain comprises the amino acid sequence of SEQ ID NO: 2, or
the VH domain comprises the amino acid sequence of SEQ ID NO: 19 and the VL domain comprises the amino acid sequence of SEQ ID NO: 4, or
the VH domain comprises the amino acid sequence of SEQ ID NO: 20 and the VL domain comprises the amino acid sequence of SEQ ID NO: 2, or
the VH domain comprises the amino acid sequence of SEQ ID NO: 20 and the VL domain comprises the amino acid sequence of SEQ ID NO: 4, or
the VH domain comprises the amino acid sequence of SEQ ID NO: 21 and the VL domain comprises the amino acid sequence of SEQ ID NO: 2, or
the VH domain comprises the amino acid sequence of SEQ ID NO: 21 and the VL domain comprises the amino acid sequence of SEQ ID NO: 4, or
the VH domain comprises the amino acid sequence of SEQ ID NO: 22 and the VL domain comprises the amino acid sequence of SEQ ID NO: 2, or
the VH domain comprises the amino acid sequence of SEQ ID NO: 22 and the VL domain comprises the amino acid sequence of SEQ ID NO: 4, or
the VH domain comprises the amino acid sequence of SEQ ID NO: 23 and the VL domain comprises the amino acid sequence of SEQ ID NO: 2, or
the VH domain comprises the amino acid sequence of SEQ ID NO: 23 and the VL domain comprises the amino acid sequence of SEQ ID NO: 4, or
the VH domain comprises the amino acid sequence of SEQ ID NO: 24 and the VL domain comprises the amino acid sequence of SEQ ID NO: 2, or
the VH domain comprises the amino acid sequence of SEQ ID NO: 24 and the VL domain comprises the amino acid sequence of SEQ ID NO: 4, or
the VH domain comprises the amino acid sequence of SEQ ID NO: 25 and the VL domain comprises the amino acid sequence of SEQ ID NO: 2, or
the VH domain comprises the amino acid sequence of SEQ ID NO: 25 and the VL domain comprises the amino acid sequence of SEQ ID NO: 4, or
the VH domain comprises the amino acid sequence of SEQ ID NO: 26 and the VL domain comprises the amino acid sequence of SEQ ID NO: 2, or
the VH domain comprises the amino acid sequence of SEQ ID NO: 26 and the VL domain comprises the amino acid sequence of SEQ ID NO: 4, or
the VH domain comprises the amino acid sequence of SEQ ID NO: 27 and the VL domain comprises the amino acid sequence of SEQ ID NO: 2, or
the VH domain comprises the amino acid sequence of SEQ ID NO: 27 and the VL domain comprises the amino acid sequence of SEQ ID NO: 4, or
the VH domain comprises the amino acid sequence of SEQ ID NO: 28 and the VL domain comprises the amino acid sequence of SEQ ID NO: 2, or
the VH domain comprises the amino acid sequence of SEQ ID NO: 28 and the VL domain comprises the amino acid sequence of SEQ ID NO: 4, or
the VH domain comprises the amino acid sequence of SEQ ID NO: 29 and the VL domain comprises the amino acid sequence of SEQ ID NO: 2, or
the VH domain comprises the amino acid sequence of SEQ ID NO: 29 and the VL domain comprises the amino acid sequence of SEQ ID NO: 4, or
the VH domain comprises the amino acid sequence of SEQ ID NO: 30 and the VL domain comprises the amino acid sequence of SEQ ID NO: 2, or
the VH domain comprises the amino acid sequence of SEQ ID NO: 30 and the VL domain comprises the amino acid sequence of SEQ ID NO: 4;
preferably, the first antigen binding domain comprises two identical heavy chains and two identical light chains, and the second antigen binding domain comprises two identical CD3 antigen binding fragments, wherein each said light chain of the first antigen binding domain is fused to each said CD3 antigen binding fragment of the second antigen binding domain; more preferably, the C-terminal of the constant region of each said light chain of the first antigen binding domain is fused to the N-terminal of the heavy chain variable region of each said CD3 antigen binding fragment of the second antigen binding domain directly or via a peptide linker.

In one embodiment, the invention also provides a bispecific antigen binding molecule comprising an aglycosylated monoclonal antibody that is an immunoglobulin that binds to CEA, said immunoglobulin comprising two identical heavy chains and two identical light chains, said light chains comprising a first light chain and a second light chain, wherein the first light chain is fused to a first single chain variable fragment (scFv), via a peptide linker, to create a first light chain fusion polypeptide, and wherein the second light chain is fused to a second scFv, via a peptide linker, to create a second light chain fusion polypeptide, wherein the first and second scFv (i) are identical, and (ii) bind to CD3, and wherein the first and second light chain fusion polypeptides are identical.

In one more specific embodiment, the C-terminal of the constant region of the first light chain is fused to the N-terminal of the heavy chain variable region of the first scFv directly or via a peptide linker, and the C-terminal of the constant region of the second light chain is fused to the N-terminal of the heavy chain variable region of the second scFv directly or via a peptide linker.

In one special embodiment, each of the first and second scFv comprises the above mentioned CD3 antigen binding fragment.

In one aspect, the bispecific antigen binding molecules may be bispecific antibodies.

In some embodiments, the bispecific antigen binding molecules provided herein bind to CEA and CD3.

In some embodiments, the bispecific antigen binding molecules provided herein mediate T cell killing of CEA expressing target cells, including but not limited to LS-174T, LoVo, MKN-45, KATO III, and HPAC target cells.

In some embodiments, the bispecific antigen binding molecules or the CD3 antigen binding fragments provided herein show reduced binding affinity with CD3.

In some embodiments, the bispecific antigen binding molecules or CD3 antigen binding fragments provided herein show reduced TCR signaling strength.

In some embodiments, the bispecific antigen binding molecules or CD3 antigen binding fragments provided herein show reduced cytokine release mediated by mutant CD3 binder variants.

In some embodiments, the bispecific antigen binding molecules or CD3 antigen binding fragments provided herein show tumor cell lysis to CEA-expressing tumor cells, including but not limited to LS-174T, LoVo, MKN-45, KATO III, and HPAC target cells.

In one aspect, provided herein is a pharmaceutical composition comprising any one of the above said the CD3 antigen binding fragment or bispecific antigen binding molecules.

In one embodiment, provided herein is a method of treating cancer in a subject in need thereof, comprising administering to the subject any one of the above said the CD3 antigen binding fragment or the above said bispecific antigen binding molecules.

In one embodiment, the cancer is a CEA-positive cancer.

In a specific embodiment, the cancer is colorectal cancer, gastric cancer, pancreatic cancer, or other gastrointestinal cancer.

In one embodiment, the invention further provides an isolated nucleic acid comprising the nucleic acid sequence encoding the above mentioned CD3 antigen binding fragments or the above said bispecific antigen binding molecules. In one embodiment, the invention further provides a vector comprising the above said nucleic acid sequence. In one embodiment, the invention further provides an isolated host cell comprising the above said nucleic acid or the above said vector. In one embodiment, the invention further provides a method of producing an antigen binding fragment or a bispecific antigen binding molecule, comprising culturing the above said host cell so that the antigen binding fragment or the bispecific antigen binding molecule is produced. In one special embodiment, the above method further comprising recovering the antigen binding fragment or the bispecific antigen binding molecule produced by the cell.

Definitions

For purposes of interpreting this specification, the following definitions will apply.

Definition of dual functional antibodies of different formats generated:

CEA/CD3 BsAbs (bispecific antibodies against human CEA and CD3), also referred to as Luye CEA/CD3 BsAbs.

CEA/CD3OPT1a (CEA/CD3 bispecific antibody incorporated with optimized CD3OPT1a variant).

CEA/CD3OPT1a3b (CEA/CD3 bispecific antibody incorporated with optimized CD3OPT1a3b variant).

CEA/CD3OPT1a3b2a (CEA/CD3 bispecific antibody incorporated with optimized CD3OPT1a3b2a variant).

CEA/CD3OPT1a3b2b1 (CEA/CD3 bispecific antibody incorporated with optimized CD31a3b2b1 variant), also referred to as Lead CEA/CD3.

The Components of Luye CEA/CD3 BsAbs

Table 1 shows the components of Luye CEA/CD3 BsAbs used in the following examples

TABLE 1

|  | CEA antibody | | CD3 scFv | |
| --- | --- | --- | --- | --- |
|  | VH | VL | VH | VL |
| CEA/CD3 parental | hT84.66 (SEQ ID NO: 5) | hT84.66 (SEQ ID NO: 6) | SP34 (SEQ ID NO: 1) | SP34 (SEQ ID NO: 2) |
| CEA/CD3OPT1a | hT84.66 (SEQ ID NO: 5) | hT84.66 (SEQ ID NO: 6) | OPTSP34 1a (SEQ ID NO: 15) | SP34 (SEQ ID NO: 2) |
| CEA/CD3OPT3b | hT84.66 (SEQ ID NO: 5) | hT84.66 (SEQ ID NO: 6) | OPT SP34 3b (SEQ ID NO: 22) | SP34 (SEQ ID NO: 2) |
| CEA/CD3OPT1a3b | hT84.66 (SEQ ID NO: 5) | hT84.66 (SEQ ID NO: 6) | OPT SP34 1a3b (SEQ ID NO: 23) | SP34 (SEQ ID NO: 2) |
| CEA/CD3OPT1a3b2a | hT84.66 (SEQ ID NO: 5) | hT84.66 (SEQ ID NO: 6) | OPT SP34 1a3b2a (SEQ ID NO: 24) | SP34 (SEQ ID NO: 2) |

TABLE 1-continued

|  | CEA antibody | | CD3 scFv | |
|---|---|---|---|---|
|  | VH | VL | VH | VL |
| CEA/CD3OPT1a3b2b1 | hT84.66 (SEQ ID NO: 5) | hT84.66 (SEQ ID NO: 6) | OPT SP34 1a3b2b1 (SEQ ID NO: 25) | SP34 (SEQ ID NO: 2) |
| CEA/CD3OPT1a3b2b2 | hT84.66 (SEQ ID NO: 5) | hT84.66 (SEQ ID NO: 6) | OPT SP34 1a3b2b2 (SEQ ID NO: 26) | OPT SP34 (SEQ ID NO: 4) |

Example 1

Construction of CEA/CD3 T-Cell Bispecific Antibody

Most T-cell bispecific antibodies developed so far utilized anti-CD3 moiety for T cell recruitment, and OKT3, UCHT1, SP34, and TR66 (June, et al., J. Immunol. 136:3945-3952 (1986); Yang, et al., J. Immunol. 137:1097-1100 (1986); and Hayward, et al., Immunol. 64:87-92 (1988)) are most commonly used as anti-CD3 arms. In order to further compare the characteristics of various CD3 binders in CEA-CD3 format, we generated CEA T-cell bispecific antibodies using the format of FIG. 1. SP34 and its variants were used as CD3 binding arms (CD 3 binder variants), and hT84.66 was used as a CEA binding arm (CEA binder variant). Optimized forms (i.e., OPT forms) of SP34 and hT84.66 were designed to stabilize the framework of scFv, to influence half-life, and to reduce aggregation (see Table 2).

TABLE 2

| Arms | VH/VL | Sequences | SEQ ID NO: |
|---|---|---|---|
| SP34 | VH | EVQLVESGGGLVQPGGSLKLSCAASGFTFNKY AMNWVRQAPGKGLEWVARIRSKYNNYATYYAD SVKDRFTISRDDSKNTAYLQMNNLKTEDTAVY YCVRHGNFGNSYISYWAYWGQGTLVTVSS | 1 |
|  | VL | QTVVTQEPSLTVSPGGTVTLTCGSSTGAVTSG YYPNWVQQKPGQAPRGLIGGTKFLAPGTPARF SGSLLGGKAALTLSGVQPEDEAEYYCALWYSN RWVFGGGTKLTVL | 2 |
| OPT SP34 | VH OPT | EVQLVESGGGLV<u>K</u>PGGSLKLSCAASGFTFNKY AMNWVRQAPGK<u>G</u>LEWVARIRSKYNNYATYYAD SVKDRFTISRDDSKNTAYLQMNN<u>LR</u>TEDTAVY YCVRHGNFGNSYISYWAYWGQGT<u>TV</u>TVSS | 3 |
|  | VL OPT | Q<u>SVL</u>TQ<u>PPS</u>V<u>SAA</u>PG<u>QR</u>V<u>TIS</u>C<u>SGS</u>TGAVTSG YYPN<u>W</u>Y<u>QQ</u>LPGTAPR<u>LL</u>IGGTKFLAPGTP<u>D</u>RF SGS<u>SKSTSAALAI</u>SG<u>V</u>QSEDEADYYCALW<u>Y</u>SN RWVFGGGTKLTV<u>LG</u> | 4 |
| hT84.66 | VH | EVQLVESGGGLVQPGGSLRLSCAASGFNIKDT YMHWVRQAPGKGLEWVARIDPA<u>QGNT</u>KYADSV KGRFTISADTSKNTAYLQMNSL<u>RAED</u>TAVYYC APFGYYVSDYAMAYWGQGTLVTVSS | 5 |
|  | VL | DIQLTQSPSSLSASVGDRVTITCRAGESVDIF GVGFLHWYQQKPGKAPKLLIYRASNLESGVPS RFSGSGSRTDFTLTISSLQPEDFATYYCQQTN EDPYTFGQGTKVEIK | 6 |

TABLE 2-continued

| Arms | VH/VL | Sequences | SEQ ID NO: |
|---|---|---|---|
| OPT hT84.66 | VH OPT | EVQLVESGGGLV<u>K</u>PGGSLRLSCAASGFNIKDT YMHWVRQAPGKGLEWVARIDPAQGNTKYADSV KGRFTISADTSKNTAYLQMNSLRAEDTAVYYC APFGYYVSDYAMAYWGQGT<u>TV</u>TVSS | 7 |
|  | VL OPT | DI<u>VL</u>TQSPSSLSAS<u>L</u>GDRVTITCRAGESVDIF GV<u>G</u>FLHWYQQKPGK<u>A</u>PKLLIYRASNLESGVPS RFSGSGS<u>G</u>TDFTLTISSLQPEDFATYYCQQTN YEDPTFG<u>G</u>GTKVEIKR | 8 |

Example 2

Figure 2A:
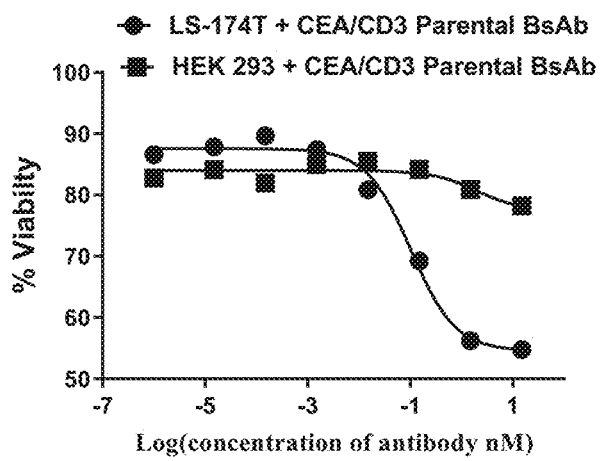
FIG. 2A showed CEA/CD3 parental BsAb mediated-cytotoxicity to CEA-expressing LS-174T tumor cells by activated PBMC.
Figure 2B:
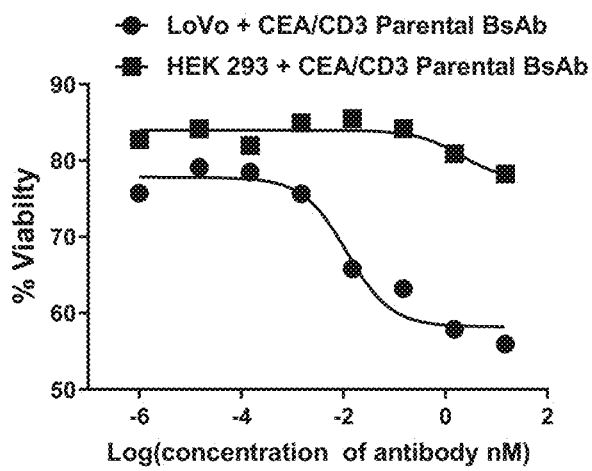
FIG. 2B showed CEA/CD3 parental BsAb mediated-cytotoxicity to CEA-expressing LoVo tumor cells by activated PBMC.
Figure 2C:
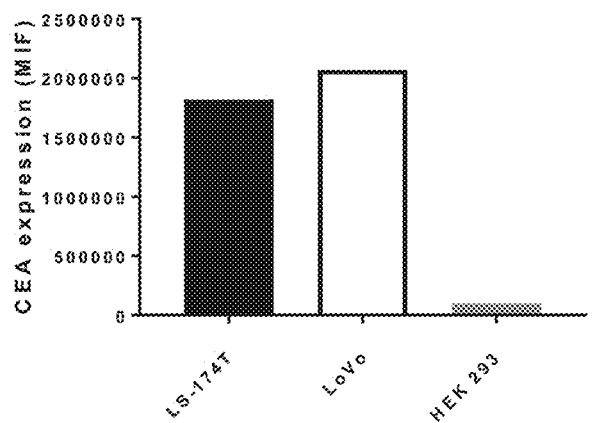
FIG. 2C showed CEA expression level of LS-174T, LoVo, and HEK cells.

CEA/CD3 Bispecific Antibody Mediates T Cell Killing of CEA Expressing Target Cells and Cytokine Release We examined the anti-tumor effect of CEA/CD3 bispecific antibody on different CEA-expressing tumor cells. Fresh human PBMCs were cultured with anti-CD3 and anti-CD28 in the presence of IL-2 (20 ng/ml) for 6 days. The cytotoxicity assays were performed at E/T (Effector:Target) ratio 10:1. The cytotoxicity mediated by different antibodies was assessed by LDH released from death tumor cells after 18 hour-incubation in serial dilution of testing antibodies. As shown in FIGS. 2A and 2B, hT84.66/SP34 bispecific antibody (referred to as CEA/CD3 parental BsAb, sequence listing in table 1) enhanced T cell redirected cytotoxicity of CEA expressing LS-174T and LoVo tumor cells in a dose-dependent manner.

Figure 3A:
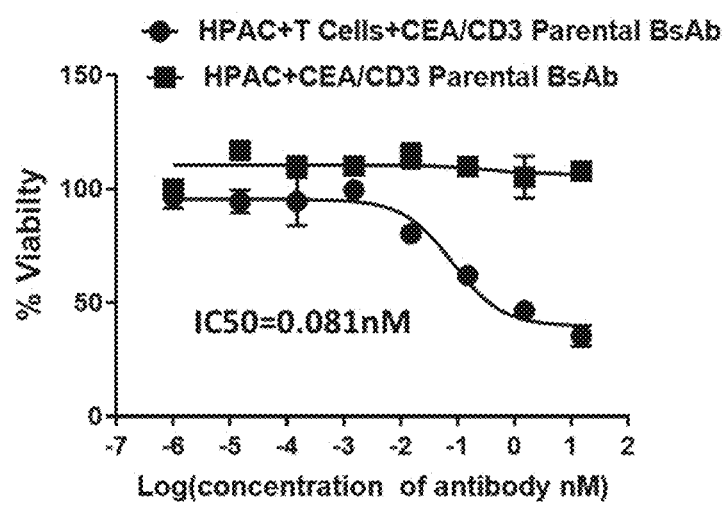
FIG. 3A showed CEA/CD3 parental BsAb mediating the freshly isolated PBMCs to kill CEA expressing HPAC target cells.
Figure 3B:
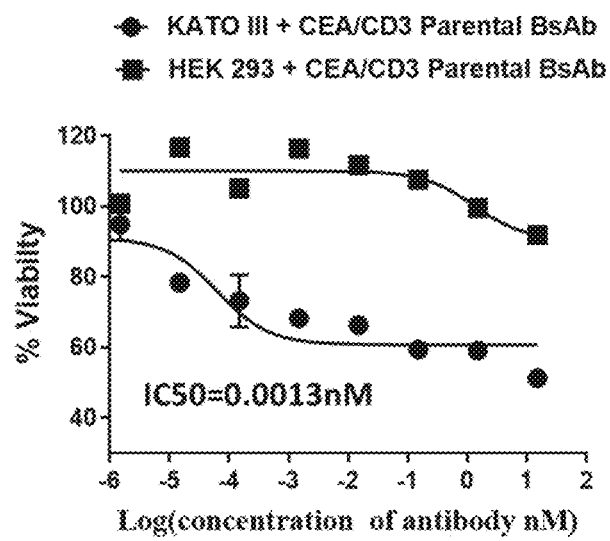
FIG. 3B showed CEA/CD3 parental BsAb mediating the freshly isolated PBMCs to kill CEA expressing KATO III target cells, whereas virtually no cell lysis was observed in negative HEK 293 cells.

To further evaluate cytotoxic activity of CEA/CD3 bispecific antibody, human PBMCs were purified from fresh blood of healthy donors and were used to perform a killing assay. Fresh PBMC effector cells and CEA-expressing HPAC or KATO III target cells or CEA-negative HEK 293 cells were cocultured (E:T ratio of 10:1) in the presence of CEA/CD3 bispecific antibody (here, CEA/CD3 parental BsAb). The killing activity of PBMCs was assessed by ATP release after 24 hours of incubation. As shown in FIGS. 3A and 3B, CEA/CD3 parental bispecific antibody can also mediate the freshly isolated PBMCs to kill CEA expressing target cells, whereas virtually no cell lysis was observed in the presence of PBMCs and CEA/CD3 parental BsAb with CEA negative HEK 293 cells. Although we observed potent tumor cell killing by CEA/CD3 parental BsAb, high levels of cytokine release may also occur at the same time.

Figure 4A:
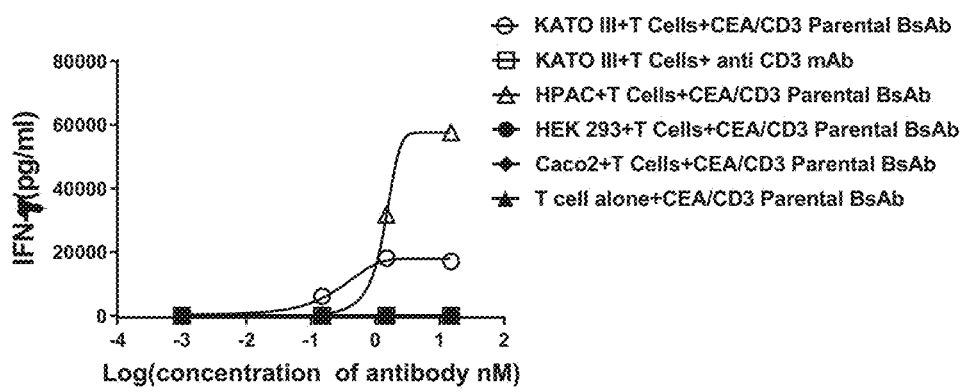
FIG. 4A showed CEA/CD3 parental BsAb induced-high levels of IFN-γ cytokine release.
Figure 4B:
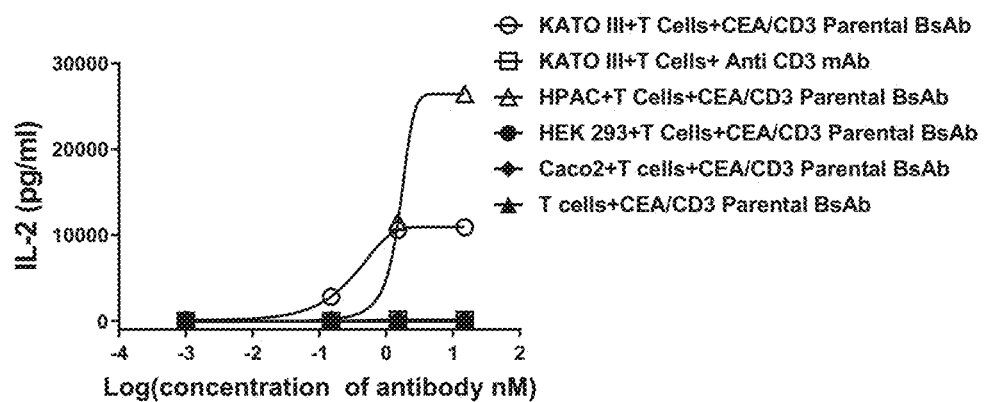
FIG. 4B showed CEA/CD3 parental BsAb induced-high levels of IFN-γ cytokine release.

To confirm whether wild-type CEA/CD3 bispecific antibody induced strong cytokine production in vitro, human PBMCs were isolated and cultured with anti-CD3/CD28 coated beads for 6 days. Subsequently the activated T cells cocultured with tumor target cell lines with various expression levels of CEA (CEA high expressing HPAC and CEA medium expressing KATO III cells) and CEA negative HEK293 and Caco2 cells in the presence or absence of CEA/CD3 parental bispecific antibody (CEA/CD3 parental BsAb). The supernatant was collected 24 hours after the coculture of PBMCs and tumor target cells, and the IL-2 and IFN-γ secretion was assessed by ELISA. While the treatment of CEA/CD3 parental bispecific antibody did increase IFN-γ and IL-2 production from PBMCs that cocultured with KATO III tumor cells with medium level of CEA expression. CEA/CD3 parental bispecific antibody evoked much stronger increases in INF-γ and IL-2 from PBMCs cocultering with CEA highly expressing HPAC tumor cells. Furthermore, in both coculture conditions, IFN-γ and IL-2 production from CEA/CD3 parental bispecific antibody treated-PBMCs increased in the antibody dose-dependent manner (FIGS. 4A and 4B). In contrast, no detectable levels of IFN-γ and IL-2 production were observed in CEA negative HEK cells and Caco2 cells. The data provide strong evidence that wild-type CEA/CD3 bispecific antibody (CEA/CD3 parental BsAb) can enhance potent T cell activity, including lysis to tumor cells and cytokine release.

Example 3

CD3-Binding Target Arm in CEA/CD3 Bispecific Antibody was Engineered for Reducing Binding Affinity.

Figure 5A:
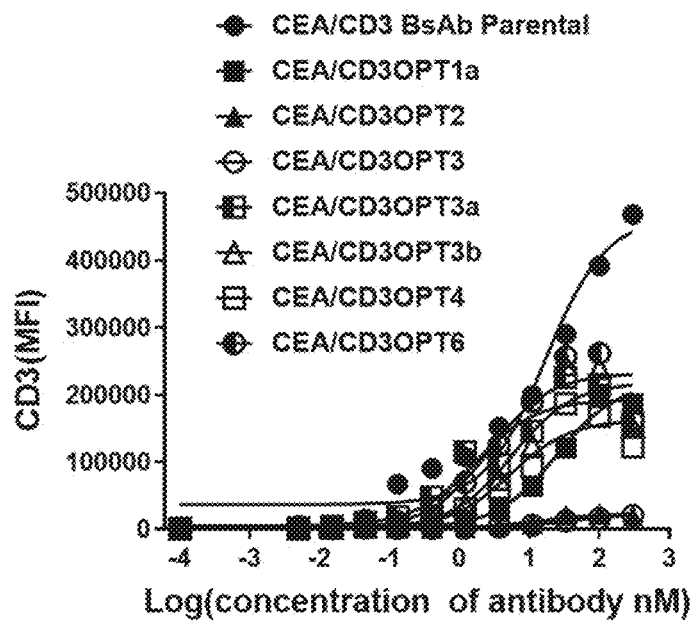
FIGS. 5A and 5B showed assessment of binding of mutant CD3 binder variants. The binding affinity of CD3OPT variants were assessed by Jurkat cells and PBMCs with flow cytometry.
Figure 5B:
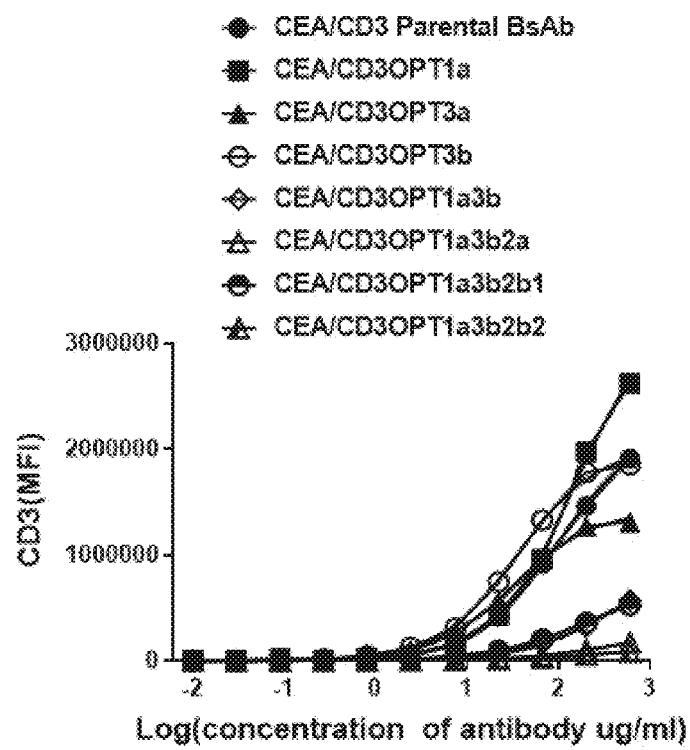

High-affinity binding to CD3 is associated with inherent challenges. T-cell engager bispecific antibodies carrying a high-affinity CD3 binder could also induce cytokine release syndrome (CRS), leading to severe adverse side effects caused by the administration of therapeutic antibodies. Most importantly, high binding affinity of T-cell bispecific antibody has high bias to T cell rich tissues such as the spleen and lymph nodes instead of to tumor cells. Usually, if CD3 binding affinity is high (less than 1 nM/L), T-cell bispecific antibodies will be accumulated in lymph organs, while lower CD3 affinity (more than 50 nM/L) would not be sufficient to impact antibody tissue distribution. Although the affinity of anti-CD3 monoclonal antibody we used is relatively lower than OKT3, its affinity is still in the nanomolar range. Thus, we sought to generate lower CD3 binder variants based on the VH sequence of this CD3 monoclonal antibody using point mutation technique. As is known, the framework region of an antibody is not directly involved in antigen binding, but it determines the folding of the molecules and thus the complementarity-determining region (CDR) can interact with the antigen binding site. Random framework mutation studies also demonstrated that certain residues in the framework stabilized the antibody structure and play an allosteric contributory role in antigen binding. As a result, the changes of those residues in the antibody framework will influence binding affinity. We carefully investigated the protein crystal structures of the interaction of anti-CD3 and CD3 and performed selective mutations of residues in VH-framework regions of anti-CD3 based on computational studies and generated fourteen (14) CD3 binder variants. Binding of CD3 variants to human CD3 was measured by flow cytometry using CD3 expressing Jurkat cells (FIG. 5A). Besides two mutant CD3 variants (CEA/CD3OPT2 and CEA/CD3OPT3) which almost completely lost binding to CD3 on Jurkat cells, the CD3 binding affinity of the other five CD3 mutant variants (CEA/CD3OPT1a, CEA/CD3OPT3a, CEA/CD3OPT3b, CEA/CD3OPT4 and CEA/CD3OPT6) have declined to different degrees as compared to their parental clone CEA/SP34, but no dramatically reduced binding affinity to CD3 in first-run mutant CD3 variants was observed (FIG. 5A and Table 3). To obtain mutant CD3 variants with much lower binding affinity, six more CD3 binder variants were engineered based on the sequence of CEA/CD3OPT1a and CEA/CD3OPT3b variants. We therefore examined their binding affinity to CD3 by staining freshly isolated PBMCs from healthy donors with these CEA/CD3 binder variants. Indeed, FACS analysis showed that the mutant CEA/CD3OPT1a3b, CEA/CD3OPT1a3b2a, CEA/CD3OPT1a3b2b1, and CEA/CD3OPT1a3b2b2 displayed significantly reduced binding affinity compared to the single mutation (FIG. 5B and Table 3). The sequences of bispecific antibodies in this example: VH sequences of CD3 are listed in table 3, VL sequence of CD3 is set forth as SEQ ID NO:2, VH and VL sequences of CEA are set forth as SEQ ID NO:5-6 respectively.

TABLE 3

CD3 (derived from SP34) VH domain from parental and variants

| CD3 VH domain | Sequence | SEQ ID No: |
|---|---|---|
| CD3 heavy chain parental | EVQLVESGGGLVQPGGSLKLSCAAS GFTFNKYAMNWVRQAPGKGLEWVAR IRSKYNNYATYYADSVKDRFTISRD DSKNTAYLQMNNLKTEDTAVYYCVR HGNFGNSYISYWAYWGQGTLVTVSS | 1 |
| CD3 OPT | EVQLVESGGGLVKPGGSLKLSCAAS GFTFNKYAMNWVRQAPGKGLEWVAR IRSKYNNYATYYADSVKDRFTISRD DSKNTAYLQMNNLRTEDTAVYYCVR HGNFGNSYISYWAYWGQGTTVTVSS | 3 |
| CD3 OPT 1 | EVQLVESGGGLVKPGGSLKLSCAAS GFTFSTYAMNWVRQAPGKGLEWVGR IRSKYNNYATYYADSVKDRFTISRD DSKNTAYLQMNNLRTEDTAVYYCVR HGNFGNSYISHFAYWGQGTTVTVSS | 9 |
| CD3 OPT 2 | EVQLVESGGGLVKPGGSLKLSCAAS GFTFNKYAMNWVRQAPGKGLEWVAR IRSNYNNYATTFADSVKDRFTISRD DSKNTAYLQMNNLRTEDTAVYYCVR HGNFGNSYISYWAYWGQGTTVTVSS | 10 |
| CD3 OPT 3 | EVQLVESGGGLVKPGGSLKLSCAAS GFTFNKYAMNWVRQAPGKGLEWVAR IRSKYNNYATYYADSVKDRFTISRD DSKNTAYLQMNNLRTEDTAVYYCVR HGQWGNSYISYWAYWGQGTTVTVSS | 11 |
| CD3 OPT 4 | EVQLVESGGGLVKPGGSLKLSCAAS GFTFSTYAMNWVRQAPGKGLEWVAR IRSNYNNYATTFADSVKDRFTISRD DSKNTAYLQMNNLRTEDTAVYYCVR HGNFGNSYISHFAYWGQGTTVTVSS | 12 |
| CD3 OPT 5 | EVQLVESGGGLVKPGGSLKLSCAAS GYTFNKYAMNWVRQAPGKGLEWVAR IRSKYNNYATYYADSVKDRFTISRD DSKNTAYLQMNNLRTEDTAVYYCVR HGNFGNSYISYWAYWGQGTTVTVSS | 13 |
| CD3 OPT 6 | EVQLVESGGGLVKPGGSLKLSCAAS GFTFNKYAMNWVRQAPGKGLEWVGR IRSKYNNYATYYADSVKDRFTISRD DSKNTAYLQMNNLRTEDTAVYYCAR HGNFGNSYISYWAYWGQGTTVTVSS | 14 |
| CD3 OPT 1a | EVQLVESGGGLVKPGGSLKLSCAAS GFTFSTYAMNWVRQAPGKGLEWVAR IRSKYNNYATYYADSVKDRFTISRD DSKNTAYLQMNNLRTEDTAVYYCVR HGNFGNSYISYWAYWGQGTTVTVSS | 15 |
| CD3 OPT 1b | EVQLVESGGGLVKPGGSLKLSCAAS GFTFNKYAMNWVRQAPGKGLEWVAR IRSKYNNYATYYADSVKDRFTISRD DSKNTAYLQMNNLRTEDTAVYYCVR HGNFGNSYISHWAYWGQGTTVTVSS | 16 |

TABLE 3-continued

CD3 (derived from SP34) VH domain from parental and variants

| CD3 VH domain | Sequence | SEQ ID No: |
|---|---|---|
| CD3 OPT 1c | EVQLVESGGGLVKPGGSLKLSCAAS GFTFNKYAMNWVRQAPGKGLEWVAR IRSKYNNYATYYADSVKDRFTISRD DSKNTAYLQMNNLRTEDTAVYYCVR HGNFGNSYISYFAYWGQGTTVTVSS | 17 |
| CD3 OPT 1d | EVQLVESGGGLVKPGGSLKLSCAAS GFTFNKYAMNWVRQAPGKGLEWVAR IRSKYNNYATYYADSVKDRFTISRD DSKNTAYLQMNNLRTEDTAVYYCVR HGNFGNSYISHFAYWGQGTTVTVSS | 18 |
| CD3 OPT 2a | EVQLVESGGGLVKPGGSLKLSCAAS GFTFNKYAMNWVRQAPGKGLEWVAR IRSNYNNYATYYADSVKDRFTISRD DSKNTAYLQMNNLRTEDTAVYYCVR HGNFGNSYISYWAYWGQGTTVTVSS | 19 |
| CD3 OPT 2b | EVQLVESGGGLVKPGGSLKLSCAAS GFTFNKYAMNWVRQAPGKGLEWVAR IRSKYNNYATTFADSVKDRFTISRD DSKNTAYLQMNNLRTEDTAVYYCVR HGNFGNSYISYWAYWGQGTTVTVSS | 20 |
| CD3 OPT 3a | EVQLVESGGGLVKPGGSLKLSCAAS GFTFNKYAMNWVRQAPGKGLEWVAR IRSKYNNYATYYADSVKDRFTISRD DSKNTAYLQMNNLRTEDTAVYYCVR HGQFGNSYISYWAYWGQGTTVTVSS | 21 |
| CD3 OPT 3b | EVQLVESGGGLVKPGGSLKLSCAAS GFTFNKYAMNWVRQAPGKGLEWVAR IRSKYNNYATYYADSVKDRFTISRD DSKNTAYLQMNNLRTEDTAVYYCVR HGNWGNSYISYWAYWGQGTTVTVSS | 22 |
| CD3 OPT 1a3b | EVQLVESGGGLVKPGGSLKLSCAAS GFTFSTYAMNWVRQAPGKGLEWVAR IRSKYNNYATYYADSVKDRFTISRD DSKNTAYLQMNNLRTEDTAVYYCVR HGNWGNSYISYWAYWGQGTTVTVSS | 23 |
| CD3 OPT 1a3b2a | EVQLVESGGGLVKPGGSLKLSCAAS GFTFSTYAMNWVRQAPGKGLEWVAR IRSNYNNYATYYADSVKDRFTISRD DSKNTAYLQMNNLRTEDTAVYYCVR HGNWGNSYISYWAYWGQGTTVTVSS | 24 |
| CD3 OPT 1a3b2b1 | EVQLVESGGGLVKPGGSLKLSCAAS GFTFSTYAMNWVRQAPGKGLEWVAR IRSKYNNYATTYADSVKDRFTISRD DSKNTAYLQMNNLRTEDTAVYYCVR HGNWGNSYISYWAYWGQGTTVTVSS | 25 |
| CD3 OPT 1a3b2b2 | EVQLVESGGGLVKPGGSLKLSCAAS GFTFSTYAMNWVRQAPGKGLEWVAR IRSKYNNYATYFADSVKDRFTISRD DSKNTAYLQMNNLRTEDTAVYYCVR HGNWGNSYISYWAYWGQGTTVTVSS | 26 |
| CD3 OPT 1a3b6 | EVQLVESGGGLVKPGGSLKLSCAAS GFTFSTYAMNWVRQAPGKGLEWVGR IRSKYNNYATYYADSVKDRFTISRD DSKNTAYLQMNNLRTEDTAVYYCVR HGNWGNSYISYWAYWGQGTTVTVSS | 27 |
| CD3 OPT 1a3b2a6 | EVQLVESGGGLVKPGGSLKLSCAAS GFTFSTYAMNWVRQAPGKGLEWVGR IRSNYNNYATYYADSVKDRFTISRD DSKNTAYLQMNNLRTEDTAVYYCVR HGNWGNSYISYWAYWGQGTTVTVSS | 28 |
| CD3 OPT 1a3b2b1+6 | EVQLVESGGGLVKPGGSLKLSCAAS GFTFSTYAMNWVRQAPGKGLEWVGR IRSKYNNYATTYADSVKDRFTISRD DSKNTAYLQMNNLRTEDTAVYYCVR HGNWGNSYISYWAYWGQGTTVTVSS | 29 |
| CD3 OPT 1a3b2b2+6 | EVQLVESGGGLVKPGGSLKLSCAAS GFTFSTYAMNWVRQAPGKGLEWVGR IRSKYNNYATYFADSVKDRFTISRD DSKNTAYLQMNNLRTEDTAVYYCVR HGNWGNSYISYWAYWGQGTTVTVSS | 30 |

Figure 6:
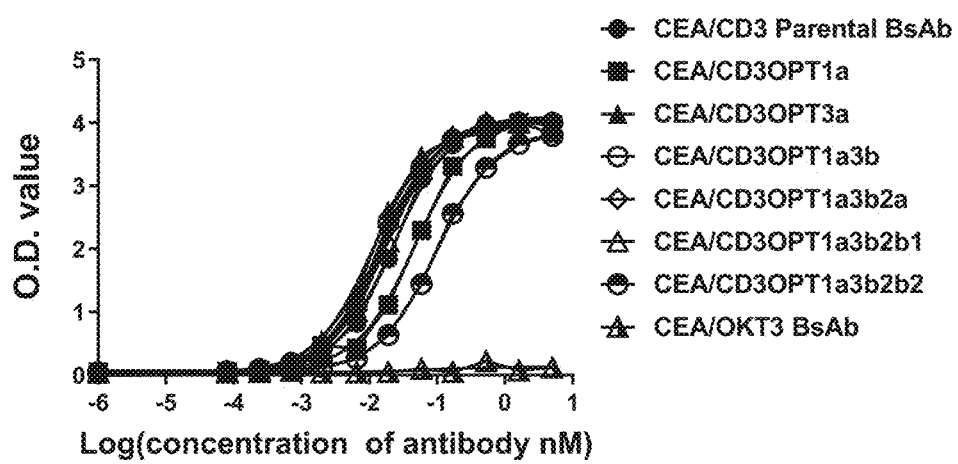
FIG. 6 showed no effect of the mutation in CD3 binders on cross-reactivity with cynomolgus monkey CD3.

One of the most important features of the anti-CD3 antibody we used is that it shows cross-reactivity with cynomolgus monkey CD3 protein. As anti-CD3 variants were derived from the mutation in VH framework sequence of the parent antibody, it is possible that the Cynomolgus cross-reactivity would be lost due to the sequence change in the mutant variants. Subsequently, the cross-reactivity with Cynomolgus monkey CD3 protein was analyzed by ELISA assay (FIG. 6 and Table 4). Interestingly, all CD3 binders exhibited comparable binding affinity to Cynomolgus monkey CD3 protein as parental clone CEA/CD3 bispecific antibody. In contrast, CEA/OKT3 bispecific antibody that was used as a negative control did not show cross-reactivity with Cynomolgus monkey CD3 protein, which suggests that multiple point mutations in our CD3 binder variants significantly reduced binding affinity to CD3, but these mutations have no effect on cross-activity with Cynomolgus monkey CD3.

TABLE 4

(showing mutation in CD3 binders has no effect on cross-reactivity with cynomolgus monkey CD3)

| | CEA/CD3 Parental BsAb | CEA/CD3 OPT1a | CEA/CD3 OPT3a | CEA/CD3 OPT1a3b | CEA/CD3 OPT1a3b2a | CEA/CD3 OPT1a3b2b1 | CEA/CD3 OPT1a3b2b1a | CEA/OKT3 |
|---|---|---|---|---|---|---|---|---|
| Best-fit | | | | | | | | |
| Bottom | 0.01637 | 0.06661 | 0.00466 | 0.003036 | 0.003374 | 0.006779 | 0.04687 | 0.04352 |
| Top | 4.102 | 4.091 | 4.018 | 4.029 | 4.063 | 4.098 | 3.885 | 0.1301 |
| EC50 | 0.02254 | 0.04819 | 0.01144 | 0.1434 | 0.0155 | 0.01766 | 0.09807 | 0.08524 |
| LogEC50 | −1.647 | −1.317 | −1.942 | −1.843 | −1.81 | −1.753 | −1.008 | −1.069 |
| Span | 4.086 | 4.024 | 4.013 | 4.026 | 4.06 | 4.091 | 3.838 | 0.08656 |

Example 4

Selection of CD3 Binder Variant Based on Reducing TCR Signaling Strength

Figure 7A:
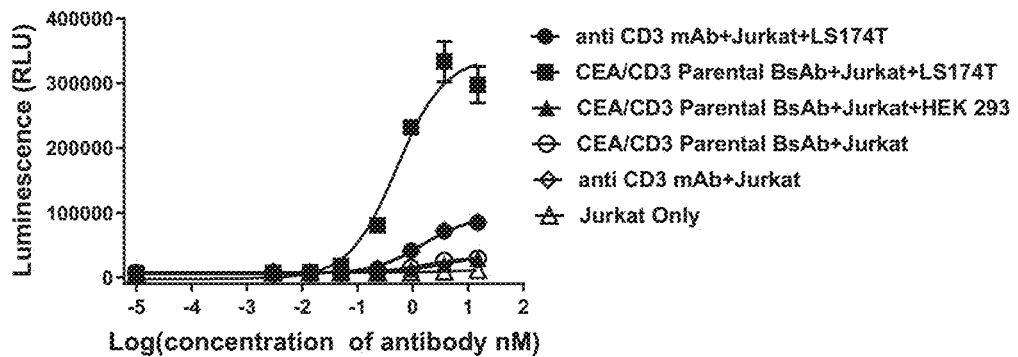
FIGS. 7A, 7B and 7C showed CEA/CD3 BsAb variants mediated-NFAT signaling in CEA expressing manner. The T cell activity was reflected by the NFAT activity.
Figure 7B:
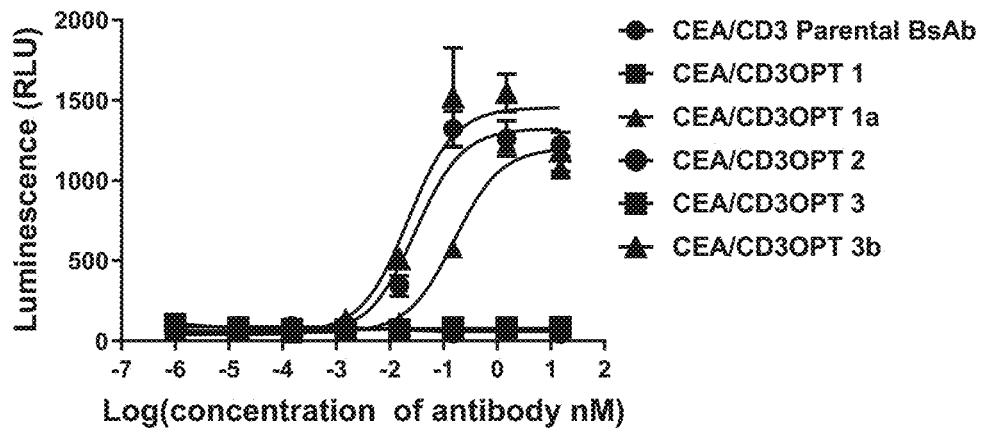
Figure 7C:
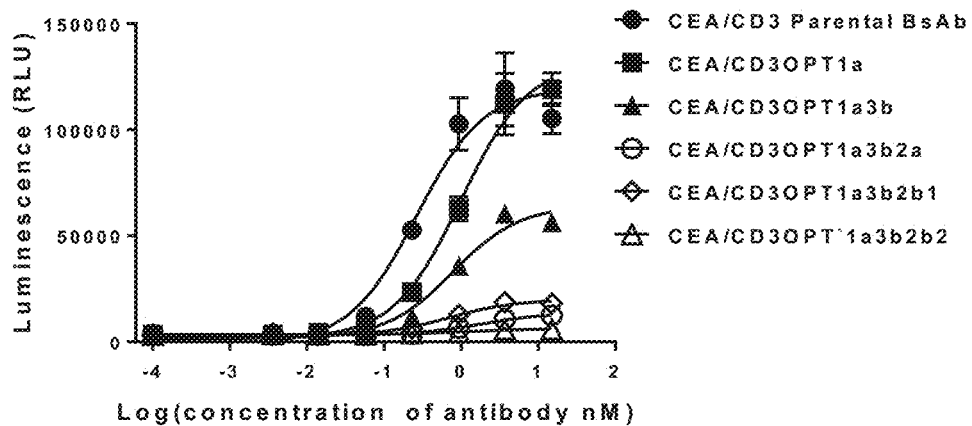

The simultaneous engagement of the TCR and costimulatory molecules as CD28 at the surface of T cells leads to full T-cell activation. Under normal conditions, the signaling pathways elicited in T cells include the activation and nuclear translocation of NFAT transcription factor. To assess the strength of TCR signaling mediated by the mutant CD3 binders in CEA/CD3 BsAbs, we used a Jurkat T-cell line, which expresses the Luciferase gene under NFAT promoter. When Jurkat cells coculture with CEA expressing tumor cells, CEA/CD3 BsAbs can bind to and dimerize TCR on Jurkat cells, driving NFAT gene activity so that Luciferase controlled by NFAT promoter is expressed in a dose-responsive manner of the antibodies. As expected in FIG. 7A, a strong NFAT activity signaling was detected by coculture of Jurkat cell with CEA expressing LS-174T cells in the presence of CEA/CD3 bispecific antibody, not in anti-CD3 mAb. In addition, no NFAT activity signaling was observed in the same experimental setting using CEA negative HEK 293 cells (FIG. 7A). By utilizing this simple and reliable assay, we further evaluated the strength of TCR signaling mediated by all mutant CEA/CD3 variants. Interestingly, very weak NFAT activity was detected in the experimental setting with triple mutant variants (CEA/CD3OPT1a3b2a, CEA/CD3OPT1a3b2b1, and CEA/CD3OPT1a3b2b2) but double mutant CEA/CD3OPT1a3b still maintained relatively high NFAT activity (FIGS. 7B-7C and Tables 5-6), which is consistent with the binding affinity of CEA/CD3 variants (FIG. 5B). Thus, this assay indicates that the multiple run mutations in VH framework of the anti-CD3 monoclonal antibody not only reduced CD3 binding affinity, but also impaired their initiated TCR signaling pathway. The sequences of bispecific antibodies in this example were listed in table 1.

Example 5

Evaluate Effect of CD3 Affinity on Cytotoxicity with CEA/CD3 Variants

Figure 8A:
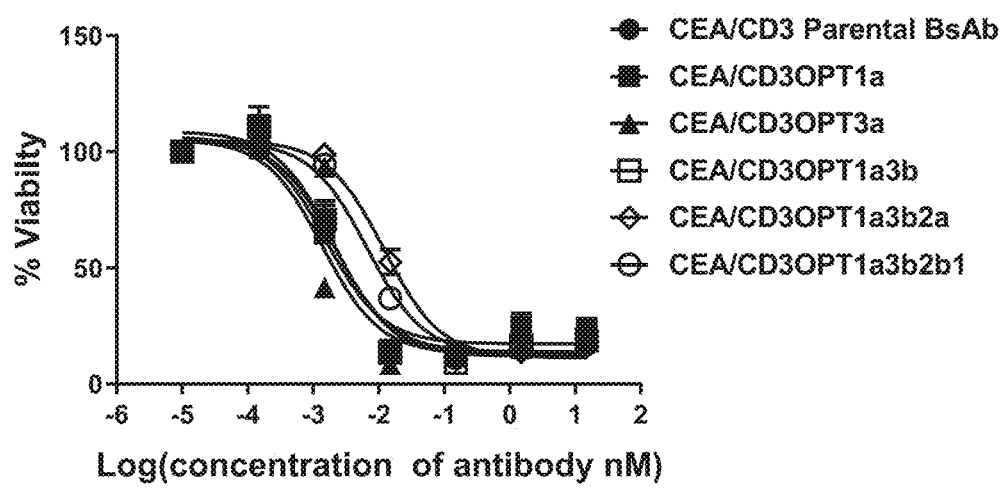
FIG. 8A showed lysis activity of LS-174T cells by CD3 binder variants having various binding affinities.

Theoretically, a CD3 binding arm in a T-cell bispecific antibody needs relatively high binding affinity so that it can bridge a sustaining interaction between T cells and tumor cells, allowing T cells to eventually activate and to elicit lysis to tumor cells. However, high CD3 binding affinity can induce severe side effects for immunotherapy. Thus, it is particularly important to assess CD3 binding affinity of T-cell bispecific antibodies and achieve an optimal balance between cytokine release level and tumor lysis activity. To compare cytotoxic activity among the six (6) anti-CD3 variants with different binding affinity, T cell-mediated killing of target cells induced by CEA/CD3 variant antibodies was assessed on LS-174T Luc (high CEA expression) and KATO III Luc (medium CEA expression) human tumor cells. H929 Luc (CEA negative tumor cell line) was used as a negative control. Human PBMCs isolated from healthy donors were cultured with anti-CD3 and anti-CD28 in the presence of IL-2 (20 ng/ml) for 6 days. The resulting PBMC population was counted and added to target cells at the final E:T ratio of 10:1. Specific lysis was determined after 18 hours of incubation by quantification of luciferase intensity units. As shown in FIG. 8A and Table 7, six (6) CEA/CD3 bispecific antibodies (CEA/CD3 parental BsAb, CEA/CD3OPT1a, CEA/CD3OPT3b, CEA/CD3OPT1a3b, CEA/CD3OPT1a3b2a, and CEA/CD3OPT1a3b2b1) enhanced T cell redirected cytotoxicity of CEA expressing LS-174T tumor cells in a dose-dependent manner, and IC50 values measured by specific lysis did not vary significantly among these six bispecific antibodies tested in these assays, suggesting that CD3 arm binding affinity does not strongly influence cytotoxic activity induced by highly CEA expressing LS-174T cells. In contrast, no significant cytotoxicity was found against CEA negative H929Luc cells in an assay

TABLE 5

(showing CEA/CD3 BsAb variants mediated-NFAT signaling in CEA expressing manner)

|  | CEA/CD3 Parental BsAb | CEA/CD3 OPT1 | CEA/CD3 OPT1a | CEA/CD3 OPT2 | CEA/CD3 OPT3 | CEA/CD3 OPT3a |
|---|---|---|---|---|---|---|
| Best-fit |  |  |  |  |  |  |
| Bottom | 39.86 | 64.64 | 49.88 | 88.90 | 119.4 | 052.83 |
| Top | 1324 | 78.71 | 1203 | 58.47 | 78.00 | 1455 |
| EC50 | 0.02990 | 0.005991 | 0.1582 | 0.0080 | 2.2e−006 | 0.02195 |
| LogEC50 | −1.524 | −2.222 | −0.8007 | −2.092 | −5.656 | −1.658 |
| Span | 1284 | 14.07 | 1153 | −30.43 | −41.43 | 1403 |

TABLE 6

(showing CEA/CD3 BsAb variants mediated-NFAT signaling in CEA expressing manner)

Figure 8B:
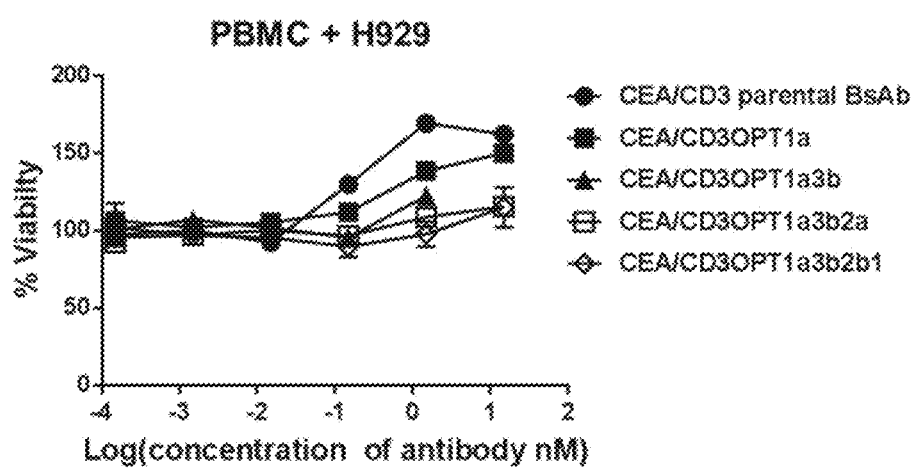
FIG. 8B showed lysis activity of H929 cells by CD3 binder variants (CD3 arms) having various binding affinities.
Figure 9A:
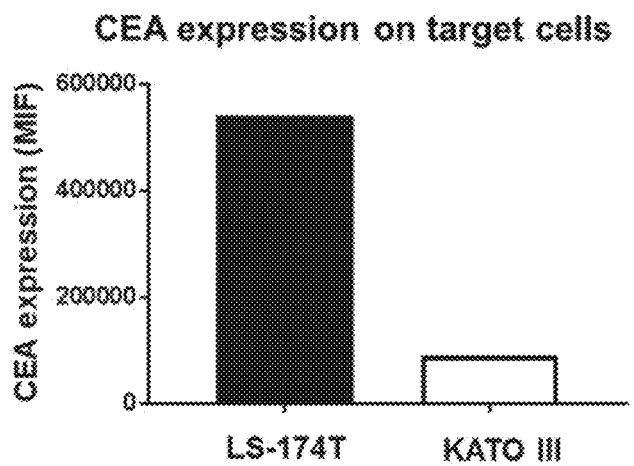
FIG. 9A showed CEA expression level of LS-174T and KATO III cells.
Figure 9B:
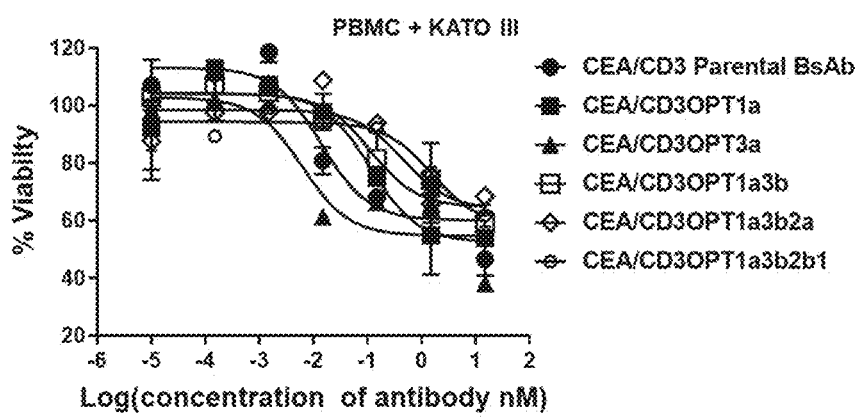
FIG. 9B showed the lysis of KATO III tumor cells by PBMCs in the presence of CD3 binder variants of the present invention.
Figure 10A:
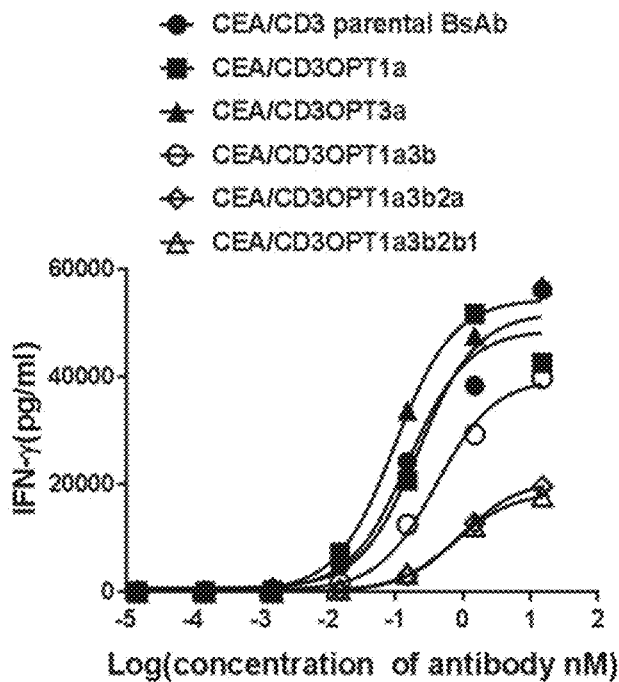
FIG. 10A showed that CEA/CD3 BsAb variants of the present invention induce IFN-γ cytokine release when cultured with PBMCs and LS-174T cells.
Figure 10B:
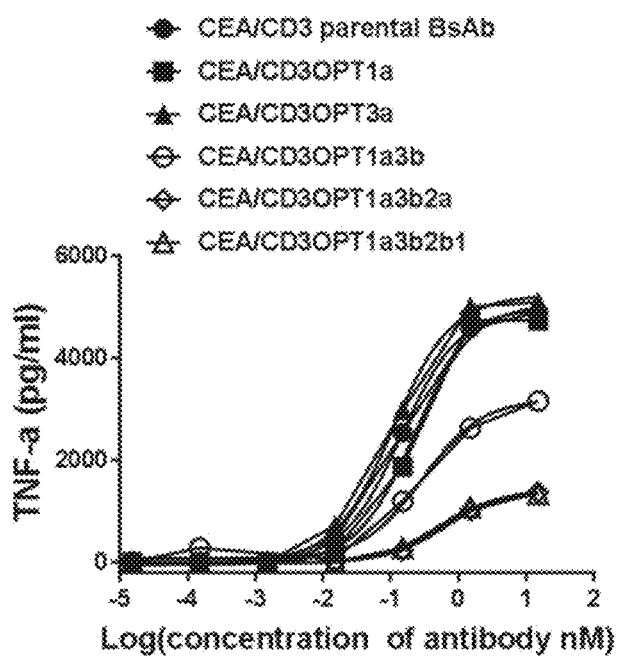
FIG. 10B showed that CEA/CD3 BsAb variants induce TNF-α cytokine release when cultured with PBMCs and LS-174T cells.
Figure 10C:
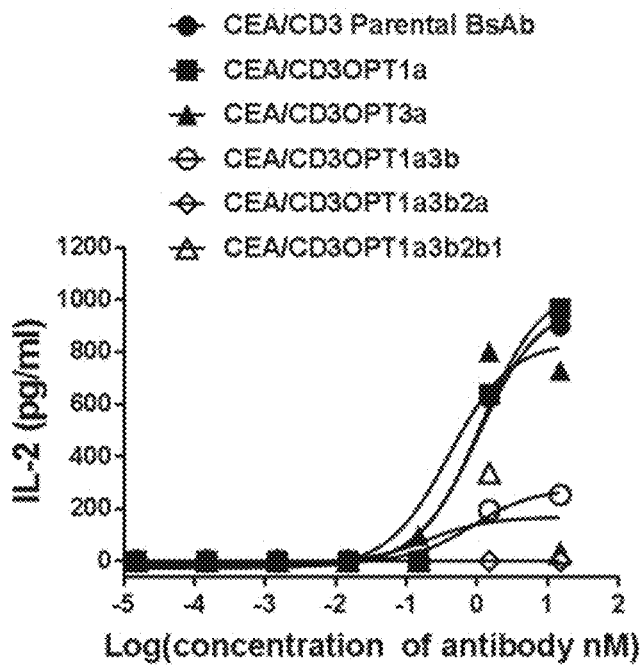
FIG. 10C showed that CEA/CD3 BsAb variants induce IL-2 cytokine release when cultured with PBMCs and LS-174T cells.

|  | CEA/CD3 Parental BsAb | CEA/CD3 OPT1a | CEA/CD3 OPT1a3b | CEA/CD3 OPT1a3b2a | CEA/CD3 OPT1a3b2b1 | CEA/CD3 OPT1a3b2b2 |
|---|---|---|---|---|---|---|
| Best-fit |  |  |  |  |  |  |
| Bottom | −1044 | 1567 | 1605 | 3098 | 2829 | 3448 |
| Top | 119509 | 131973 | 64451 | 13819 | 19995 | 6122 |
| EC50 | 0.2633 | 0.9949 | 0.7897 | 1.863 | 0.7008 | 1.065 |
| LogEC50 | −0.5796 | −0.0022 | −0.1025 | −0.2702 | −0.1544 | −0.0275 |
| Span | 120552 | 130407 | 62846 | 10721 | 17167 | 2674 | with the same other parameters (FIG. 8B). We next investigated whether CEA expression level on target cells has an effect on cytotoxic activity elicited by CEA/CD3 BsAbs, in particular ones with lower CD3 binding affinity. As a result, we chose KATO III cells as targets because the medium level of CEA is expressed on this cell line (FIG. 9A). A similar cytotoxic assay was performed, and tumor lysis activity mediated by different CEA/CD3 bispecific antibodies were assessed by Luciferase intensity units after 18 hour-KATO III and PBMCs coculture. Clearly, the efficiency of lysis to KATO III cells was significantly lower as compared to killing LS-174T cells in all tested CEA/CD3 BsAbs (FIG. 9B and Table 8). Moreover, it appears that the cytotoxic activity mediated by lower CD3 affinity binders in bispecific antibody format is significantly affected by a lower expression level of CEA in the target cells (FIG. 9B and Table 8). The sequences of bispecific antibodies in this example are listed in Table 1.

activated T cells cocultured with LS-174T cells (CEA high expression) and KATO III cells (CEA medium expression) in the presence of CEA/CD3 bispecific antibodies were serially diluted. The supernatant was collected 24 hours after coculture, and the IL-2, IFN-γ, and TNF-α secretion was assessed by ELISA. Indeed, the levels of IFN-γ, TNF-α, and IL-2 are completely corelated with their CD3 binding affinity: the highest cytokine release in the administration of CEA/CD3 parental BsAb and the lowest cytokine release in the triple mutant CD3 binders (FIG. 10). This cytokine release profile was similar to that of NFAT activity. As a lower effective cytotoxicity was found in CEA medium expressing KATO III cells (FIG. 9B), we wanted to explore whether CEA expression level also contributes to cytokine release. While the administration of CEA/CD3 parental bispecific antibody did induce IFN-γ and TNF-α production from co-culture of PBMCs and KATO III tumor cells in the antibody dose-dependent manner, the level of cytokine

TABLE 7

(showing lysis activity of LS-174T cells by CD3 binder variants having various binding affinities)

| | CEA/CD3 Parental BsAb | CEA/CD3 OPT1a | CEA/CD3 OPT3a | CEA/CD3 OPT1a3b | CEA/CD3 OPT1a3b2a | CEA/CD3 OPT1a3b2b1 |
|---|---|---|---|---|---|---|
| Best-fit | | | | | | |
| Bottom | 13.85 | 17.29 | 13.10 | 12.05 | 11.33 | 12.63 |
| Top | 105.5 | 106.5 | 105.3 | 108.7 | 104.9 | 104.5 |
| EC50 | 0.00205 | 0.000156 | 0.00139 | 0.00206 | 0.01202 | 0.00666 |
| LogEC50 | −2.687 | −2.806 | −2.857 | −2.686 | −1.920 | −2.176 |
| Span | 91.68 | 89.18 | 92.15 | 96.63 | 93.61 | 91.82 |

TABLE 8

(showing the lysis of KATO III tumor cells by PBMCs in the presence of CD3 binder variants)

| | CEA/CD3 Parental BsAb | CEA/CD3 OPT1a | CEA/CD3 OPT3a | CEA/CD3 OPT1a3b | CEA/CD3 OPT1a3b2a | CEA/CD3 OPT1a3b2b1 |
|---|---|---|---|---|---|---|
| Best-fit | | | | | | |
| Bottom | 60.11 | 52.52 | 54.72 | 64.63 | 63.82 | 58.10 |
| Top | 113.1 | 104.2 | 102.8 | 104.0 | 98.47 | 94.26 |
| EC50 | 0.01411 | 0.1137 | 0.00623 | 0.1131 | 0.4653 | 1.562 |
| LogEC50 | −1.85 | −0.9443 | −2.206 | −0.946 | −0.3323 | −0.1936 |
| Span | 53.02 | 51.72 | 48.06 | 39.39 | 34.65 | 36.16 |

Example 6

Evaluation of Cytokine Release Mediated by Mutant CD3 Binder Variants

Figure 11A:
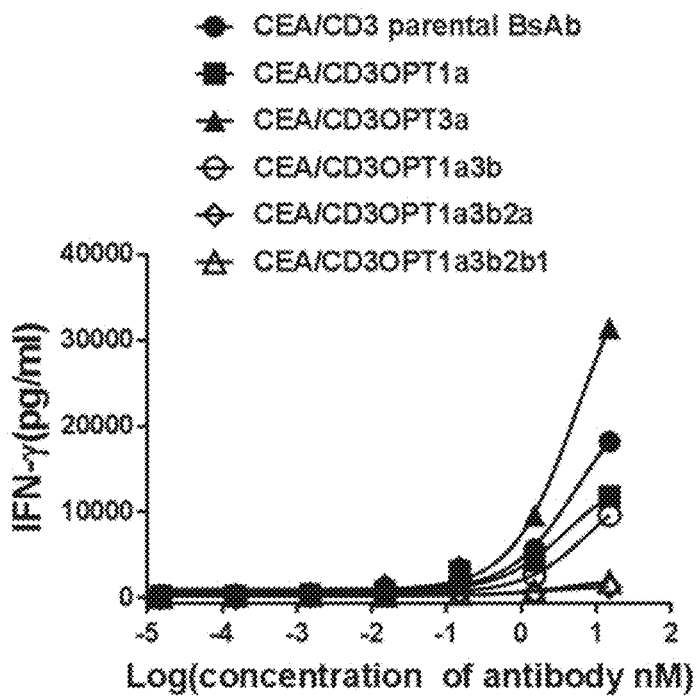
FIG. 11A showed CEA/CD3 BsAb variants of the present invention induce IFN-γ cytokine release.
Figure 11B:
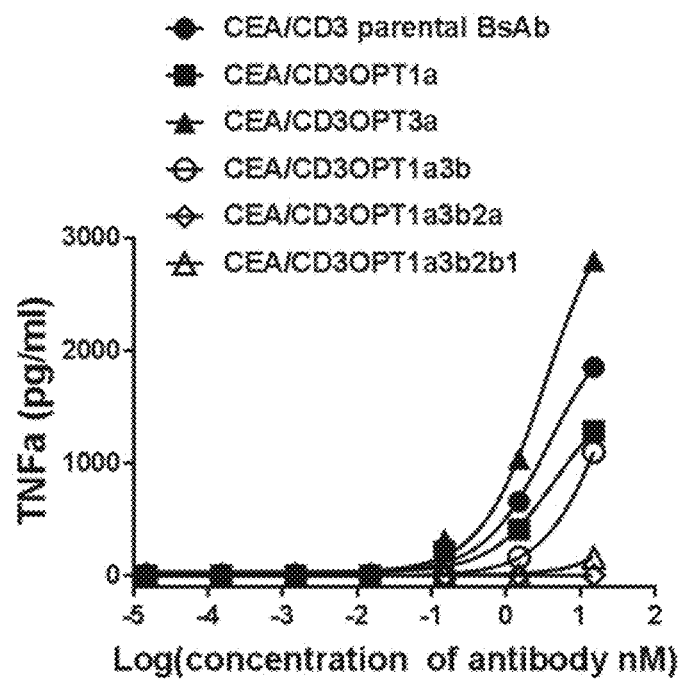
FIG. 11B showed these CEA/CD3 BsAb variants induce TNF-α cytokine release.

Cytokines secreted by activated T cells can profoundly affect immune responses in vitro and in vivo. Among them, IL-2 and INF-γ have multiple immunoregulatory effects on various cell types, including the support of T cell proliferation and the capacity to stimulate the activation of cytotoxic T lymphocytes, natural killer cells, and macrophages. However, much emphasis has recently been placed on reduced cytokine secretion in T-cell mediated-immunotherapy because a high level of cytokine release can cause inherent and potentially fatal adverse effects. It is, therefore, critical to evaluate CD3 binding affinity of T-cell bispecific antibodies through measuring levels of cytokine release. To test for a direct effect of CEA/CD3 binder variants on cytokine release, human PBMCs were isolated and cultured with anti-CD3/CD28 coated beads for 6 days. Subsequently, the secretion was much lower than that observed in the coculture with CEA highly expressing LS-174T cell (FIG. 10A-FIG. 10C, FIG. 11A-FIG. 11B). In contrast, the production of IFN-γ and TNF-α was barely detectable in the similar coculture system that was treated with CEA/CD3OPT1a3b2a and CEA/CD3OPT1a3b2b1 bispecific antibodies (FIG. 11A-FIG. 11B). The data provides strong evidence that the cytokine release provoked by CEA/CD3 bispecific antibodies largely depends on CD3 binding affinity, and antigen expression level on targets also partially contributes to cytokine release. The sequences of bispecific antibodies in this example are listed in table 1.

Example 7

Evaluation of Binding Specificity and Tissue Cross Reactivity of CEA/CD3-OPT1a3b2b1 BsAb To ascertain whether CEA/CD3-OPT1a3b2b1 BsAb has the potential to bind non-target antigenic determinants that may cause treatment-related toxicity, a set of normal human and cancerous tissues were stained and investigated by Immuno Histochemistry (IHC) technique. Briefly, FFPE tissue sections on slides were deparaffinized, hydrated, and subjected to heated citrate buffer antigen retrieval for 20 minutes under low pressure. After PBS wash, sections were endogenous peroxidase blocked (10 minutes), protein blocked (60 minutes), and incubated with primary antibody (60 minutes) followed by secondary antibody (60) minutes) at room temperature. Staining was visualized with diaminobenzidine peroxidase (1-2 minutes), and tissues were counterstained with hematoxylin. For the cell lines, the previously fixed cells were smeared on glass slides, air dried overnight, and stored at 4° C. For analysis, the smears were fixed in fresh, cold 4% PFA for 10 minutes followed by PBS wash. After washing, sections were treated for antigen retrieval followed by the same steps described for FFPE sections.

Figures 12A, 12B, 12C, 12D, 12E, 12F, 12G, 12H, 12I:
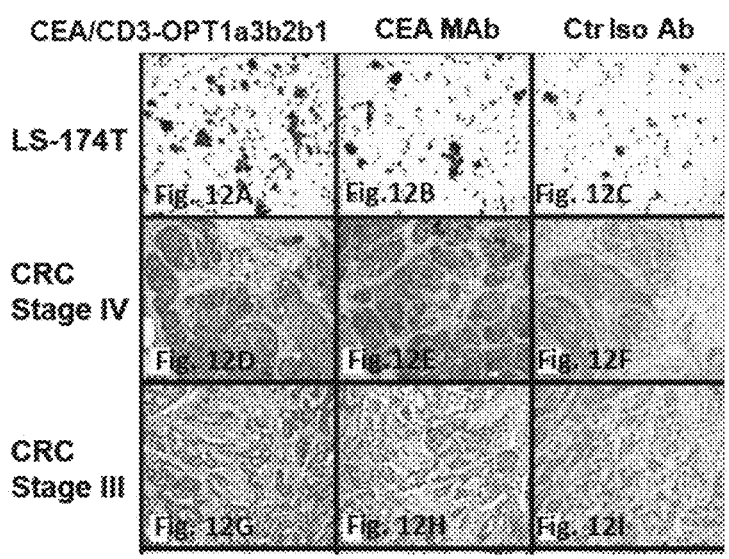
FIG. 12A-FIG. 12X showed evaluation of binding specificity and Tissue Cross Reactivity of CEA/CD3-OPT1a3b2b1 BsAb. A set of normal human (LS-174 cells, FIG. 12A-FIG. 12C) and cancerous tissues (CRC stage IV tumor cells, FIG. 12D-FIG. 12F, and CRC stage III tumor cells, FIG. 12G-FIG. 12I) were stained with CEA/CD3-1a3b2b1-BsAb (also refer to CEA/CD3-v2 in FIG. 12A-12X) (FIG. 12A, FIG. 12D, FIG. 12G), a control anti-CEA mAb (FIG. 12B, FIG. 12E, FIG. 12H) or isotype control BsAb (FIG. 12C, FIG. 12F, FIG. 12I), and investigated by Immuno Histochemistry (IHC) technique. CEA expressing LS-174 cells (FIG. 12A), CRC stage IV tumor cells (FIG. 12D), and CRC stage III tumor cells (FIG. 12G) showed intense (grade +4) staining with CEA/CD3-OPT1a3b2b1 BsAb (also refer to CEA/CD3-v2 in FIG. 12A-12X) as well as a control anti-CEA mAb (FIG. 12B, FIG. 12E & FIG. 12H). No specific staining was found in sections stained for the isotype control BsAb (FIG. 12C, FIG. 12F, and FIG. 12I). Normal human colon, breast, lung, prostate, liver, ovary, and brain tissues did not show any off-target reactivity with the tested CEA/CD3-1a3b2b1 BsAb and the control antibodies (FIG. 12J-FIG. 12X).
Figures 12J, 12X:
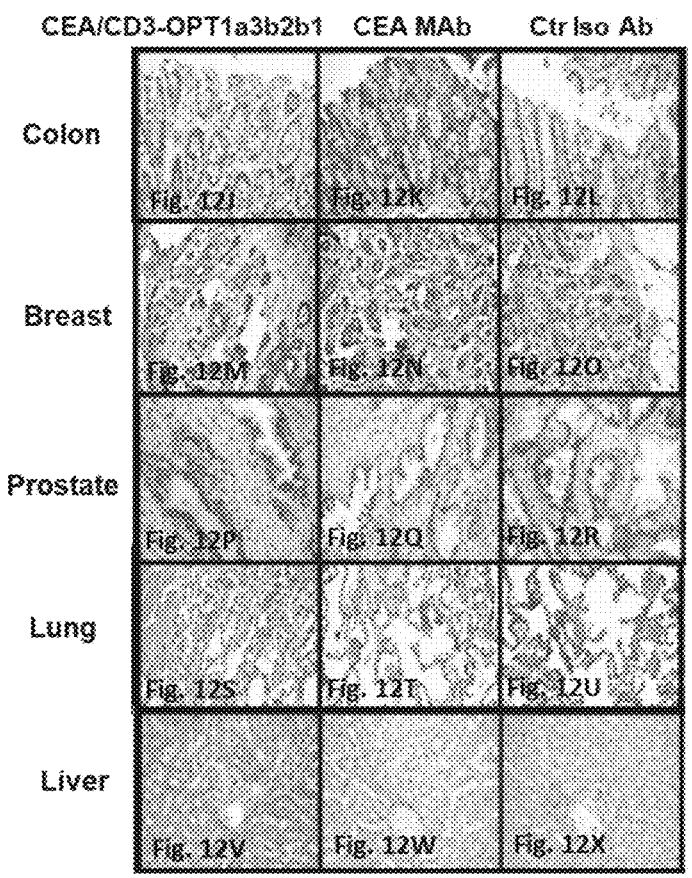

Results of TCR study showed that at a concentration of 3 μg/ml, CEA expressing LS-174 cells (FIG. 12A), CRC stage IV tumor cells (FIG. 12D), and CRC stage III tumor cells (FIG. 12G) showed intense (grade +4) staining with CEA/CD3-OPT1a3b2b1 BsAb as well as a control anti-CEA mAb (FIG. 12B, FIG. 12E & FIG. 12H). The staining was distributed with multifocal and diffuse patterns in CRC stage IV and CRC stage III tissues, respectively. Both CEA/CD3-OPT1a3b2b1 and anti-CEA mAb (data not shown) showed a low grade (grade +1) positive staining in epithelial cells and moderate non-specific cross reactivity with luminal mucus of the normal colon. No specific staining was found in sections stained for the isotype control BsAb (FIG. 12C, FIG. 12F, and FIG. 12I). Normal human colon, breast, lung, prostate, liver, ovary, and brain tissues did not show any off-target reactivity with the tested CEA/CD3-OPT1a3b2b1 BsAb and the control antibodies (FIG. 12J-FIG. 12X). These studies indicated that stage IV colorectal cancer and gastric adenocarcinoma demonstrated grade 4 staining with tested CEA/CD3-OPT1a3b2b1 BsAb and anti-CEA mAb, but no unexpected cross-reactivity with the normal tissues was observed.

Example 8

Comparative Analysis of Roche CEA-TCB Vs CEA/CD30PT1a3b2b1 Bispecific Antibody in In Vitro and In Vivo Function
Antibody Format of Roche CEA-TCB and CEA/CD30PT1a3b2b1 BsAb Roche developed CEA/CD3 bispecific antibody and encouraging clinical activity in the treatment of metastatic colorectal cancer was observed. Structure and sequence information of Roche CEA-TCB (also known as cibisatamab, RG7802, RG-7802, RO6958688, or RO-6958688) CEA/CD3 bispecific antibody was obtained from the IMGT database. See http://imgt.org/mAb-DB/search.action?innName=cibisatamab. Roche CEA-TCB format was generated by transfecting the following four constructs together in different ratios and identifying a full-length antibody of approx. 180 kDa in molecular weight. The sequences are as follows:

```
(1) 10636H|cibisatamab|Humanized||VH-CH1-VH-C-
KAPPA-CH2-CH3 (VH (1-121) [D1] + CH1 (122-219)
[D2] + VH (236-360) [D3] + C-KAPPA (362-467)
[D4] + CH2 (478-587) [D5] + CH3 (588-692)
[D6])694
                                (SEQ ID NO: 32)
QVQLVQSGAEVKKPGASVKVSCKASGYTFTEFGMNWVRQAPGQGLEWMGW

INTKTGEATYVEEFKGRVTFTTDTSTSTAYMELRSLRSDDTAVYYCARWD

FAYYVEAMDYWGQGTTVTVSSASTKGPSVFPLAPSSKSTSGGTAALGCLV

KDYFPEPVTVSWNSGALTSGVHTFPAVLQSSGLYSLSSVVTVPSSSLGTQ

TYICNVNHKPSNTKVDKKVEPKSCDGGGGSGGGGSEVQLLESGGGLVQPG

GSLRLSCAASGFTFSTYAMNWVRQAPGKGLEWVSRIRSKYNNYATYYADS

VKGRFTISRDDSKNTLYLQMNSLRAEDTAVYYCVRHGNFGNSYVSWFAYW

GQGTLVTVSSASVAAPSVFIFPPSDEQLKSGTASVVCLLNNFYPREAKVQ

WKVDNALQSGNSQESVTEQDSKDSTYSLSSTLTLSKADYEKHKVYACEVT

HQGLSSPVTKSFNRGECDKTHTCPPCPAPEAAGGPSVFLFPPKPKDTLMI

SRTPEVTCVVVDVSHEDPEVKFNWYVDGVEVHNAKTKPREEQYNSTYRVV

SVLTVLHQDWLNGKEYKCKVSNKALGAPIEKTISKAKGQPREPQVYTLPP

CRDELTKNQVSLWCLVKGFYPSDIAVEWESNGQPENNYKTTPPVLDSDGS

FFLYSKLTVDKSRWQQGNVFSCSVMHEALHNHYTQKSLSLSPGK (2) 10636L|cibisatamab|Humanized||V-LAMBDA-CH1
(V-LAMBDA (1-109) [D1] + CH1 (112-209)
[D2])||214
                                (SEQ ID NO: 33)
QAVVTQEPSLTVSPGGTVTLTCGSSTGAVTTSNYANWVQEKPGQAFRGLI

GGTNKRAPGTPARFSGSLLGGKAALTLSGAQPEDEAEYYCALWYSNLWVF

GGGTKLTVLSSASTKGPSVFPLAPSSKSTSGGTAALGCLVKDYFPEPVTV

SWNSGALTSGVHTFPAVLQSSGLYSLSSVVTVPSSSLGTQTYICNVNHKP

SNTKVDKKVEPKSC (3) 10636M|cibisatamab|Humanized||H-GAMMA-1
(VH (1-121) [D1] + CH1 (122-219) [D2] + CH2
(235-344) [D3] + CH3 (345-449) [D4]||451
                                (SEQ ID NO: 34)
QVQLVQSGAEVKKPGASVKVSCKASGYTFTEFGMNWVRQAPGQGLEWMGW

INTKTGEATYVEEFKGRVTFTTDTSTSTAYMELRSLRSDDTAVYYCARWD

FAYYVEAMDYWGQGTTVTVSSASTKGPSVFPLAPSSKSTSGGTAALGCLV

KDYFPEPVTVSWNSGALTSGVHTFPAVLQSSGLYSLSSVVTVPSSSLGTQ

TYICNVNHKPSNTKVDKKVEPKSCDKTHTCPPCPAPEAAGGPSVFLFPPK

PKDTLMISRTPEVTCVVVDVSHEDPEVKFNWYVDGVEVHNAKTKPREEQY

NSTYRVVSVLTVLHQDWLNGKEYKCKVSNKALGAPIEKTISKAKGQPREP

QVCTLPPSRDELTKNQVSLSCAVKGFYPSDIAVEWESNGQPENNYKTTPP

VLDSDGSFFLVSKLTVDKSRWQQGNVFSCSVMHEALHNHYTQKSLSLSPG

K (4) 10636N|cibisatamab|Humanized||L-KAPPA
(V-KAPPA (1-108) [D1] + C-KAPPA (109-215)
[D2])||215
                                (SEQ ID NO: 35)
DIQMTQSPSSLSASVGDRVTITCKASAAVGTYVAWYQQKPGKAPKLLIYS

ASYRKRGVPSRFSGSGSGTDFTLTISSLQPEDFATYYCHQYYTYPLFTFG
```

-continued

QGTKLEIKRTVAAPSVFIFPPSDEQLKSGTASVVCLLNNFYPREAKVQWK

VDNALQSGNSQESVTEQDSKDSTYSLSSTLTLSKADYEKHKVYACEVTHQ

GLSSPVTKSFNRGEC

As this novel CEA/CD3 bispecific antibody has been well characterized in in vitro and in vivo studies, we decided to design a series of studies to compare Roche CEA-TCB with CEA/CD3OPT1a3b2b1 BsAb. The sequences of CEA/CD3OPT1a3b2b1 BsAb in this example are listed in table 1.

Figure 13:
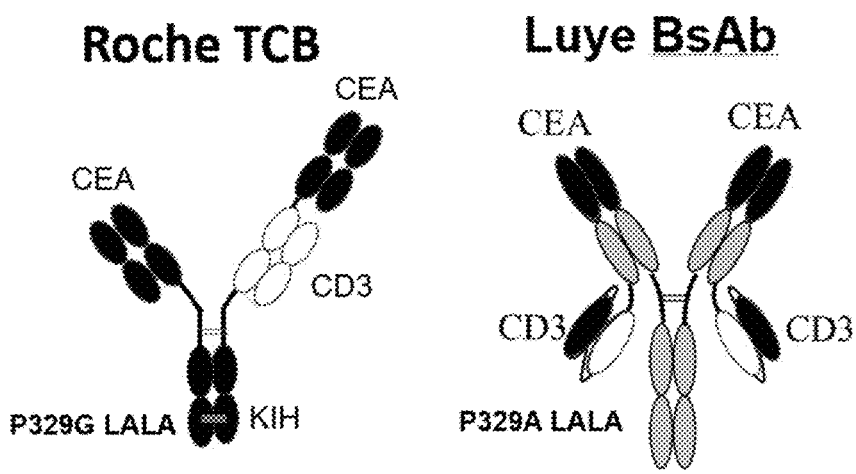
FIG. 13 shows schematic representations of the formats of Roche CEA-TCB and CEA/CD3 bispecific antibodies. CEA-TCB used an asymmetric 2-to-1 molecular format. In contrast, Luye CEA/CD3 bispecific antibody used a symmetric TetraBi antibody format.

The antibody structure format of CEA/CD3OPT1a3b2b1 BsAb is different from Roche CEA-TCB. Roche CEA-TCB uses an asymmetric 2-to-1 molecular format (FIG. 13). It is engineered to have monovalent binding to CD3 on T cells and two arms to bind CEA on tumor cells. CEA/CD3OPT1a3b2b1 BsAb uses a symmetric TetraBi antibody format, including bivalent binding sites for CEA on tumor cell and structurally two arms, but functionally one arm, binding site for CD3 on T cells (FIG. 13). The Fc regions of both Roche CEA-TCB and CEA/CD3OPT1a3b2b1 BsAb have been mutated to eliminate potential Fc-mediated ADCC and CDC side effects. The major difference between the two CEA bispecific antibodies is that the symmetrical molecular structure of CEA/CD3 format provides equal binding affinity to CEA and it is supposed to have a much stronger connection to tumor cells than the asymmetrical format of Roche CEA-TCB. In addition, CEA/CD3OPT1a3b2b1 BsAb is designed to have two identical heavy chains and two identical light chains, which will eliminate complications arising from asymmetric chains and make manufacturing easier and more economical.

CD3 and Human Target CEA Binding

As Roche CEA-TCB and CEA/CD3OPT1a3b2b1 BsAb (also referred to as Lead CEA/CD3 in the figures) have different molecular structures, we first compared the binding affinity of both antibodies to the target molecule CEA and CD3. The interaction of CEA-TCB and CEA/CD3OPT1a3b2b1 with human PBMCs and Jurkat human T lymphocyte cell line was investigated. As assessed by flow cytometry assay, Roche CEA-TCB binds to human PBMC T cells with much higher affinity ($EC_{50}$=0.34 nM) than CEA/CD3OPT1a3b2b1 BsAb ($EC_{50}$=81.03 nM) (FIG. 14A and Table 9). Similar to binding to PBMCs, Roche CEA-TCB displays significantly high binding affinity to Jurkat cells as compared to CEA/CD3OPT1a3b2b1 BsAb, with binding $EC_{50}$ 0.2 vs 112 nM (FIG. 14B and Table 9). The binding activity of Roche CEA-TCB vs CEA/CD3 OPT1a3b2b1 BsAb for antigen CEA was evaluated in CEA highly expressing MKN-45 and LS-174T tumor cells by flow cytometry. In contrast to binding to CD3, the binding activity of Roche CEA-TCB to MKN-45 and LS-174T cells was much lower than that of CEA/CD3 OPT1a3b2b1 BsAb (FIG. 14C, FIG. 14D). The data demonstrated that Roche CEA-TCB and CEA/CD3OPT1a3b2b1 BsAb have completely contrary binding activity to the target and CD3 due to the molecule structures or different binders of CEA and CD3.

TABLE 9

(showing binding of CEA/CD3 OPT1a3b2b1 and Roche CEA TCB to CD3 on human PBMC and Jurkat cells)

| | PBMC (ND 12) EC50 (nM) | Jurkat EC50 (nM) |
| --- | --- | --- |
| CEA/CD3 OPT1a3b2b1 (also referred to as Lead CEA/CD3) | 81.03 | 112.7 |
| Roche CEA TCB | 0.34 | 0.207 |

Comparison of In Vitro and In Vivo Functional Activity of Roche CEA-TCB Vs. CEA/CD30PT1a3b2b1 BsAb Having demonstrated the different binding affinity to CEA and CD3 between Roche CEA-TCB and CEA/CD3OPT1a3b2b1 BsAb (also referred to as Lead CEA/CD3 in the figures), we then assessed the in vitro efficacy of the two bispecific antibodies to mediate cytolysis of CEA expressing target cells MKN-45. To set up the in vitro tumor lysis assay, human PBMCs were freshly isolated from healthy donors and were plated at $2\times10^5$ cells per well with MKN-45 expressing Luciferase at $1\times10^4$ (E/T ratio: 20:1) in a serial of diluted Roche CEA-TCB and CEA/CD3 OPT1a3b2b1 BsAb for 48 hours. Specific lysis was calculated by Luciferase intensity. As shown in FIG. 15A, CEA/CD3OPT1a3b2b1 showed more potent, significant target-specific cytotoxicity against MKN-45 cells in a dose-dependent manner compared with Roche CEA-TCB and $EC_{50}$ value of Roche CEA-TCB was 50-fold higher than that of CEA/CD3OPT1a3b2b1 BsAb (FIG. 15A). Inflammatory cytokines (such as IL-6 and TNF-α) and chronic inflammation correlated with increased tumor incidence and a worsened prognosis for patients with cancer. To determine the relationship of the antibody-mediated cytotoxicity with cytokine release, a parallel analysis of cytokine release from supernatants of the coculture of PBMCs and the target cell MKN-45 was done by ELISA assay. Although the levels of IFN-γ, TNF-α, IL-2, and IL-6 appear higher in CEA/CD3 OPT1a3b2b1 BsAb treated-coculture of PBMCs and MKN-45 than Roche CEA-TCB, the cytokine release levels from CEA/CD3OPT1a3b2b1 BsAb were similar to Roche CEA-TCB as judged at the concentration of the antibody-induced $EC_{50}$ (FIG. 15B to FIG. 15E). (The arrows shown are pointing at the $EC_{50}$ concentration of tumor lysis). We also looked at anti-inflammatory cytokine IL-10 level from the supernatants. The antibody dose-dependent response of IL-10 production was detected from both Roche CEA-TCB and CEA/CD3OPT1a3b2b1 BsAb-treated coculture supernatant, but no significant difference existed between the two antibody-treated supernatants (FIG. 15F). The data indicated that CEA/CD3OPT1a3b2b1 BsAb has more potent cytolytic activity than Roche CEA-TCB, but similar cytokine release levels as Roche CEA-TCB.

Figure 16:
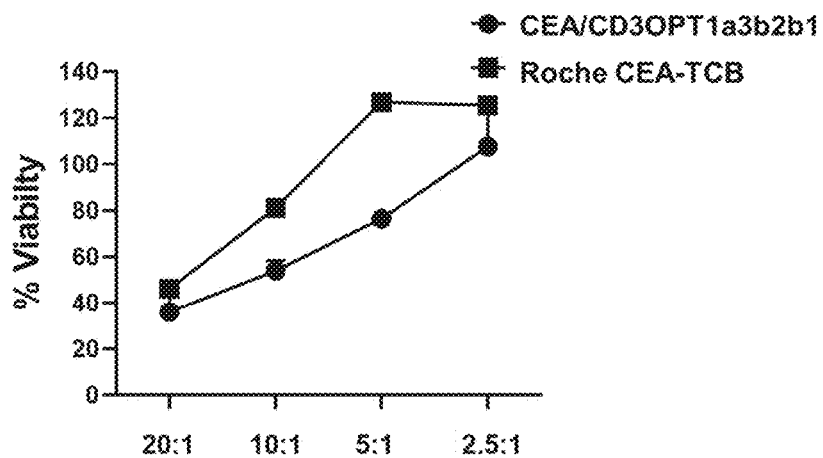
FIG. 16 showed an evaluation of the effect of E/T ratio on killing potency based on a killing assay testing killing activity against CEA expressing target cells at various E/T ratios in the presence of CEA/CD3-OPT1a3b2b1 BsAb compared with Roche CEA-TCB. Freshly isolated PBMCs were cocultured with luciferase-transfected LS-174T cells at four E:T ratios: 20:1, 10:1, 5:1, and 2.5:1.

To further evaluate the effect of E/T ratio on killing potency, a killing assay to test killing activity against CEA-expressing target cells at various E/T ratios in the presence of CEA/CD3-OPT1a3b2b1 was set up and compared with Roche CEA-TCB. Briefly, freshly isolated PBMCs were cocultured with luciferase transfected LS-174T cells at four E:T ratios: 20:1, 10:1, 5:1, and 2.5:1. Killing activity was determined by luminescence units at 48 hours after coculture. As shown in FIG. 16, the highest killing activity was observed in 20:1 ratio and killing activity was gradually reduced with lower E:T ratios. However, the target lysis mediated by CEA/CD3-OPT1a3b2b1 BsAb was better than by Roche CEA-TCB. As shown in FIG. 16, 20% killing activity against LS-174T cells can still be mediated by CEA/CD3-OPT1a3b2b1 at E:T ratio of 5:1, but no apparent killing was observed by Roche CEA-TCB. These findings suggest that CEA/CD3-OPT1a3b2b1 may work better than Roche CEA-TCB in a tumor microenvironment (TME) with a limited presence of T cells.

Determining a Threshold of Effectiveness of CEA/CD3OPT1a3b2b1 BsAb

Figure 17:
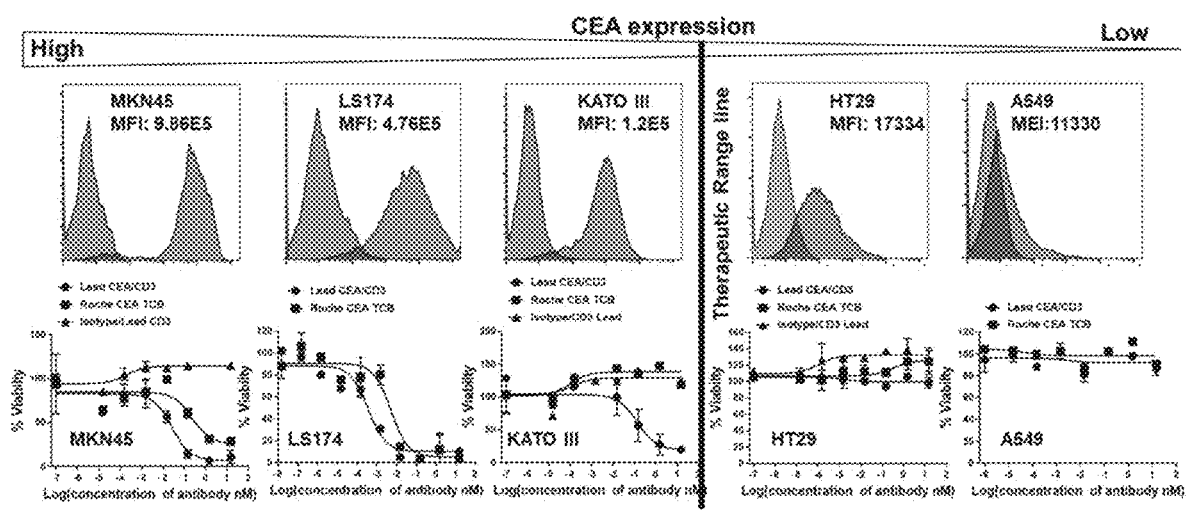
FIG. 17 showed the effect of CEA expression on the efficacy of Roche CEA-TCB and CEA/CD3OPT1a3b2b1 BsAb (also referred to as Lead CEA/CD3). Using the same experimental protocol as FIG. 15A, the cytolytic activity of Roche CEA-TCB and CEA/CD3OPT1a3b2b1 was tested by various CEA expressing tumor cell lines. MKN-45, LS-174T, KATO III, HT-29, and A549.

Although CEA is overexpressed in numerous human cancers, this cell-surface glycoprotein is also normally expressed in a variety of epithelial tissues such as the urogenital, respiratory and gastrointestinal tracts. As a result, our CEA/CD3 bispecific antibody theoretically can make an engagement between effector T cells and normal CEA expressing cells and cause off-target cytotoxicity. Therefore, it is critical to evaluate the minimum level of CEA expression that is required for cytotoxicity mediated by our CEA/CD3 bispecific antibody. Cytotoxic activity of Roche CEA-TCB was well characterized by performing killing assays with more than a hundred target cell lines with various ones expressing CEA. From these cytotoxic experiments, it was noticed that CEA-TCB bispecific antibody can kill tumor target cells with higher than 10.000 CEA binding sites, but the target cells with lower than 10.000 CEA binding sites predominantly did not respond to CEA-TCB. In order to determine the threshold level of CEA expression that is required for our CEA/CD3 bispecific antibody-mediated cytotoxicity, we selected multiple tumor cell lines with various CEA expression levels. Flow cytometry analysis showed that CEA was most highly expressed on gastric tumor MKN-45 cells and least expressed on lung cancer A549 cells, with intermediate CEA expression levels shown for LS-174T, KATO III and HT-29 (FIG. 17 and Table 10). Freshly isolated-human PBMCs were cocultured with the tumor cells at E/T ratio 10:1 in the presence or absence of CEA/CD3OPT1a3b2b1 BsAb (also referred to as Lead CEA/CD3 in the figures) or Isotype/CD3 BsAb (i.e. non-CEA antibody/CD3, wherein the non-CEA antibody part binds to *Clostridium difficile* Tox B) for 48 hours and compared with Roche CEA-TCB antibody as a benchmark antibody. As expected, cytolysis of high CEA expressing MKN-45 and LS-174T target cells appeared more potent by CEA/CD3OPT1a3b2b1 BsAb than by Roche CEA-TCB. In parallel wells, no cytotoxic activity was observed in Isotype/CD3 treated-coculture (FIG. 17 and Table 10). Interestingly, although relatively weaker cytolysis of KATO III cells with medium expression of CEA was mediated by CEA/CD3OPT1a3b2b1 BsAb, KATO III cells had no response to Roche CEA-TCB bispecific antibody at all. More importantly, like Roche CEA-TCB, CEA/CD3OPT1a3b2b1 BsAb did not trigger cytolytic activity to HT-29 with relatively lower CEA expression. (FIG. 17 and Table 10). Our data suggests that the binding affinity to a tumor target plays a critical role in the potency of cytolysis as Roche CEA-TCB bispecific antibody does not benefit from the high CD3 affinity binder in tumor lysis in vitro and in vivo due to its lower CEA binding affinity.

TABLE 10

(showing the effect of CEA expression on the efficacy of Roche CEA-TCB and Luye CEA/CD3OPT1a3b2b1 BsAb.)

| | MKN-45 (EC50 nM) | LS174T (EC50 nM) | KATO-III (EC50 nM) | HT29 (EC50 nM) | A549 (EC50 nM) |
|---|---|---|---|---|---|
| CEA/CD3OPT1a3b2b1 BsAb (also referred to as Lead CEA/CD3) | 0.0003 | 0.0003 | 0.1315 | — | — |
| Roche CEA TCB | 0.001 | 0.005 | — | — | — |

In Vivo Efficacy

Finally, we evaluated the effect of CEA/CD3 bispecific antibodies on tumor development by xenograft analysis in vivo. NSG mice were injected subcutaneously on the right flank on day 0 with LS-174T cells and on day 7 with human PBMCs. Vehicle (PBS) or antibodies (1 or 3 mg/Kg) were administered intraperitoneally twice a week for 14 days (FIG. 18A). For anti-tumor efficacy studies, tumor volume was measured weekly with a caliper and calculated. The anti-tumor response of CEA/CD3 BsAbs was compared at the end point. CEA/CD3OPT1a3b2b1, CEA/CD3 parental, and CEA/CD3OPT1a3b BsAbs completely inhibited LS-174T cell-induced tumor growth compared to the PBS control group at 3 mg/Kg treatment (FIG. 18B). Although one out of seven mice did not fully respond to the treatment of CEA/CD3OPT1a3b2b1 BsAb in mice with 1 mg/kg, strong inhibition of tumor growth was observed (FIG. 19A). The body weight change of mice was not significantly different between PBS and antibody treated mice (data not shown). However, if compared to the data Roche published, Roche CEA-TCB is not fully potent as a complete tumor response was not observed in the mice with a higher dose treatment of Roche CEA-TCB (2.5 mg/kg) (FIG. 19B).

Taken together, CEA/CD3 OPT1a3b2b1 BsAb treatment strongly inhibited the growth of cancer cells in vitro and in vivo, more effectively than Roche CEA-TCB, which demonstrates that CEA/CD3 OPT1a3b2b1 BsAb may be a potential antitumor agent.

OTHER EMBODIMENTS

It is to be understood that while the disclosure has been described in conjunction with the detailed description thereof, the foregoing description is intended to illustrate and not limit the scope of the disclosure, which is defined by the scope of the appended claims. Other aspects, advantages, and modifications are within the scope of the following claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A CD3 antigen binding fragment, comprising a heavy chain variable region and a light chain variable region, wherein:
the heavy chain variable region has the amino acid sequence of SEQ ID NO: 15 and the light chain variable region has the amino acid sequence of SEQ ID NO: 2; or
the heavy chain variable region has the amino acid sequence of SEQ ID NO: 22 and the light chain variable region has the amino acid sequence of SEQ ID NO: 2; or
the heavy chain variable region has the amino acid sequence of SEQ ID NO: 23 and the light chain variable region has the amino acid sequence of SEQ ID NO: 2; or
the heavy chain variable region has the amino acid sequence of SEQ ID NO: 24 and the light chain variable region has the amino acid sequence of SEQ ID NO: 2; or
the heavy chain variable region has the amino acid sequence of SEQ ID NO: 25 and the light chain variable region has the amino acid sequence of SEQ ID NO: 2; or
the heavy chain variable region has the amino acid sequence of SEQ ID NO: 26 and the light chain variable region has the amino acid sequence of SEQ ID NO: 4.

2. A bispecific antigen binding molecule comprising a first antigen binding domain and a second antigen binding domain, wherein the second antigen binding domain comprises the CD3 antigen binding fragment of claim 1.

3. The bispecific antigen binding molecule of claim 2, wherein the first antigen binding domain comprises two identical heavy chains and two identical light chains, and the second antigen binding domain comprises two identical CD3 antigen binding fragments, and wherein each said light chain of the first antigen binding domain is fused to each said CD3 antigen binding fragment of the second antigen binding domain.

4. The bispecific antigen binding molecule of claim 3, wherein the C-terminal of the constant region of each said light chain of the first antigen binding domain is fused to the N-terminal of the heavy chain variable region of each said CD3 antigen binding fragment of the second antigen binding domain directly or via a peptide linker.

5. The bispecific antigen binding molecule of claim 2, wherein the first antigen binding domain comprises an aglycosylated monoclonal antibody.

6. The bispecific antigen binding molecule of claim 2, wherein said first antigen binding domain is a CEA antigen binding domain.

7. A method of treating cancer in a subject in need thereof, comprising administering to the subject the CD3 antigen binding fragment of claim 1 or the bispecific antigen binding molecule of claim 2.

8. A method of claim 7, wherein the cancer is a CEA-positive cancer.

9. A method of claim 8, wherein the cancer is colorectal cancer, gastric cancer, pancreatic cancer, or other gastrointestinal cancer.

10. The bispecific antigen binding molecule according to claim 2, wherein the CEA antigen binding domain comprises a heavy chain variable region comprising SEQ ID NO: 5 and a light chain variable region comprising SEQ ID NO: 6; or the CEA antigen binding domain comprises a heavy chain variable region comprising SEQ ID NO: 7 and a light chain variable region comprising SEQ ID NO: 8.

11. The bispecific antigen binding molecule of claim 2, wherein the CD3 antigen binding fragment comprises a scFv.

* * * * *